(12) United States Patent
Yu et al.

(10) Patent No.: US 9,620,087 B2
(45) Date of Patent: *Apr. 11, 2017

(54) MULTIMEDIA INTERACTION SYSTEM AND RELATED COMPUTER PROGRAM PRODUCT CAPABLE OF AVOIDING UNEXPECTED INTERACTION BEHAVIOR

(71) Applicant: Realtek Semiconductor Corp., Hsinchu (TW)

(72) Inventors: Siu-Leong Yu, Hsinchu (TW); Shih-Chun Wei, Hsinchu (TW); Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 795 days.

This patent is subject to a terminal disclaimer.

(21) Appl. No.: 13/974,933

(22) Filed: Aug. 23, 2013

(65) Prior Publication Data

US 2013/0342579 A1    Dec. 26, 2013

Related U.S. Application Data

(63) Continuation-in-part of application No. 13/782,530, filed on Mar. 1, 2013, now Pat. No. 9,104,367.

(Continued)

(30) Foreign Application Priority Data

| Aug. 24, 2012 | (TW) | ............... | 101130868 A |
| Dec. 21, 2012 | (TW) | ............... | 101149212 A |
| Jul. 8, 2013 | (TW) | ............... | 102124335 A |

(51) Int. Cl.
*G09G 5/00* (2006.01)
*G09G 5/34* (2006.01)
(Continued)

(52) U.S. Cl.
CPC ............. *G09G 5/34* (2013.01); *G06F 3/0346* (2013.01); *G06F 3/0488* (2013.01);
(Continued)

(58) Field of Classification Search
CPC .. G06F 3/0346; G06F 3/0488–3/04886; G06F 3/1454
See application file for complete search history.

(56) References Cited

U.S. PATENT DOCUMENTS 8,147,336 B2    4/2012   Hirota
9,052,802 B2 *  6/2015   Yu .................... G06F 3/0484
(Continued)

FOREIGN PATENT DOCUMENTS

| CN | 1355495 A | 6/2002 |
| CN | 101410878 A | 4/2009 |

(Continued)

*Primary Examiner* — Charles Tseng
(74) *Attorney, Agent, or Firm* — Birch, Stewart, Kolasch & Birch, LLP

(57) ABSTRACT

A multimedia interaction system includes: multiple electronic devices and a location detection circuit. The location detection circuit dynamically detects respective electronic device's spatial position and orientation. When an user instructs a source electronic device of the multiple electronic devices to transmit a target image object toward a selected direction, the source electronic device decides a target direction according to a location of a first candidate electronic device and the selected direction if a relative position between the first candidate electronic and the selected direction satisfies a first predetermined condition. The source electronic device transmits a target command corresponding to the target image object to a second candidate electronic device to perform corresponding multimedia interaction operations only if a relative position between the second candidate electronic and the target direction satisfies a second predetermined condition.

26 Claims, 40 Drawing Sheets

Related U.S. Application Data

(60) Provisional application No. 61/718,182, filed on Oct. 24, 2012, provisional application No. 61/605,771, filed on Mar. 2, 2012.

(51) Int. Cl.
*G06F 3/0346* (2013.01)
*G06F 3/0488* (2013.01)
*G06F 3/14* (2006.01)

(52) U.S. Cl.
CPC ....... *G06F 3/1454* (2013.01); *G09G 2354/00* (2013.01); *G09G 2356/00* (2013.01)

(56) References Cited

U.S. PATENT DOCUMENTS

| | | |
|---|---|---|
| 9,104,367 B2 * | 8/2015 | Yu .................. G06F 3/1423 |
| 9,105,221 B2 * | 8/2015 | Yu .................... G09G 5/12 |
| 2007/0265091 A1 | 11/2007 | Aguilar, Jr. et al. |
| 2010/0150404 A1 | 6/2010 | Marks et al. |
| 2011/0161856 A1 | 6/2011 | Nurmi et al. |
| 2013/0169546 A1 * | 7/2013 | Thomas ............ G06F 9/4451 |
| | | 345/173 |

FOREIGN PATENT DOCUMENTS

| CN | 101579575 A | 11/2009 |
|---|---|---|
| CN | 101931479 A | 12/2010 |
| WO | WO 2012/016497 A1 | 2/2012 |

* cited by examiner

MULTIMEDIA INTERACTION SYSTEM AND RELATED COMPUTER PROGRAM PRODUCT CAPABLE OF AVOIDING UNEXPECTED INTERACTION BEHAVIOR

CROSS-REFERENCE TO RELATED APPLICATIONS

This application claims the benefit of priority to Patent Application No. 101130868, filed in Taiwan on Aug. 24, 2012; the entirety of which is incorporated herein by reference for all purposes.

This application claims the benefit of priority to U.S. Provisional Application Ser. No. PA 61/718,182, filed on Oct. 24, 2012; the entirety of which is incorporated herein by reference for all purposes.

This application claims the benefit of priority to Patent Application No. 101149212, filed in Taiwan on Dec. 21, 2012; the entirety of which is incorporated herein by reference for all purposes.

This application is a Continuation-In-Part of and claims the benefit of priority to U.S. patent application Ser. No. 13/782,530, filed on Mar. 1, 2013; which claims the benefit of U.S. Provisional Application Ser. No. PA 61/605,771 filed on Mar. 2, 2012, the entirety of which is incorporated herein by reference for all purposes.

This application claims the benefit of priority to Patent Application No. 102124335, filed in Taiwan on Jul. 8, 2013; the entirety of which is incorporated herein by reference for all purposes.

BACKGROUND

The disclosure generally relates to a multimedia interaction system and, more particularly, to a multimedia interaction system including multiple displays and capable of avoiding unexpected interaction behavior and a related computer program product.

As technology progresses, multimedia interaction systems allowing multimedia interactions to be carried out among different electronic devices and related applications have become more and more important. In the design of many interaction applications related to multimedia content, it is expected that particular multimedia interaction operations can only be performed if a relative position among multiple electronic devices participating in the multimedia interaction satisfies a specific condition. In a traditional multimedia interaction system, however, a transmitting-end electronic device of a multimedia interaction command is unable to determine the relative position among itself and other electronic devices, and unable to restrict the transmission direction of multimedia contents or interaction commands Accordingly, multimedia interaction results that do not conform to normal user experiences, multimedia interaction results that are not supposed to occur in the design of the multimedia interaction applications, multimedia interaction results that violate rules configured by the interaction applications, or unexpected multimedia interaction results often occur among the electronic devices.

For example, in the design of some multimedia interaction applications, it is expected that a particular image object or command can only be transmitted from the transmitting-end electronic device to a receiving-end electronic device if the receiving-end electronic device and its user are in front of a user of the transmitting-end electronic device. In practical operations, however, even if the receiving-end electronic device and its user are both behind the user of the transmitting-end electronic device, the receiving-end electronic device can still receive the particular image object or commands originated from the transmitting-end electronic device. Such kind of unexpected interaction does not conform to normal user experience and is not supposed to occur according to the original design of the multimedia interaction applications, but it still often occurs. This is because in order to acquire better signal transmission quality, conventional electronic devices are typically designed to be able to transmit/receive signals to/from various directions, but a specific direction.

One way to reduce the afore-mentioned problems is to redesign communication circuits of the electronic devices so that the electronic devices are only allowed to transmit/receive signals to/from a specific direction. But such approach severely influences the signal transmission ability and signal receiving range of the electronic device. Apparently, it will be obstructive to the development and progress of cross-device multimedia interaction applications if the multimedia interaction system is unable to deliver user experience that conforms to the original design purpose of the multimedia interaction applications.

SUMMARY

An example embodiment of a multimedia interaction system is disclosed, comprising: multiple electronic devices, comprising a source electronic device and multiple candidate electronic devices; multiple displays, respectively arranged on the source electronic device and the multiple candidate electronic devices; and a location detection circuit, configured to dynamically detect a spatial location and an orientation of each of the multiple electronic devices, and configured to operably transmit information related to detection results to at least one of the multiple electronic devices through a wireless communication approach; wherein when a user instructs the source electronic device to transmit a target image object toward a selected direction, if a relative position between the selected direction and a first candidate electronic device of the multiple candidate electronic devices satisfies a first predetermined condition, the source electronic device selects the first candidate electronic device as a basis electronic device, and decides a target direction according to the selected direction and a location of the basis electronic device; wherein the source electronic device determines whether a relative position between the target direction and a second candidate electronic device of the multiple electronic devices satisfies a second predetermined condition, and only if the relative position between the target direction and the second candidate electronic device satisfies the second predetermined condition, the source electronic device transmits a target command corresponding to the target image object to the second candidate electronic device, so that the second candidate electronic device utilizes a corresponding second candidate display to perform a multimedia operation corresponding to the target image object according to the target command.

An example embodiment of a computer program product, stored in a non-transitory storage device of a source electronic device of a multimedia interaction system, for enabling the source electronic device to perform a multimedia interaction operation when executed by a control circuit is disclosed. The multimedia interaction system comprises a location detection circuit and multiple electronic devices, the multiple electronic devices comprise the source electronic device and multiple candidate electronic devices, and the source electronic device comprises the control circuit, a communication circuit, and a source display. The computer program product comprises: a receiving module, for utilizing the communication circuit to dynamically receive information related to a spatial location and an orientation of each of the multiple electronic devices through a wireless communication approach; a selecting module, wherein when a user instructs the source electronic device to transmit a target image object toward a selected direction, the selecting module utilizes the control circuit to select a first candidate electronic device of the multiple electronic devices as a basis electronic device if a relative position between the first candidate electronic device and the selected direction satisfies a first predetermined condition; a target direction decision module, for utilizing the control circuit to decide a target direction according to the selected direction and a location of the basis electronic device; a determining module, for utilizing the control circuit to determine whether a relative position between a second candidate electronic device of the multiple electronic devices and the target direction satisfies a second predetermined condition; and a transmitting module, for utilizing the communication circuit to transmit a target command corresponding to the target image object to the second candidate electronic device only if the relative position between the second candidate electronic device and the target direction satisfies the second predetermined condition, so that the second candidate electronic device utilizes a corresponding second candidate display to perform a multimedia operation corresponding to the target image object according to the target command.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
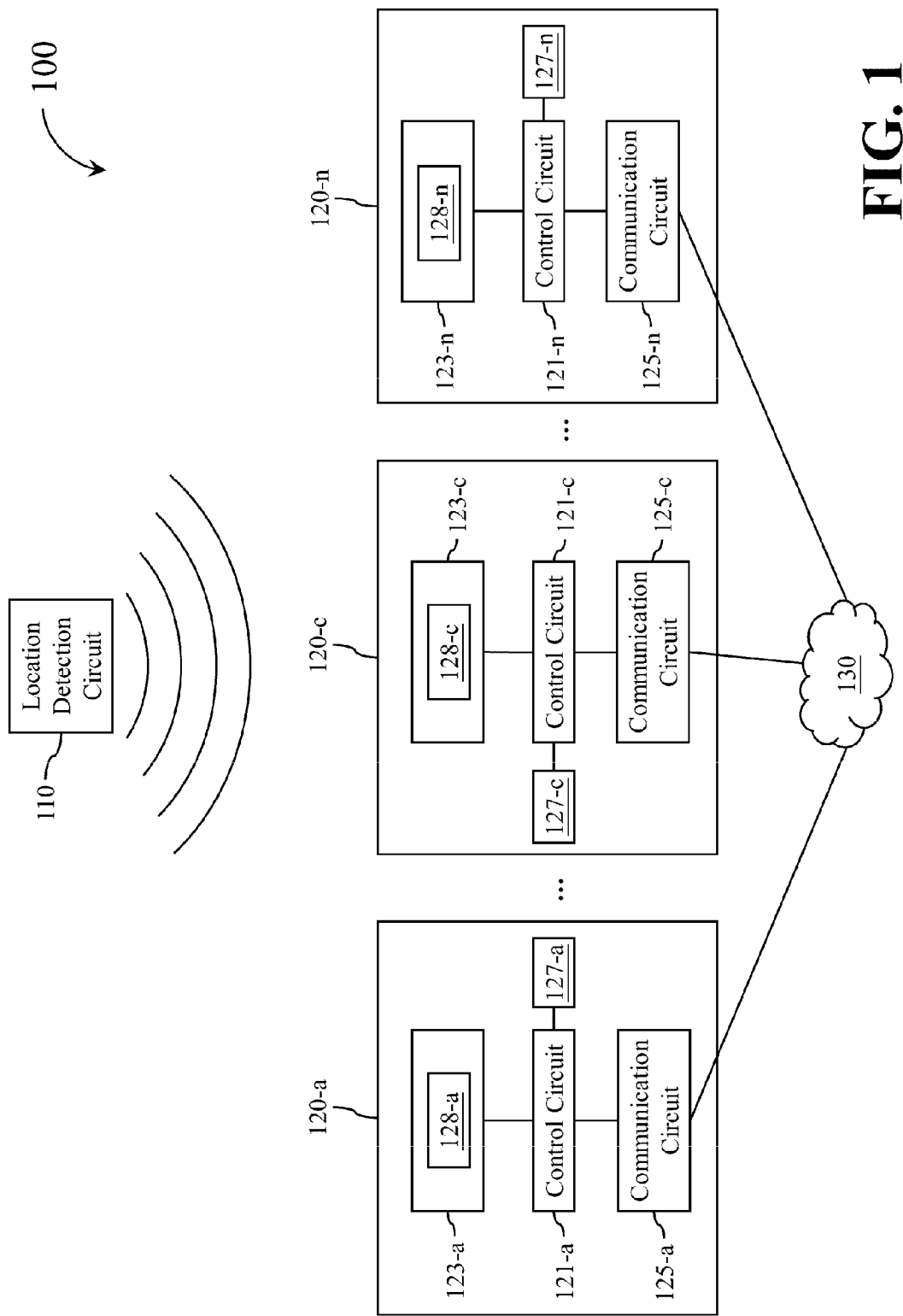
FIG. 1 shows a simplified functional block diagram of a multimedia interaction system according to one embodiment of the present disclosure.

Please refer to FIG. 1. FIG. 1 shows a simplified functional block diagram of a multimedia interaction system 100 according to an embodiment of the present disclosure. The multimedia interaction system 100 comprises a location detection circuit 110 and multiple member electronic devices (electronic devices 120-$a$~120-$n$ are shown in FIG. 1 as examples). In the multimedia interaction system 100, different users are allowed to perform interactive operations related to multimedia contents, such as sharing of various multimedia contents, interaction of multimedia contents, collaborative editing of multimedia contents, on-line sport games, card games, role-playing games (RPG), action games, adventure games, strategy games (SLG), real-time strategy games (RSG), or the like through the electronic devices 120-$a$~120-$n$.

The location detection circuit 110 may be realized with various existing object positioning circuits, such as one or more magnetic sensor circuits, ultrasonic positioning circuits, infrared sensing circuits, image sensing and identifying circuits, Wi-Fi signal positioning circuits, motion detecting circuits, indoor GPS circuits, posture sensing circuits, or the like. In practice, the location detection circuit 110 may be positioned above all of the electronic devices 120-$a$~120-$n$, such as be positioned at a ceiling, so that a position of the location detection circuit 110 is higher than positions of all the electronic devices 120-$a$~120-$n$ in order to enhance location detecting accuracy.

Throughout the specification and drawings, indexes an may be used in the reference numbers of components and devices for ease of referring to respective components and devices. The use of indexes an does not intend to restrict the count of components and devices to any specific number. In the specification and drawings, if a reference number of a particular component or device is used without using the index, it means that the reference number is used to refer to any unspecific component or device of corresponding component group or device group. For example, the reference number 121-$a$ is used to refer to the specific control circuit 121-$a$, and the reference number 121 is used to refer to any control circuit of the control circuits 121-$a$~121-$n$. In another example, the reference number 120-$c$ is used to refer to the specific electronic device 120-$c$, and the reference number 120 is used to refer to any electronic device of electronic devices 120-$a$~120-$n$.

In the embodiment of FIG. 1, each of the electronic devices 120-$a$~120-$n$ comprises a control circuit 121, a storage device 123 coupled with the control circuit 121, a communication circuit 125, and a display 127. In practice, the control circuit 121 may be realized with one or more processor units, and the communication circuit 125 may be a wired network interface, a wireless network interface, or a hybrid circuit integrated with two functionalities of above the wired network interface and the wireless network interface. In addition, a multimedia interaction module 128 is stored in the storage device 123. The multimedia interaction module 128 may be realized with one or more application program modules. For example, the multimedia interaction module 128 may comprise a receiving module, a selecting module, a target direction decision module, a determining module, a transmitting module, and a display module. For the purpose of explanatory convenience in the following description, other elements and related connections in the electronic device 120 are not shown in FIG. 1.

In operations, the electronic devices 120-a~120-n may communicate data with each other through a network 130. The aforementioned network 130 may be an internetor an intranet adopting various communication protocols.

In applications, the electronic devices 120-a~120-n may be multiple electronic devices having a same hardware specification and operation system, or having different hardware specifications and operation systems. In other words, the electronic devices 120-a~120-n may be various combinations of desktop computers, desktop game consoles, business machines, mobile electronic devices (such as mobile phones, tablet computers, notebook computers, netbook computers, electronic books, and handheld game consoles), or various home appliances (such as televisions, refrigerators, and stereos) which are capable of connecting to network.

The operations of the multimedia interaction system 100 will be further described below by reference to FIGS. 3 and 4.

Figure 3:
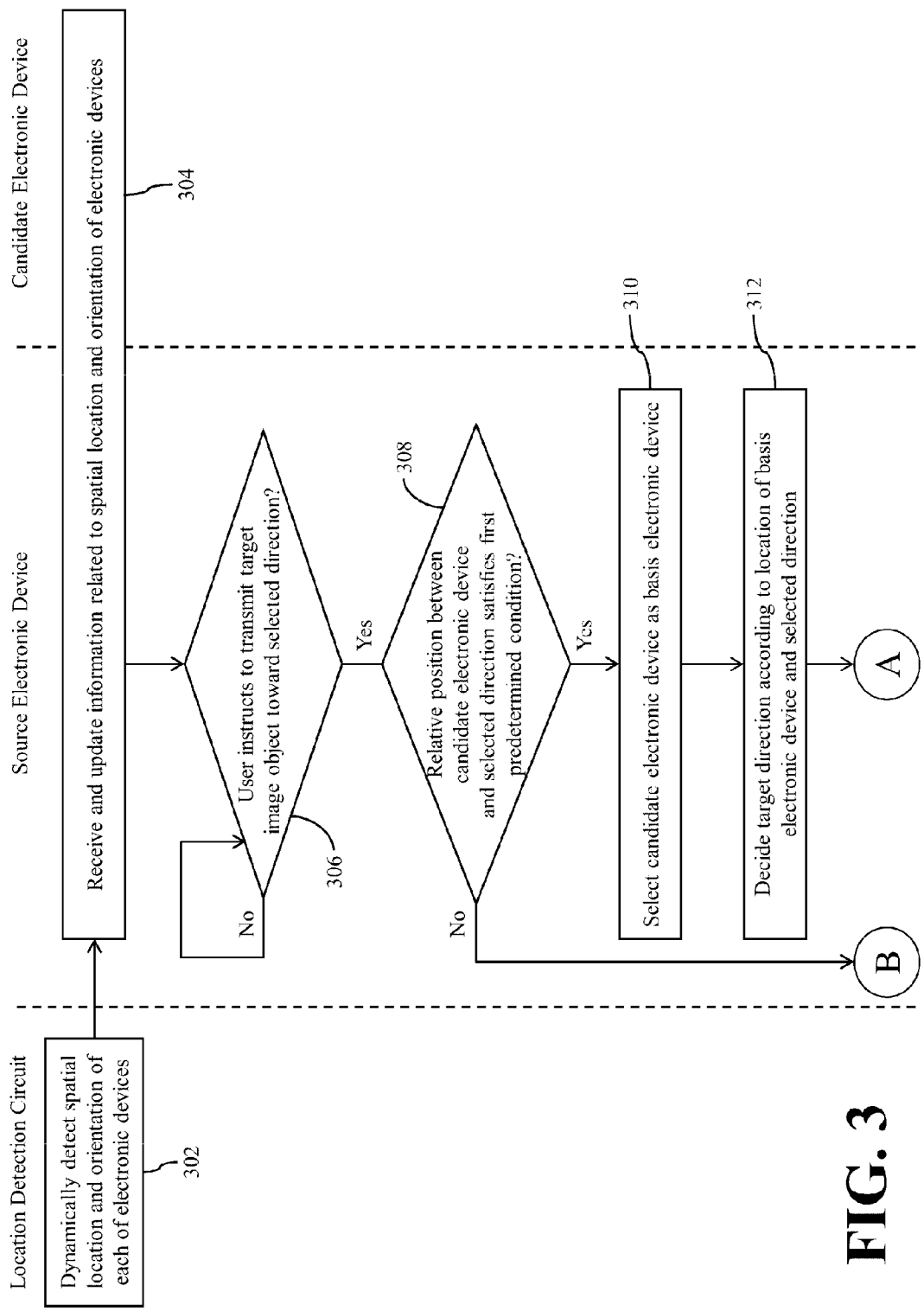
FIGS. 3~4 show simplified flowcharts illustrating a multimedia interaction method according to one embodiment of the present disclosure.
Figure 4:
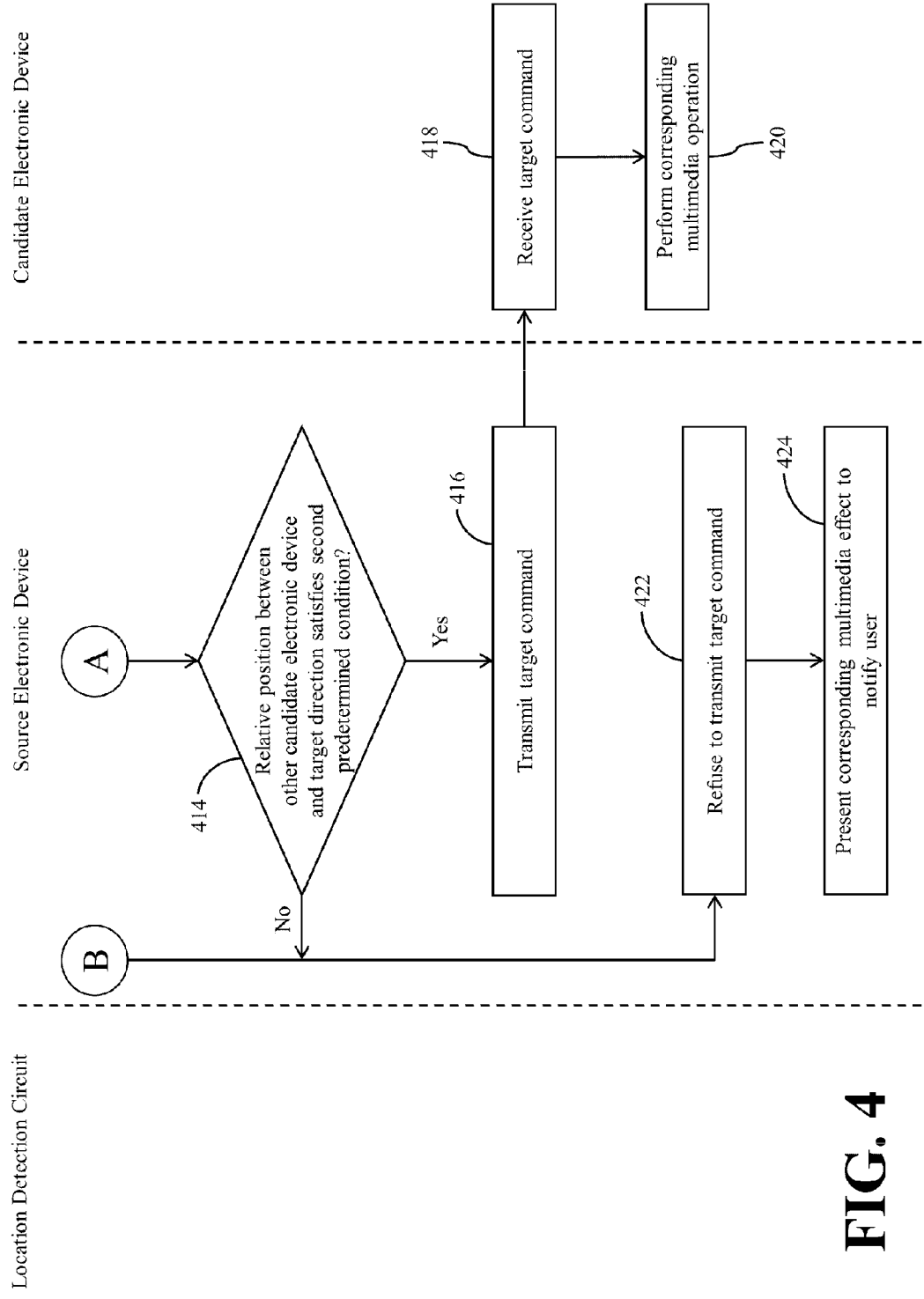

FIGS. 3 and 4 together show a simplified flowchart illustrating a multimedia interaction method for the multimedia interaction system 100 according to an embodiment of the present disclosure.

In the FIGS. 3 and 4, operations within a column under the name of a specific device are operations to be performed by the specific device. For example, in the FIGS. 3 and 4, operations within a column under the label "location detection circuit" are operations to be performed by the location detection circuit 110, operations within a column under the label "source electronic device" are operations to be performed by an electronic device from which a multimedia interaction command is generated, operations within a column under the label "candidate electronic device" are operations to be performed by an electronic device that may be utilized to receive or execute the multimedia interaction command, and so forth.

When performing the multimedia interaction method of the FIGS. 3 and 4, the control circuit 121 of the electronic device 120 executes the multimedia interaction module 128 to enable the electronic device 120 to perform some or all operations within the corresponding column.

For illustrative purpose, it is assumed hereinafter that the source electronic device is the electronic device 120-c, and the candidate electronic device is one of other electronic devices of the multimedia interaction system 100 in order to illustrate the operations of the multimedia interaction system 100.

In the operation 302, the location detection circuit 110 may dynamically detect a spatial location and an orientation of each of the electronic devices 120-a~120-n so as to generate information related to the spatial location and the orientation of each of the electronic devices 120-a~120-n. The location detection circuit 110 also transmits the information related to detection results to at least one of the electronic devices 120-a~120-n through a wireless transmission approach.

In the multimedia interaction system 100, a spatial location of a particular geometry characteristic of the electronic device 120, a spatial location of a particular symbol of the electronic device 120, a spatial location of a particular element of the electronic device 120, a spatial location of a particular region of the electronic device 120, a spatial location of a particular geometry characteristic of the display 127, or a spatial location of a particular geometry characteristic of a particular display region of the display 127 may be utilized to represent a spatial location of the electronic device 120.

For example, the location detection circuit 110 may detect and utilize a centroid location of the electronic device 120 to represent the spatial location of the electronic device 120. Alternatively, the location detection circuit 110 may detect and utilize a centroid location of the display 127 to represent the spatial location of the electronic device 120.

Figure 2:
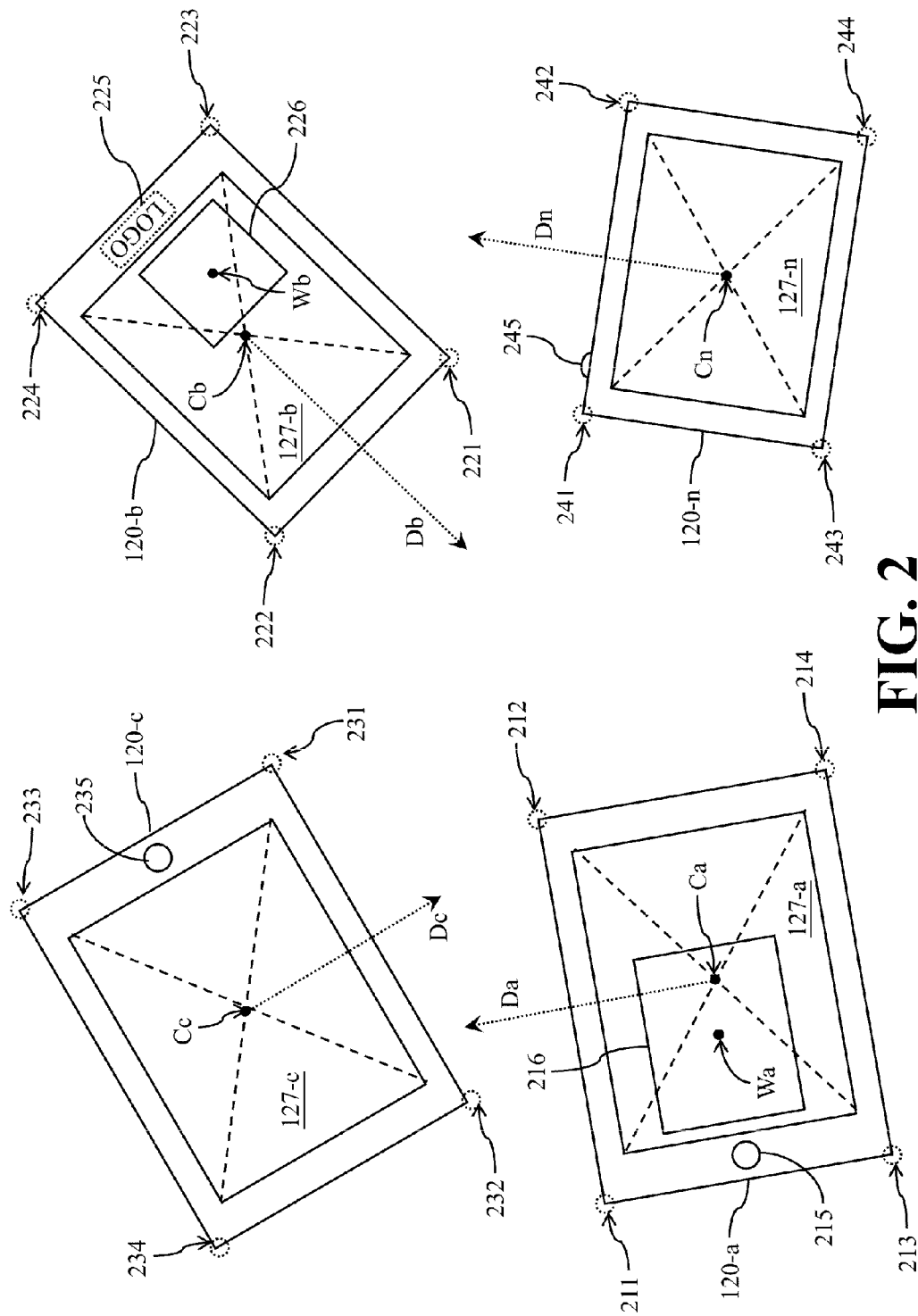
FIG. 2 shows a simplified schematic diagram of spatial locations for partial electronic devices in FIG. 1 according to one embodiment of the present disclosure.

In practice, the location detection circuit 110 may cooperate with respective electronic devices 120-a~120-n to compute respective spatial locations of the electronic devices 120-a~120-n. The location detection circuit 110 may detect and transmit spatial coordinates of multiple reference points of the electronic device 120 to the electronic device 120, and then the determining module of the multimedia interaction module 128 utilizes the control circuit 121 to compute the centroid location of the electronic device 120 according to the spatial coordinates of the reference points to represent the spatial location of the electronic device 120. For example, in the embodiment of FIG. 2, the location detection circuit 110 may detect and transmit spatial coordinates of reference points 211~214 of the electronic device 120-a to the electronic device 120-a, detect and transmit spatial coordinates of reference points 221~224 of the electronic device 120-b to the electronic device 120-b, detect and transmit spatial coordinates of reference points 231~234 of the electronic device 120-c to the electronic device 120-c, and detect and transmit spatial coordinates of reference points 241~244 of the electronic device 120-n to the electronic device 120-n.

Since a length and a width of the electronic device 120-a are given values, a determining module of the multimedia interaction module 128-a may utilize the control circuit 121-a to compute a centroid location of the electronic device 120-a according to the spatial coordinates of some or all of the reference points 211~214 to represent a spatial location of the electronic device 120-a. Since a length and a width of the electronic device 120-b are given values, a determining module of the multimedia interaction module 128-b may utilize the control circuit 121-b to compute a centroid location of the electronic device 120-b according to the spatial coordinates of some or all of the reference points 221~224 to represent a spatial location of the electronic device 120-b. Since a length and a width of the electronic device 120-c are given values, a determining module of the multimedia interaction module 128-c may utilize the control circuit 121-c to compute a centroid location of the electronic device 120-c according to the spatial coordinates of some or all of the reference points 231~234 to represent a spatial location of the electronic device 120-c. Since a length and a width of the electronic device 120-n are given values, a determining module of the multimedia interaction module 128-n may utilize the control circuit 121-n to compute a centroid location of the electronic device 120-n according to the spatial coordinates of some or all of the reference points 241~244 to represent a spatial location of the electronic device 120-n.

Alternatively, the determining module of the multimedia interaction module 128 may utilize the control circuit 121 to compute the centroid location of the display 127 to represent the spatial location of the electronic device 120 according to the received spatial coordinates of the reference points. For example, in the embodiment of FIG. 2, the location detection circuit 110 may detect and transmit the spatial coordinates of the reference points 211~214 to the electronic device 120-*a*, detect and transmit the spatial coordinates of the reference points 221~224 to the electronic device 120-*b*, detect and transmit the spatial coordinates of the reference points 231~234 to the electronic device 120-*c*, and detect and transmit the spatial coordinates of the reference points 241~244 to the electronic device 120-*n*.

Since the length and the width of the electronic device 120-*a* are given values, a size of a display 127-*a* of the electronic device 120-*a* is given, and a spatial arrangement of the display 127-*a* with respect to the electronic device 120-*a* is given as well, the determining module of the multimedia interaction module 128-*a* may utilize the control circuit 121-*a* to compute a location of a centroid Ca of the display 127-*a* according to the spatial coordinates of some or all of the reference points 211~214 to represent the spatial location of the electronic device 120-*a*. Since the length and the width of the electronic device 120-*b* are given values, a size of a display 127-*b* of the electronic device 120-*b* is given, and a spatial arrangement of the display 127-*b* with respect to the electronic device 120-*b* is given as well, the determining module of the multimedia interaction module 128-*b* may utilize the control circuit 121-*b* to compute a location of a centroid Cb of the display 127-*b* according to the spatial coordinates of some or all of the reference points 221~224 to represent the spatial location of the electronic device 120-*b*. Since the length and the width of the electronic device 120-*c* are given values, a size of a display 127-*c* of the electronic device 120-*c* is given, and a spatial arrangement of the display 127-*c* with respect to the electronic device 120-*c* is given as well, the determining module of the multimedia interaction module 128-*c* may utilize the control circuit 121-*c* to compute a location of a centroid Cc of the display 127-*c* according to the spatial coordinates of some or all of the reference points 231~234 to represent the spatial location of the electronic device 120-*b*. Similarly, since the length and the width of the electronic device 120-*n* are given values, a size of a display 127-*n* of the electronic device 120-*n* is given, and a spatial arrangement of the display 127-*n* with respect to the electronic device 120-*n* is given as well, the determining module of the multimedia interaction module 128-*n* may utilize the control circuit 121-*n* to compute three dimensional coordinates of a centroid Cn of the display 127-*n* according to the spatial coordinates of some or all of the reference points 241~244 to represent the spatial location of the electronic device 120-*n*.

Alternatively, the determining module of the multimedia interaction module 128 may utilize the control circuit 121 to compute a location of a particular geometry characteristic (such as a central location) of a multimedia interaction program window (such as a browser window) that is being displayed in the display 127 according to the received spatial coordinates of the reference points to represent the spatial location of the electronic device 120. For example, in the embodiment of FIG. 2, the electronic device 120-*a* utilizes the display 127-*a* to display a target browser window 216, and the electronic device 120-*b* utilizes the display 127-*b* to display a target browser window 226. Since a size of the target browser window 216 displayed in the display 127-*a* and a relative position between the target browser window 216 and the display 127-*a* are configured by the control circuit 121-*a*, the size of the target browser window 216 and the relative position between the target browser window 216 and the display 127-*a* are known parameters to the control circuit 121-*a*. Accordingly, the location detection circuit 110 may detect and transmit the spatial coordinates of the reference points 211~214 of the electronic device 120-*a* to the electronic device 120-*a*, and then the determining module of the multimedia interaction module 128-*a* may utilize the control circuit 121-*a* to compute three dimensional coordinates of a central location Wa of the target browser window 216 according to the spatial coordinates of some or all of the reference points 211~214 to represent the spatial location of the electronic device 120-*a*. Similarly, since a size of the target browser window 226 displayed in the display 127-*b* and a relative position between the target browser window 226 and the display 127-*b* are configured by the control circuit 121-*b*, the size of the target browser window 226 and the relative position between the target browser window 226 and the display 127-*b* are known parameters to the control circuit 121-*b*. Accordingly, the location detection circuit 110 may detect and transmit the spatial coordinates of the reference points 221~224 of the electronic device 120-*b* to the electronic device 120-*b*, and then the determining module of the multimedia interaction module 128-*b* may utilize the control circuit 121-*b* to compute three dimensional coordinates of a central location Wb of the target browser window 226 according to the spatial coordinates of some or all of the reference points 221~224 to represent the spatial location of the electronic device 120-*b*.

In addition, the location detection circuit 110 may further identify and detect locations of one or more reference objects or symbols of the electronic device 120, and compare the locations of the reference objects or symbols of the electronic device 120 with locations of other reference points to determine an orientation of the electronic device 120. For example, in the embodiment of FIG. 2, the location detection circuit 110 may identify and detect a location of a control button 215 of the electronic device 120-*a*, and compare the location of the control button 215 with the spatial coordinates of some or all of the aforementioned reference points 211~214 to determine the orientation of the electronic device 120-*a*. The location detection circuit 110 may identify and detect a location of a brand logo 225 of the electronic device 120-*b*, and compare the location of the brand logo 225 with the spatial coordinates of some or all of the aforementioned reference points 221~224 to determine the orientation of the electronic device 120-*b*. The location detection circuit 110 may identify and detect a location of a control button 235 of the electronic device 120-*c*, and compare the location of the control button 235 with the spatial coordinates of some or all of the aforementioned reference points 231~234 to determine the orientation of the electronic device 120-*c*. The location detection circuit 110 may identify and detect a location of a control button 245 of the electronic device 120-*n*, and compare the location of the control button 245 with the spatial coordinates of some or all of the aforementioned reference points 241~244 to determine the orientation of the electronic device 120-*n*.

Alternatively, the location detection circuit 110 may transmit the location detection results of the one or more reference objects or symbols as well as the location detection results of other reference points to the electronic device 120. Then the determining module of the multimedia interaction module 128 may utilize the control circuit 121 to compare the locations of the one or more reference objects or symbols with the locations of other reference points to determine the orientation of the electronic device 120 in order to reduce computation loading of the location detection circuit 110.

In the following description, the orientation of the electronic device 120-*a* is represented by an orientation direction Da, the orientation of the electronic device 120-*b* is represented by an orientation direction Db, the orientation of the electronic device 120-*c* is represented by an orientation direction Dc, and the orientation of the electronic device 120-*n* is represented by an orientation direction Dn. Please note that the terms "orientation" and "orientation direction" used throughout the description and the claims are intended to describe the placement of the electronic device 120 in use, and not refer to the signal transmitting direction or signal receiving direction of the communication circuit 125 of the electronic device 120.

For the purpose of explanatory convenience in the following description, it is assumed hereinafter that the multimedia interaction system 100 utilizes the centroid location of the display 127 to represent the spatial location of the electronic device 120.

In operations, the spatial location and the orientation of each electronic device 120 may vary as a user's location or posture changes when manipulating the electronic device 120. Accordingly, the location detection circuit 110 may perform the aforementioned operation 302 continuously or intermittently to dynamically detect the spatial location and the orientation of each of the electronic devices 120-*a*~120-*n* so as to generate the information related to the spatial location and the orientation of each of the electronic devices 120-*a*~120-*n*. The location detection circuit 110 may transmit the generated information to one or more electronic devices that require such information through a wireless transmission approach.

In the operation 304, the receiving module of the multimedia interaction module 128 of each electronic device 120 may utilize the communication circuit 125 to dynamically receive information related to the spatial location and the orientation of the electronic device 120 from the location detection circuit 110 through a wireless transmission approach, and record the received information. In addition, the receiving module of the multimedia interaction module 128 may also utilize the communication circuit 125 to dynamically receive information related to the spatial locations and the orientations of the other electronic devices from the location detection circuit 110 or the other electronic devices, and record the received information. The receiving module of the multimedia interaction module 128 may periodically or intermittently perform the aforementioned operation 304 to dynamically receive the latest information generated by the location detection circuit 110 or other electronic devices, and then update the record related to the spatial locations and the orientations of the electronic devices 120-*a*~120-*n*.

When a user of the source electronic device 120-*c* manipulates the source electronic device 120-*c*, the determining module of the multimedia interaction module 128-*c* performs the operation 306 to determine whether the user instructs to transmit a target image object toward a selected direction Ds at this time. If the user's manipulation is not related to the target image object, the control circuit 121-*c* performs a corresponding operation according to the user's manipulation.

If the user of the source electronic device 120-*c* performs a predetermined manipulation (such as a particular touch control scheme, a particular mouse manipulation, or issuing a particular voice control command) to the source electronic device 120-*c* to instruct the source electronic device 120-*c* to transmit the target image object toward the selected direction Ds, the determining module of the multimedia interaction module 128-*c* performs the operation 308.

In the operation 308, the determining module of the multimedia interaction module 128-*c* may sequentially select one of other electronic devices except the source electronic device 120-*c* as a candidate electronic device, and then determine whether a relative position between the selected candidate electronic device and the selected direction Ds satisfies a first predetermined condition according to the latest information related to a spatial location and an orientation of the selected candidate electronic device. If the determining module of the multimedia interaction module 128-*c* determines that the relative position between a first candidate electronic device and the selected direction Ds satisfies the first predetermined condition, a selecting module of the multimedia interaction module 128-*c* performs the operation 310. On the contrary, if the determining module of the multimedia interaction module 128-*c* determines that each of the relative positions between the other candidate electronic devices of the multimedia interaction system 100 and the selected direction Ds does not satisfy the first predetermined condition, the determining module of the multimedia interaction module 128-*c* performs the operation 422 of FIG. 4.

In the operation 310, the selecting module of the multimedia interaction module 128-*c* selects a candidate electronic device as a basis electronic device only if a relative position between the candidate electronic device and the selected direction Ds satisfies the first predetermined condition. For example, in this embodiment, the selecting module of the multimedia interaction module 128-*c* selects the aforementioned first candidate electronic device as a basis electronic device.

In the operation 312, a target direction decision module of the multimedia interaction module 128-*c* decides a target direction Dt according to a location of the basis electronic device and the aforementioned selected direction Ds.

Then, the multimedia interaction module 128-*c* performs the operation 414 in FIG. 4.

In the operation 414, the determining module of the multimedia interaction module 128-*c* may sequentially select one of other electronic devices except the source electronic device 120-*c* and the basis electronic device as a candidate electronic device, and then determine whether a relative position between the selected candidate electronic device and the target direction Dt satisfies a second predetermined condition according to the latest information related to a spatial location and an orientation of the selected candidate electronic device. For example, for a second candidate electronic device of the multimedia interaction system 100, if the relative position between the second candidate electronic device and the target direction Dt satisfies the second predetermined condition, the transmitting module of the multimedia interaction module 128-*c* performs the operation 416. On the contrary, if the determining module of the multimedia interaction module 128-*c* determines that each of the relative positions between the second candidate electronic device and the target direction Dt does not satisfy the second predetermined condition, the determining module of the multimedia interaction module 128-*c* performs the operation 422.

In the operation 416, the transmitting module of the multimedia interaction module 128-*c* utilizes a communication circuit 125-*c* to transmit a target command corresponding to the target image object and the user's instructions to a candidate electronic device that satisfies the second predetermined condition. The aforementioned target command may comprise one or more commands utilized by the electronic device 120-*c* to configure, control, change, or adjust the multimedia contents presented in a display of the candidate electronic device. The target command may comprise parameters related to image attributes, such as the shape, size, color, position, lasting time, moving direction, moving speed, or the like of one or more image objects.

In the operation 418, a multimedia interaction module of the candidate electronic device utilizes a communication circuit of the candidate electronic device to receive the target command.

In the operation 420, the multimedia interaction module of the candidate electronic device utilizes the display to perform a multimedia operation corresponding to the target image object according to the target command. For example, the multimedia interaction module of the candidate electronic device may utilize the control circuit to configure or adjust the image attributes, such as the shape, size, color, position, lasting time, moving direction, moving speed, or the like of one or more image objects corresponding to the target image object to generate one or more corresponding images and display the one or more corresponding images in the display to achieve a multimedia interaction operation.

In practice, the determining module of the multimedia interaction module 128-*c* may perform the determination of the aforementioned operation 414 for each of the other electronic devices except the source electronic device 120-*c* and the basis electronic device, so as to find all candidate electronic devices that satisfy the second predetermined condition. Alternatively, the determining module of the multimedia interaction module 128-*c* may finish the operation 414 once the determining module of the multimedia interaction module 128-*c* finds a candidate electronic device that satisfies the second predetermined condition of the operation 414, and omit the determination of the relative position between the target direction Dt and each of other electronic devices.

In the operation 422, the determining module of the multimedia interaction module 128-*c* refuses to transmit the target command to the candidate electronic device.

In the operation 424, the display module of the multimedia interaction module 128-*c* may utilize the display 127-*c* (hereinafter, a source display), a speaker, a luminance circuit, a vibrator, or the like of the source electronic device 120-*c* to present a corresponding multimedia effect indicating that the multimedia interaction module 128-*c* refused to transmit the target command to the candidate electronic device. For example, the display module of the multimedia interaction module 128-*c* may control the display 127-*c* to present an animation effect showing that the target image object collides with an edge of the display 127-*c* and then rebounds. The display module of the multimedia interaction module 128-*c* may control the speaker to produce a particular sound effect. The display module of the multimedia interaction module 128-*c* may control the vibrator to perform a particular vibration mode. The display module of the multimedia interaction module 128-*c* may control the luminance circuit (such as a LED or a flashlight) to present a particular vision effect. The display module of the multimedia interaction module 128-*c* may utilize various combination of the aforementioned devices to present particular multimedia effect in order to notify the user of that the source electronic device 120-*c* does not transmit the target image object or the target command to the candidate electronic device.

As can be appreciated from the aforementioned descriptions, if each of the other electronic devices of the multimedia interaction system 100 does not satisfy the first predetermined condition, the source electronic device 120-*c* does not select the basis electronic device, and does not transmit the target command to the other electronic devices, so as to prevent the other electronic devices from performing the multimedia operation corresponding to the target image object. Additionally, if the source electronic device 120-*c* selects a basis electronic device from the multiple candidate electronic devices but each of the other candidate electronic devices does not satisfy the second predetermined condition, the source electronic device 120-*c* does not transmit the target command to other candidate electronic devices, so as to prevent other candidate electronic devices from performing the multimedia operation corresponding to the target image object. In other words, only if the source electronic device 120-*c* finds a first candidate electronic device satisfying the first predetermined condition as the basis electronic device and finds a second candidate electronic device satisfying the second predetermined condition, the source electronic device 120-*c* is allowed to transmit a target command corresponding to the target image object to the second candidate electronic device, so that the second candidate electronic device utilizes a corresponding display to perform a multimedia operation corresponding to the target image object according to the target command. Accordingly, by adopting the multimedia interaction method of FIGS. 3 and 4, the multimedia interaction system 100 is enabled to effectively prevent strange or unreasonable multimedia interaction results from occurring.

The operations of the source electronic device 120-*c* in the aforementioned operation 308 will be further described below by reference to FIGS. 5~11.

FIGS. 5~11 show simplified schematic diagrams of different types of relative position among partial electronic devices in the multimedia interaction system 100 when the user of the source electronic device 120-*c* instructs the source electronic device 120-*c* to transmit a target image object 500 toward a selected direction Ds according to several embodiments of the present disclosure.

In practice, the source electronic device 120-*c* may determine whether the relative position between a candidate electronic device and the selected direction Ds satisfies the first predetermined condition in the aforementioned operation 308 according to three dimensional coordinates of the candidate electronic device.

In a first embodiment of the operation 308, the aforementioned first predetermined condition specifies that the candidate electronic device is positioned on a selected path Ps to which the selected direction Ds points.

In a second embodiment of the operation 308, the aforementioned first predetermined condition specifies that a distance between a location of the candidate electronic device and the selected path Ps is less than a first predetermined distance value R1*s*.

In a third embodiment of the operation 308, the aforementioned first predetermined condition specifies that the selected path Ps passes through any part of the display of the candidate electronic device.

In a fourth embodiment of the operation 308, the aforementioned first predetermined condition specifies that the candidate electronic device is positioned on a selected vertical plane (not shown), in which the selected path Ps resides, and the selected vertical plane is perpendicular to a ground.

In a fifth embodiment of the operation 308, the aforementioned first predetermined condition specifies that a distance between the location of the candidate electronic device and the selected vertical plane is less than the first predetermined distance value R1s.

Figure 5:
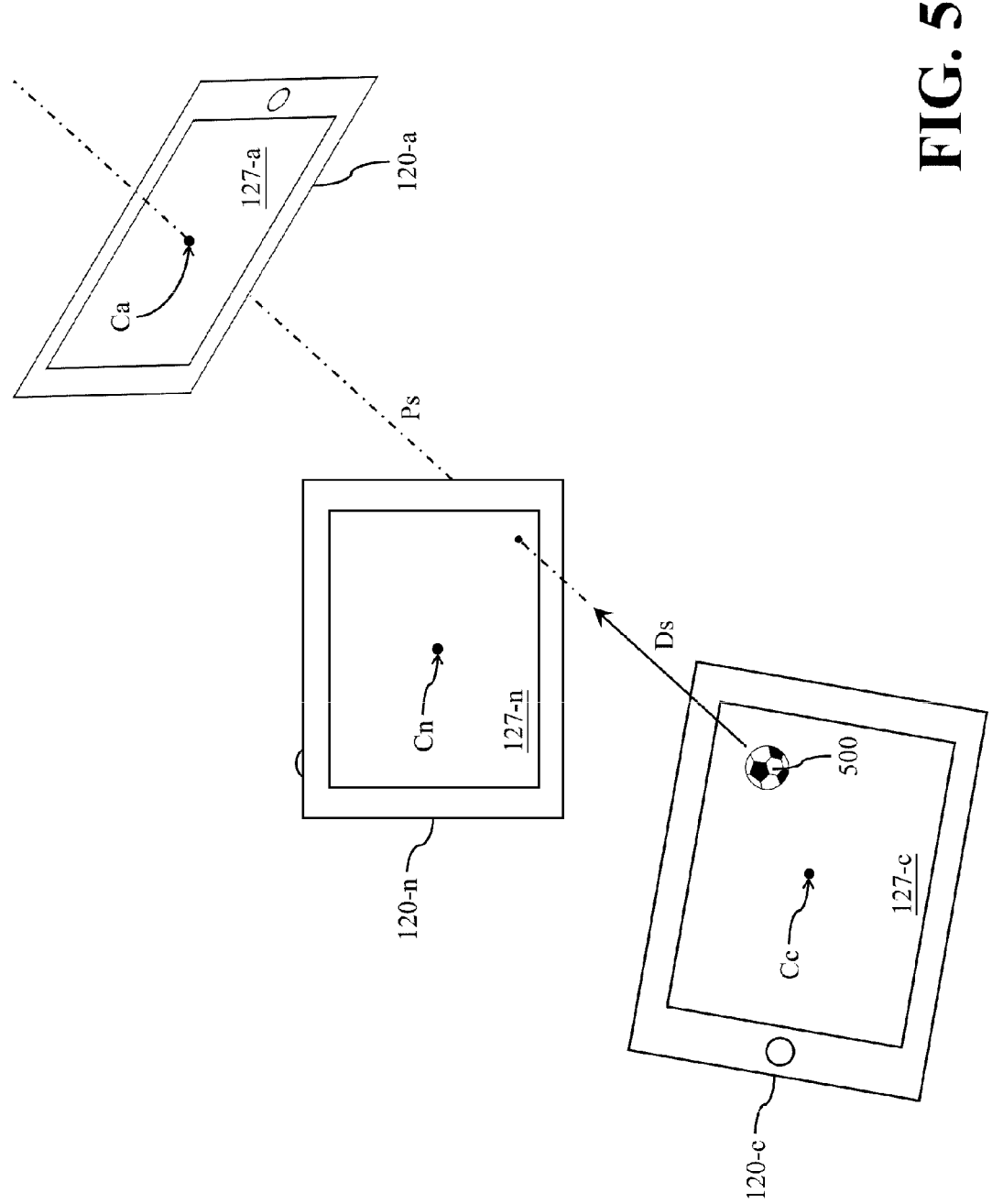
FIGS. 5~11 show simplified schematic diagrams of different types of relative position among partial electronic devices in FIG. 1 according to several embodiments of the present disclosure.

In the pattern of FIG. 5, the selected path Ps to which the selected direction Ds points passes through the centroid Ca of the display 127-a. This means that the electronic device 120-a is positioned on the selected path Ps and also positioned on the selected vertical plane in which the selected path Ps resides. Since the electronic device 120-a is positioned on the selected path Ps and the selected vertical plane, a distance between the location of the electronic device 120-a and the selected path Ps is zero, and a distance between the location of the electronic device 120-a and the selected vertical plane is zero as well. As shown in FIG. 5, the selected path Ps passes through the display 127-n but does not pass through the centroid Cn of the display 127-n, which means that the electronic device 120-n is not positioned on the selected path Ps and not positioned on the selected vertical plane in which the selected path Ps resides.

Accordingly, for the pattern of FIG. 5, when the candidate electronic device is the electronic device 120-a, the determining module of the multimedia interaction module 128-c determines that a relative position between the selected direction Ds and the location of the electronic device 120-a satisfies the first predetermined condition in the aforementioned first to fifth embodiments. When the candidate electronic device is the electronic device 120-n, the determining module of the multimedia interaction module 128-c determines that a relative position between the selected direction Ds and the electronic device 120-n satisfies the first predetermined condition in the aforementioned third embodiment, but determines that the relative position between the selected direction Ds and the electronic device 120-n does not satisfy the first predetermined condition in the aforementioned first or fourth embodiment.

Figure 6:
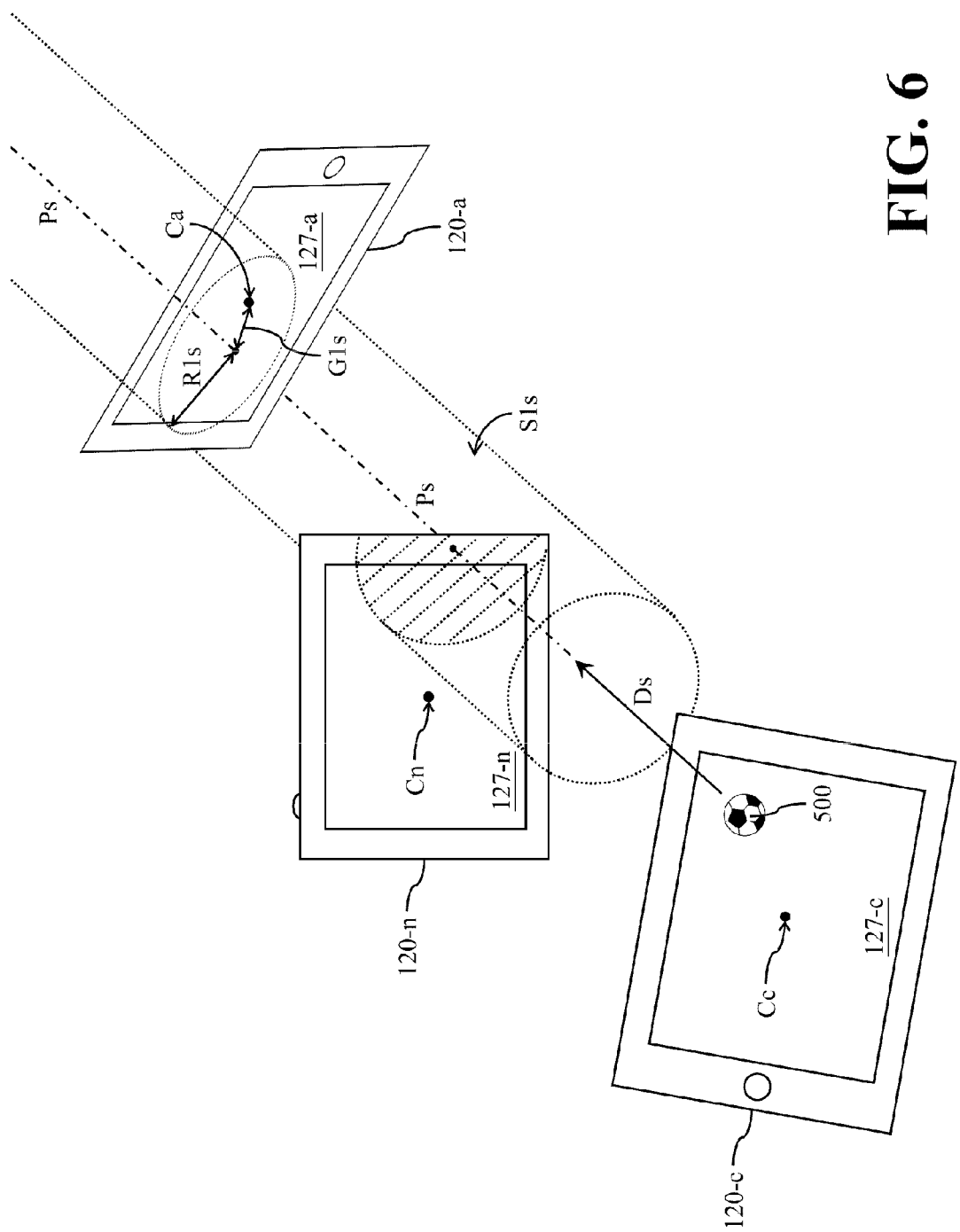

In the pattern of FIG. 6, the selected path Ps to which the selected direction Ds points passes through a region of the display 127-a but does not pass through the centroid Ca of the display 127-a. This means that the electronic device 120-a is not positioned on the selected path Ps and not positioned on the selected vertical plane in which the selected path Ps resides. A distance between the centroid Ca and the selected path Ps is G1s, which means that the distance between the location of the electronic device 120-a and the selected path Ps is G1s. In addition, the selected path Ps passes through a peripheral region of the electronic device 120-n but does not pass through the region of the display 127-n, which means that the electronic device 120-n is not positioned on the selected path Ps and not positioned on the selected vertical plane in which the selected path Ps resides. As shown in FIG. 6, the distance G1s between the centroid Ca of the display 127-a and the selected path Ps is less than the first predetermined distance value R1s, but a distance between the centroid Cn of the display 127-n and the selected path Ps is apparently greater than the first predetermined distance value R1s.

Accordingly, for the pattern of FIG. 6, when the candidate electronic device is the electronic device 120-a, the determining module of the multimedia interaction module 128-c determines that the relative position between the selected direction Ds and the electronic device 120-a satisfies the first predetermined condition in the aforementioned second, third, and fifth embodiments, but determines that the relative position between the selected direction Ds and the electronic device 120-a does not satisfy the first predetermined condition in the aforementioned first and fourth embodiments. When the candidate electronic device is the electronic device 120-n, the determining module of the multimedia interaction module 128-c determines that the relative position between the selected direction Ds and the candidate electronic device 120-n does not satisfy the first predetermined condition in the aforementioned first to fifth embodiments.

In a sixth embodiment of the operation 308, the aforementioned first predetermined condition specifies that the candidate electronic device is positioned in a pillar region S1s to which the selected direction Ds points, wherein the selected direction Ds is an axis of the pillar region S1s and a radius of the pillar region S1s is the first predetermined distance value R1s.

In the pattern of FIG. 6, the centroid Ca of the display 127-a is positioned within the pillar region S1s to which the selected direction Ds points. This means that the electronic device 120-a is positioned in the pillar region S1s. The centroid Cn of the display 127-n is positioned outside the pillar region S1s, which means that the electronic device 120-n is not positioned in the pillar region S1s.

Accordingly, for the pattern of FIG. 6, when the candidate electronic device is the electronic device 120-a, the determining module of the multimedia interaction module 128-c determines that the relative position between the selected direction Ds and the candidate electronic device 120-a satisfies the first predetermined condition in the aforementioned sixth embodiment. When the candidate electronic device is the electronic device 120-n, the determining module of the multimedia interaction module 128-c determines that the relative position between the selected direction Ds and the candidate electronic device 120-n does not satisfy the first predetermined condition in the aforementioned sixth embodiment.

In a seventh embodiment of the operation 308, the aforementioned first predetermined condition specifies that the candidate electronic device is positioned in a pyramidal or cone region S2s to which the selected direction Ds points, wherein the selected direction is an axis of the pyramidal or cone region S2s, a location of the target image object 500 is an apex of the pyramidal or cone region S2s, and a vertex angle of the pyramidal or cone region S2s is an acute angle. In practice, the pyramidal or cone region S2s may be a pyramidal region or a cone region.

Figure 7:
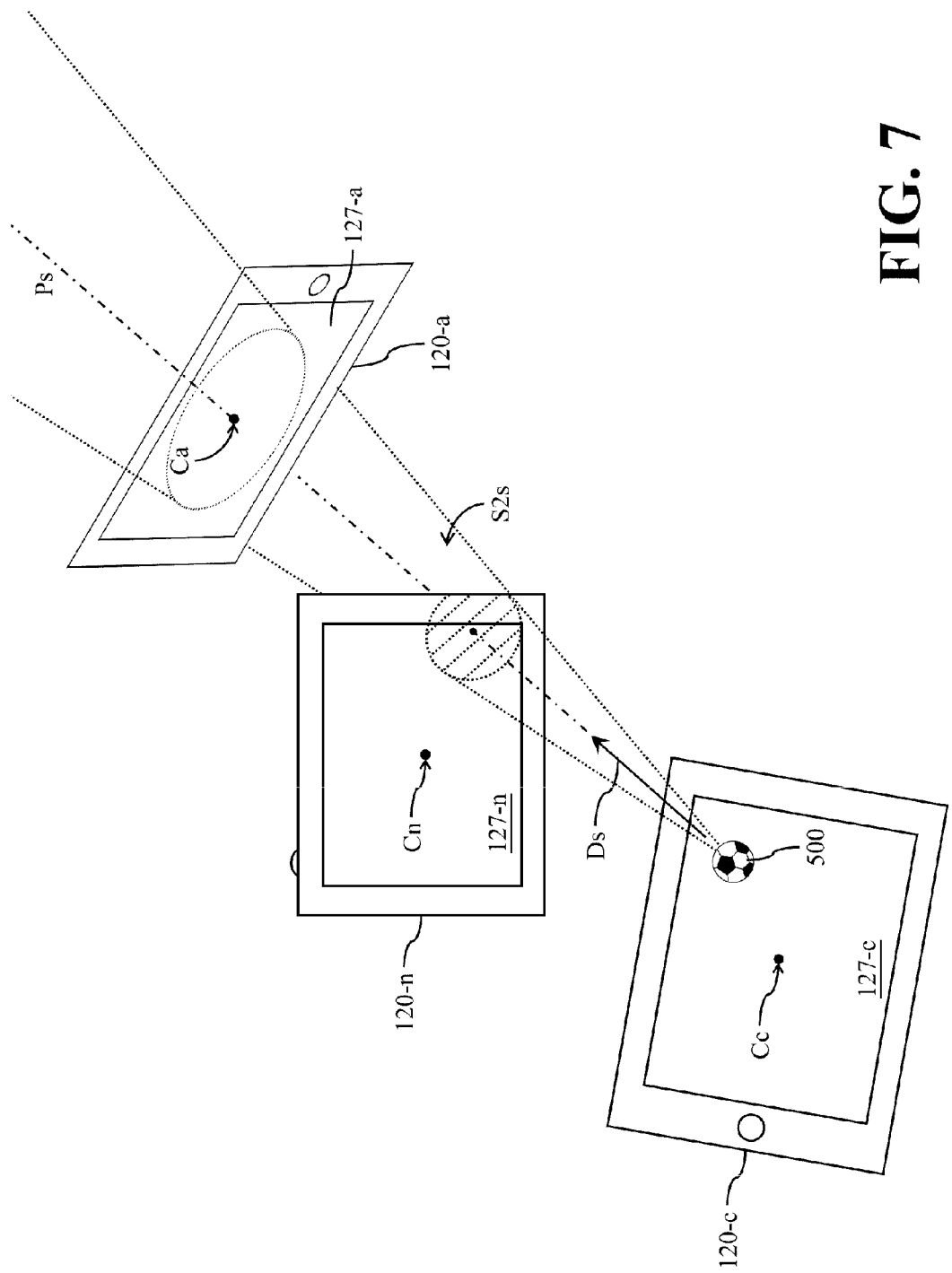

In the pattern of FIG. 7, the pyramidal or cone region S2s is a cone region and the centroid Ca of the display 127-a is positioned within the cone region S2s, which means that the electronic device 120-a is positioned in the cone region S2s. The centroid Cn of the display 127-n is positioned outside the cone region S2s, which means that the electronic device 120-n is not positioned in the cone region S2s.

Accordingly, for the pattern of FIG. 7, when the candidate electronic device is the electronic device 120-a, the determining module of the multimedia interaction module 128-c determines that the relative position between the selected direction Ds and the electronic device 120-a satisfies the first predetermined condition in the aforementioned seventh embodiment. When the candidate electronic device is the electronic device 120-n, the determining module of the multimedia interaction module 128-c determines that the relative position between the selected direction Ds and the electronic device 120-n does not satisfy the first predetermined condition in the aforementioned seventh embodiment.

Figure 8:
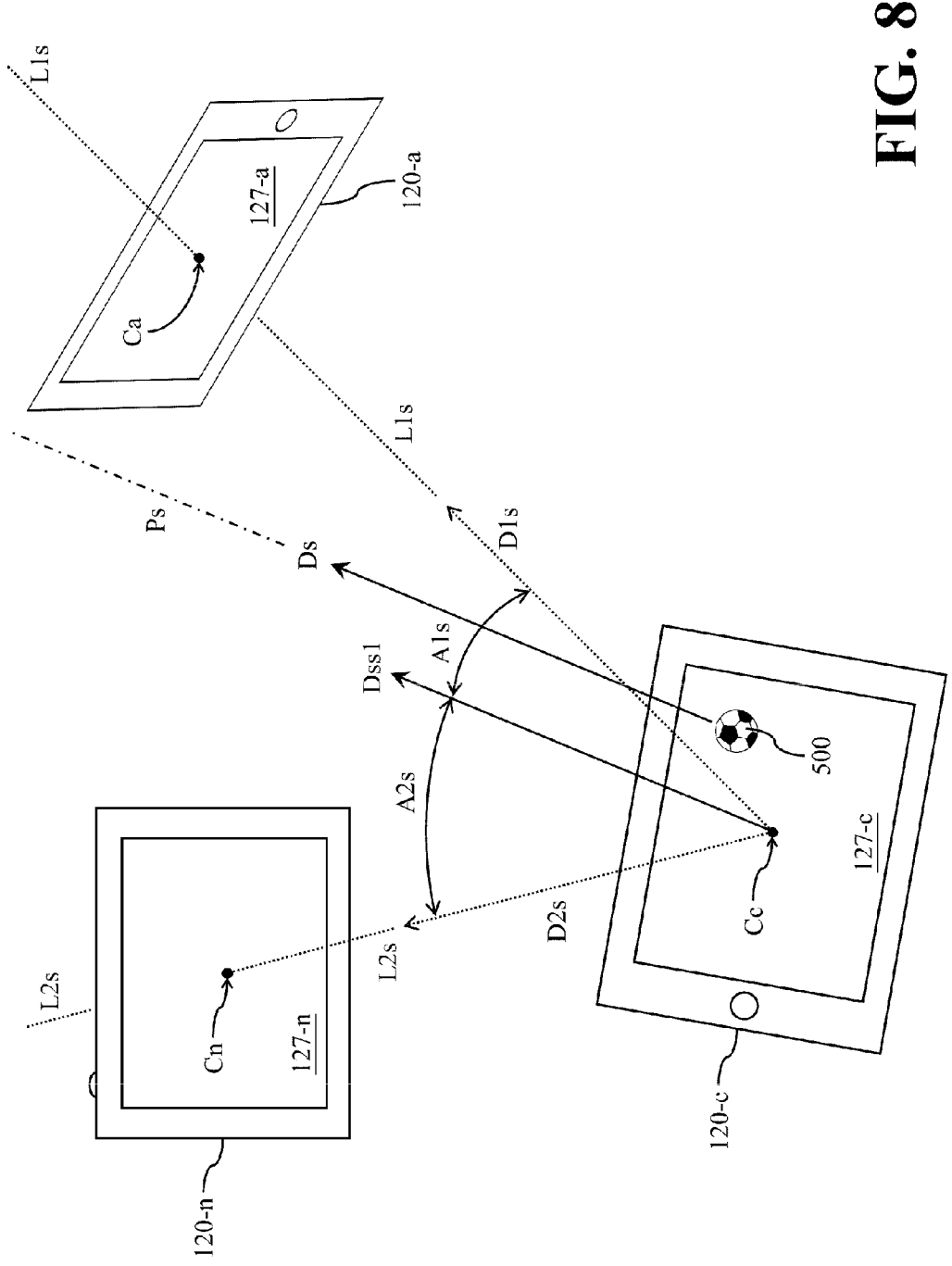

In an eighth embodiment of the operation 308, the aforementioned first predetermined condition specifies that the selected direction Ds is parallel to a first reference shifted direction Dss1, a first reference included angle between the first reference shifted direction Dss1 and a first reference direction is an acute angle and less than a reference angle As, wherein a location of the source electronic device 120-c is a starting point of both the first reference shifted direction Dss1 and the first reference direction, and the first reference direction points to the location of the candidate electronic device In the pattern of FIG. 8, the determining module of the multimedia interaction module 128-c may shift the selected direction Ds so that the location of the source electronic device 120-c (e.g., the location of the centroid Cc in this embodiment) becomes the starting point of the shifted version of the selected direction Ds. The determining module of the multimedia interaction module 128-c then utilizes the shifted version of the selected direction Ds as the first reference shifted direction Dss1. When the candidate electronic device is the electronic device 120-a, the first reference direction is a direction D1s that points to the centroid Ca of the display 127-a, and the centroid Cc of the display 127-c is the starting point of the direction D1s. A line L1s to which the direction D1s points passes through the centroid Ca of the display 127-a. The first reference included angle is an included angle A1s between the direction D1s and the first reference shifted direction Dss1. The included angle A1s is determined by the distance between the location of the candidate electronic device 120-a and the selected path Ps to which the selected direction Ds points to some extent. In this embodiment, the smaller the included angle A1s, the closer the location of the candidate electronic device 120-a to the selected path Ps. Accordingly, if the included angle A1s is an acute angle and smaller than the reference angle As, the determining module of the multimedia interaction module 128-c determines that the relative position between the selected direction Ds and the candidate electronic device 120-a satisfies the first predetermined condition in the aforementioned eighth embodiment. On the contrary, if the included angle A1s is greater than the reference angle As, the determining module of the multimedia interaction module 128-c determines that the relative position between the selected direction Ds and the candidate electronic device 120-a does not satisfy the first predetermined condition in the aforementioned eighth embodiment.

In the pattern of FIG. 8, when the candidate electronic device is the electronic device 120-n, the first reference direction is a direction D2s that points to the centroid Cn of the display 127-n, and the centroid Cc of the display 127-c is the starting point of the direction D2s. A line L2s to which the direction D2s points passes through the centroid Cn of the display 127-n. The first reference included angle is an included angle A2s between the direction D2s and the first reference shifted direction Dss1. The included angle A2s is determined by the distance between the location of the candidate electronic device 120-n and the selected path Ps to which the selected direction Ds points to some extent. In this embodiment, the smaller the included angle A2s, the closer the location of the candidate electronic device 120-n to the selected path Ps. Accordingly, if the included angle A2s is an acute angle and smaller than the reference angle As, the determining module of the multimedia interaction module 128-c determines that the relative position between the selected direction Ds and the electronic device 120-n satisfies the first predetermined condition in the aforementioned eighth embodiment. On the contrary, if the included angle A2s is greater than the reference angle As, the determining module of the multimedia interaction module 128-c determines that the relative position between the selected direction Ds and the electronic device 120-n does not satisfy the first predetermined condition in the aforementioned eighth embodiment.

In the patterns illustrated in the aforementioned FIG. 8 and some of the following drawings, if the centroids Cc, Ca, and Cn are not positioned on a same spatial plane, the selected direction Ds, the direction D1s, and the direction D2s are not positioned on the same spatial plane. In this situation, the first reference shifted direction Dss1, the direction D1s, and the direction D2s are not positioned on the same spatial plane as well.

If the relative position between the selected direction Ds and the candidate electronic device satisfies the first predetermined condition specified in any of the aforementioned first to eighth embodiments, it means that the candidate electronic device is positioned near the selected path Ps to which the selected direction Ds points, and the distance between the candidate electronic device and the selected path Ps is within an error tolerance range. Accordingly, the source electronic device 120-c may select the candidate electronic device as a basis electronic device. When the multimedia interaction system 100 wants to create a multimedia interaction effect showing that the target image object 500 is transmitted from the source electronic device 120-c to the basis electronic device near the selected path Ps to which the selected direction Ds points, and then the target image object 500 is transmitted from the basis electronic device to another candidate electronic device, the source electronic device 120-c may select a single candidate electronic device that satisfies the first predetermined condition specified in any of the aforementioned first to eighth embodiments from the other electronic devices of the multimedia interaction system 100 as the basis electronic device.

In practice, the determining module of the multimedia interaction module 128-c may perform the determination of the aforementioned operation 308 for each of the other electronic devices of the multimedia interaction system 100 to find a candidate electronic device that satisfies the first predetermined condition the most. Alternatively, the determining module of the multimedia interaction module 128-c may finish the operation 308 once the determining module of the multimedia interaction module 128-c finds a candidate electronic device that satisfies the first predetermined condition of the operation 308, and omit the determination of the relative position between each of other electronic devices and the selected direction Ds.

In addition, if the multimedia interaction application being carried out by the multimedia interaction system 100 does not demand a highly accurate determination for the relative position between the candidate electronic device and the selected direction Ds, the multimedia interaction system 100 may loosen the aforementioned first predetermined distance value R1s or the reference angle As. On the contrary, if the multimedia interaction application demands a higher accurate determination for the relative position between the candidate electronic device and the selected direction Ds, the multimedia interaction system 100 may lower the aforementioned first predetermined distance value R1s or the reference angle As, or simply adopt the configuration of the first predetermined condition in the first embodiment.

In a ninth embodiment of the operation 308, the aforementioned first predetermined condition specifies that a second reference included angle between the first reference shifted direction Dss1 and a second reference direction is an acute angle and the first reference included angle is less than the second reference included angle, wherein the location of the source electronic device 120-c is a starting point of the second reference direction, and the second reference direction points to a location of a reference electronic device of the multimedia interaction system 100.

In the pattern of FIG. 8, when the candidate electronic device is the electronic device 120-a, the determining module of the multimedia interaction module 128-c selects another electronic device near the selected path Ps, such as the electronic device 120-n, as a reference electronic device. In this situation, the first reference direction is the direction D1s that points to the centroid Ca of the display 127-a, and the centroid Cc of the display 127-c is the starting point of the direction D1s. The first reference included angle is the included angle A1s between the direction D1s and the first reference shifted direction Dss1. The second reference direction is the direction D2s that points to the centroid Cn of the display 127-n, and the centroid Cc of the display 127-c is the starting point of the direction D2s. The second reference included angle is the included angle A2s between the direction D2s and the first reference shifted direction Dss1. The included angle A2s is determined by the distance between the location of the reference electronic device 120-n and the selected path Ps to some extent. In this embodiment, the smaller the included angle A2s, the closer the reference electronic device 120-n to the selected path Ps. In the pattern of FIG. 8, since the included angle A1s is an acute angle and less than the included angle A2s, it means that the location of the candidate electronic device 120-a is closer to the selected path Ps than the reference electronic device 120-n. Accordingly, the determining module of the multimedia interaction module 128-c determines that the relative position between the selected direction Ds and the candidate electronic device 120-a satisfies the first predetermined condition in the ninth embodiment.

In the pattern of FIG. 8, when the candidate electronic device is the electronic device 120-n, the determining module of the multimedia interaction module 128-c selects another electronic device near the selected path Ps, such as the electronic device 120-a, as a reference electronic device. In this situation, the first reference direction is the direction D2s that points to the centroid Cn of the display 127-n, and the centroid Cc of the display 127-c is the starting point of the direction D2s. The first reference included angle is the included angle A2s between the direction D2s and the first reference shifted direction Dss1. The second reference direction is the direction D1s that points to the centroid Ca of the display 127-a, and the centroid Cc of the display 127-c is the starting point of the direction D1s. The second reference included angle is the included angle A1s between the direction D1s and the first reference shifted direction Dss1. In the pattern of FIG. 8, since the included angle A2s is greater than the included angle A1s, it means that the location of the reference electronic device 120-a is closer to the selected path Ps to which the selected direction Ds points than the location of the electronic device 120-n. Accordingly, the determining module of the multimedia interaction module 128-c determines that the relative position between the selected direction Ds and the candidate electronic device 120-n does not satisfy the first predetermined condition in the aforementioned ninth embodiment.

When the selecting module of the multimedia interaction module 128-c wants to select a single candidate electronic device which is closest to the selected path Ps to which the selected direction Ds points as a basis electronic device, the configuration illustrated in the aforementioned ninth embodiment may be adopted to configure the first predetermined condition.

In a tenth embodiment of the operation 308, the aforementioned first predetermined condition specifies that the candidate electronic device is positioned on the selected path Ps, and a section of the selected path Ps between the source electronic device 120-c and the candidate electronic device does not contact with other electronic devices of the multimedia interaction system 100.

In an eleventh embodiment of the operation 308, the aforementioned first predetermined condition specifies that the distance between the location of the candidate electronic device and the selected path Ps is less than the first predetermined distance value R1s, and a section of the selected path Ps between the source electronic device 120-c and the candidate electronic device does not contact with other electronic devices of the multimedia interaction system 100.

In a twelfth embodiment of the operation 308, the aforementioned first predetermined condition specifies that the selected path Ps passes through the display of the candidate electronic device, and the section of the selected path Ps between the source electronic device 120-c and the candidate electronic device does not contact with other electronic devices of the multimedia interaction system 100.

In a thirteenth embodiment of the operation 308, the aforementioned first predetermined condition specifies that the candidate electronic device is positioned on the selected vertical plane in which the selected path Ps resides, and a section of the selected vertical plane between the source electronic device 120-c and the candidate electronic device does not contact with other electronic devices of the multimedia interaction system 100.

In a fourteenth embodiment of the operation 308, the aforementioned first predetermined condition specifies that the distance between the location of the candidate electronic device and the selected vertical plane is less than the first predetermined distance value R1s, and a section of the selected vertical plane between the source electronic device 120-c and the candidate electronic device does not contact with other electronic devices of the multimedia interaction system 100.

In the pattern of FIG. 5, the selected path Ps to which the selected direction Ds points passes through the centroid Ca of the display 127-a, which means that the electronic device 120-a is positioned on the selected path Ps and also positioned on the selected vertical plane in which the selected path Ps resides. Since the electronic device 120-a is positioned on the selected path Ps and the selected vertical plane, the distance between the electronic device 120-a and the selected path Ps is zero, and the distance between the electronic device 120-a and the selected vertical plane is zero as well.

In the pattern of aforementioned FIG. 5, a section of the selected path Ps between the source electronic device 120-c and the electronic device 120-a passes through the region of the display 127-n of the electronic device 120-n. In one aspect, this means that the section between the source electronic device 120-c and the electronic device 120-a is blocked by the electronic device 120-n.

Accordingly, for the pattern of FIG. 5, when the candidate electronic device is the electronic device 120-a, the determining module of the multimedia interaction module 128-c determines that the relative position between the selected direction Ds and the candidate electronic device 120-a does not satisfy the first predetermined condition in the aforementioned tenth to fourteenth embodiments.

If the relative position between the selected direction Ds and the candidate electronic device satisfies the first predetermined condition specified in any of the aforementioned tenth to fourteenth embodiments, it means that the candidate electronic device is positioned near the selected path Ps to which the selected direction Ds points, the distance between the candidate electronic device and the selected path Ps is within an error tolerance range, and no other electronic device is positioned between the candidate electronic device and the source electronic device 120-c. Accordingly, when the multimedia interaction system 100 wants to create a multimedia interaction effect where the target image object can be transmitted from the source electronic device 120-c to the candidate electronic device only if no other electronic device is positioned between the candidate electronic device and the source electronic device 120-c, by adopting the configuration of the first predetermined condition illustrated in any of the aforementioned tenth to fourteenth embodiments, the multimedia interaction system 100 is enabled to prevent the candidate electronic device from receiving the target image object under the situation where there is other electronic device blocking between the candidate electronic device and the source electronic device 120-c, or to prevent similar unexpected results.

In a fifteenth embodiment of the operation 308, the aforementioned first predetermined condition specifies that a third reference included angle is defined by the aforementioned first reference direction and the aforementioned second reference direction, and the aforementioned first reference included angle is less than a half of the third reference included angle.

In a sixteenth embodiment of the operation 308, the aforementioned first predetermined condition specifies that a second reference vertical plane (not shown), in which the aforementioned second reference direction resides, divides a space into a first reference space and a second reference space, wherein the second reference vertical plane is perpendicular to the ground, the selected direction Ds points to the first reference space, and the candidate electronic device is positioned in the first reference space.

Figure 9:
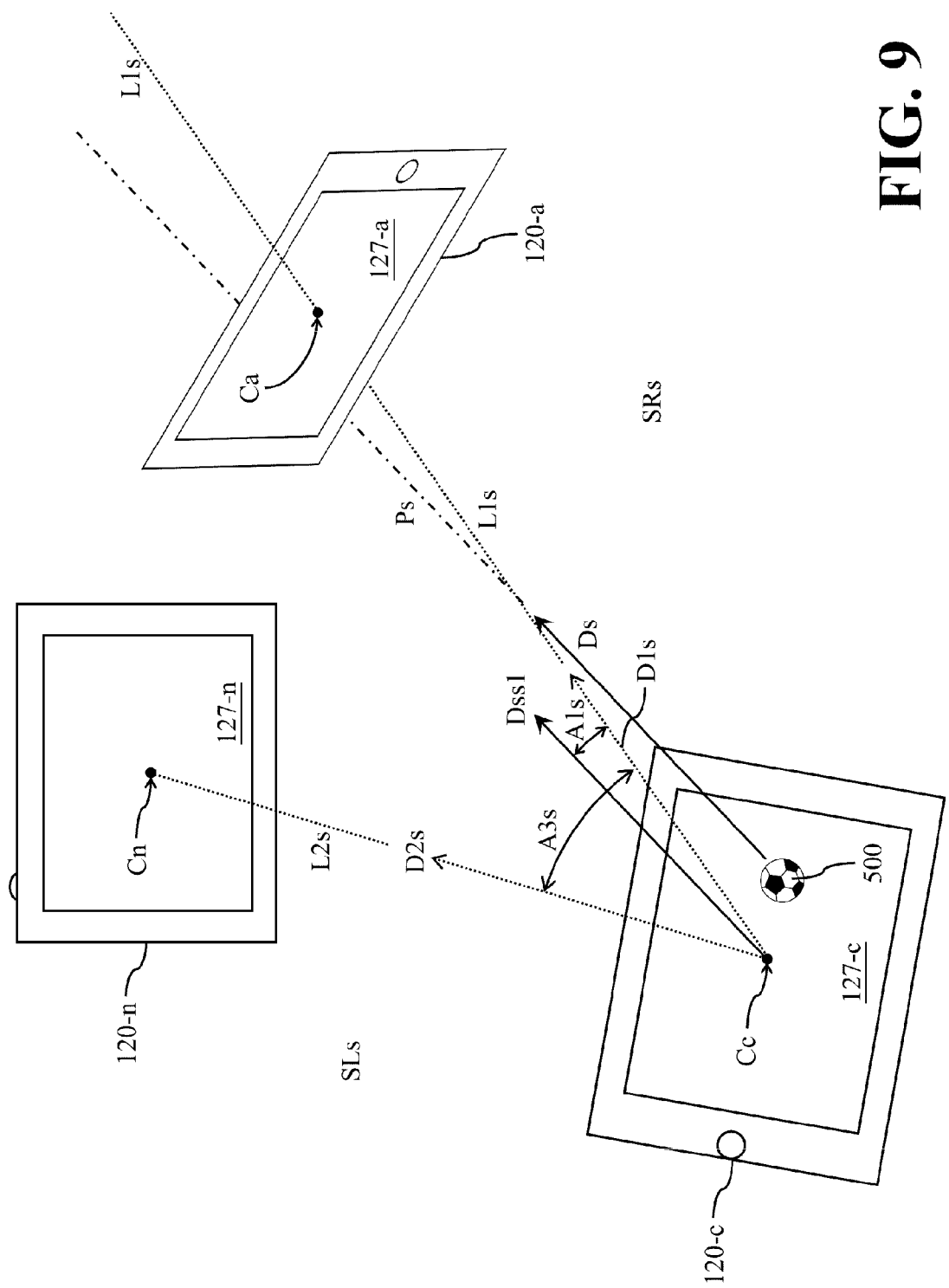

In the pattern of FIG. 9, when the candidate electronic device is the electronic device 120-a, the determining module of the multimedia interaction module 128-c selects another electronic device near the selected path Ps, such as the electronic device 120-n, as a reference electronic device. In this situation, the first reference direction is the direction D1s that points to the centroid Ca of the display 127-a, and the centroid Cc of the display 127-c is the starting point of the direction D1s. The first reference included angle is the included angle A1s between the direction D1s and the first reference shifted direction Dss1. The second reference direction is the direction D2s that points to the centroid Cn of the display 127-n, and the centroid Cc of the display 127-c is the starting point of the direction D2s. The third reference included angle is an included angle A3s between the direction D1s and the direction D2s. If the included angle A1s is less than a half of the included angle A3s, it means that the location of the candidate electronic device 120-a is closer to the selected path Ps than the location of the reference electronic device 120-n. In addition, the second reference vertical plane in which the direction D2s resides divides a space into a first reference space SRs and a second reference space SLs, wherein the second reference vertical plane is perpendicular to the ground. As shown in FIG. 9, the selected direction Ds points to the first reference space SRs, and the candidate electronic device 120-a is positioned in the first reference space SRs. Accordingly, the determining module of the multimedia interaction module 128-c determines that the relative position between the selected direction Ds and the candidate electronic device 120-a satisfies the first predetermined condition in the aforementioned fifteenth and sixteenth embodiments.

When the selecting module of the multimedia interaction module 128-c wants to select a single candidate electronic device which is closest to the selected path Ps as the basis electronic device, the configuration illustrated in the aforementioned fifteenth or sixteenth embodiment may be adopted to configure the first predetermined condition.

In a seventeenth embodiment of the operation 308, the aforementioned first predetermined condition specifies that a source vertical plane (not shown), in which an orientation direction Dc (hereinafter, source orientation direction Dc) of the source electronic device 120-c resides, refers the location of the source electronic device 120-c as an axis and rotates a first reference viewing angle VA1s toward two sides of the axis to define a source viewing angle space, wherein the source vertical plane is perpendicular to the ground, the source vertical plane divides the source viewing angle space into a first half reference space and a second half reference space, the selected direction Ds points to the first half reference space, and the candidate electronic device is positioned in the first half reference space. Meanwhile, a candidate vertical plane (not shown), in which an orientation direction (hereinafter, candidate orientation direction) of the candidate electronic device resides, refers the location of the candidate electronic device as an axis and rotates a second reference viewing angle VA2s toward two sides of the axis to define a first candidate viewing angle space, and the source electronic device 120-c is positioned in the first candidate viewing angle space, wherein the candidate vertical plane is perpendicular to the ground.

In an eighteenth embodiment of the operation 308, the aforementioned first predetermined condition specifies that a fourth reference included angle is defined by the source orientation direction Dc and the first reference shifted direction Dss1, a fifth reference included angle is defined by the aforementioned first reference direction and the source orientation direction Dc, and the fourth reference included angle and the fifth reference included angle are both less than the aforementioned first reference viewing angle VA1s. Meanwhile, a sixth reference included angle is defined by the candidate orientation direction of the candidate electronic device and a first reference inverse direction, and the sixth reference included angle is less than the aforementioned second reference viewing angle VA2s, wherein the location of the candidate electronic device is a starting point of the first reference inverse direction, and the first reference inverse direction points to the location of the source electronic device 120-c.

When the fifth reference included angle is less than the first reference viewing angle VA1s, it means that the candidate electronic device is positioned within the source viewing angle space of the source electronic device 120-c. When the sixth reference included angle is less than the second reference viewing angle VA2s, it means that the source electronic device 120-c is positioned within the first candidate viewing angle space of the candidate electronic device.

Figure 10:
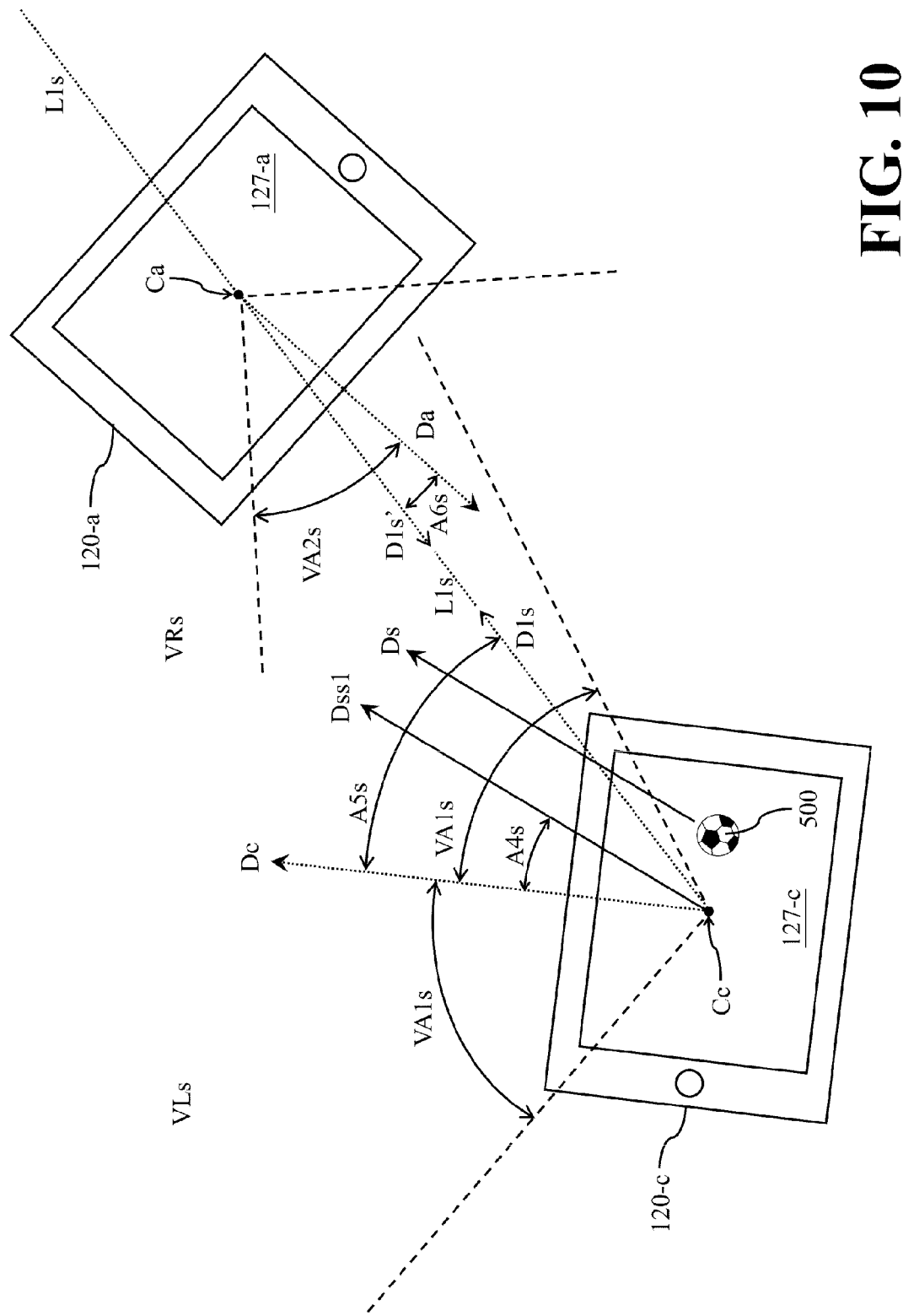

In the pattern of FIG. 10, the source vertical plane (not shown) in which the source orientation direction Dc resides refers the location of the source electronic device 120-c (e.g., the location of the centroid Cc in this embodiment) as an axis and rotates the first reference viewing angle VA1s toward two sides of the axis to define a source viewing angle space consisting of a right-half reference space VRs and a left-half reference space VLs. The centroid Ca of the display 127-a is positioned within the right-half reference space VRs, which means that the electronic device 120-*a* is positioned within the right-half reference space VRs. As shown in FIG. 10, the selected direction Ds points to the right-half reference space VRs.

The fourth reference included angle is the included angle A4*s* between the source orientation direction Dc and the first reference shifted direction Dss1. When the included angle A4*s* is less than the first reference viewing angle VA1*s*, it means that the selected direction Ds points to the source viewing angle space of the source electronic device 120-*c*.

When the candidate electronic device is the electronic device 120-*a*, the first reference direction is the direction D1*s* that points to the centroid Ca of the display 127-*a*, and the centroid Cc of the display 127-*c* is the starting point of the direction D1*s*. The determining module of the multimedia interaction module 128-*c* may shift the direction D1*s* so that the location of the candidate electronic device 120-*a* (e.g., the location of the centroid Ca in this embodiment) becomes a starting point of the shifted version of the direction D1*s*. The determining module of the multimedia interaction module 128-*c* then inverses the shifted version of the direction D1*s* and utilizes the inversed result of the shifted version of the direction D1*s* as a first reference inverse direction D1*s*'. In this situation, the fifth reference included angle is the included angle A5*s* between the direction D1*s* and the source orientation direction Dc. The sixth reference included angle is an included angle A6*s* between the first reference inverse direction D1*s*' and the candidate orientation direction Da of the candidate electronic device 120-*a*.

The candidate vertical plane (not shown) in which the candidate orientation direction Da of the candidate electronic device 120-*a* resides refers the location of the candidate electronic device 120-*a* (e.g., the location of the centroid Ca in this embodiment) as an axis and rotates the second reference viewing angle VA2*s* toward two sides of the axis to define a first candidate viewing angle space. As shown in FIG. 10, since the included angle A4*s* and the included angle A5*s* are both less than the first reference viewing angle VA1*s*, and the included angle A6*s* is less than the second reference viewing angle VA2*s*, the determining module of the multimedia interaction module 128-*c* determines that the relative position between the selected direction Ds and the candidate electronic device 120-*a* satisfies the first predetermined condition in the aforementioned seventeenth and eighteenth embodiments.

In the seventeenth embodiment, by restricting the fifth reference included angle to be less than the first reference viewing angle VA1*s* and restricting the sixth reference included angle to be less than the second reference viewing angle VA2*s*, the source electronic device 120 -*c* is allowed to select the candidate electronic device as the basis electronic device only if the relative position between the source electronic device 120-*c* and the candidate electronic device belongs to or is close to a face-to-face pattern.

In practice, the aforementioned first reference viewing angle VA1*s* may be the same as the second reference viewing angle VA2*s*, or may be different from the second reference viewing angle VA2*s*.

When the multimedia interaction system 100 wants to create a multimedia interaction effect where a candidate electronic device can be selected as the basis electronic device only if the relative position between the source electronic device 120-*c* and the candidate electronic device belongs to or is close to a face-to-face pattern, by adopting the configuration of the first predetermined condition illustrated in the aforementioned seventeenth or eighteenth embodiment, the multimedia interaction system 100 is enabled to prevent the candidate electronic device from being selected as the basis electronic device when the candidate electronic device is back to the source electronic device 120-*c*. On the other hand, by adopting the configuration of the first predetermined condition illustrated in the aforementioned seventeenth or eighteenth embodiment, the multimedia interaction system 100 is enabled to prevent the candidate electronic device from being selected as the basis electronic device when the source electronic device 120-*c* is back to the candidate electronic device.

In a nineteenth embodiment of the operation 308, the aforementioned first predetermined condition specifies that a seventh reference included angle is defined by the candidate orientation direction of the candidate electronic device and a first shifted direction, the aforementioned fourth reference included angle and the aforementioned fifth reference included angle are both less than the first reference viewing angle VA1*s*, and the seventh reference included angle is less than the second reference viewing angle VA2*s*, wherein the location of the candidate electronic device is a starting point of the first shifted direction, and the first shifted direction is parallel to the aforementioned first reference direction.

In a twentieth embodiment of the operation 308, the aforementioned first predetermined condition specifies that the selected direction Ds points to the aforementioned first half reference space, the candidate electronic device is positioned in the first half reference space, and the aforementioned seventh reference included angle is less than 90 degrees.

When the fifth reference included angle is less than the first reference viewing angle VA1*s*, it means that the candidate electronic device is positioned within the source viewing angle space of the source electronic device 120-*c*. When the seventh reference included angle is less than the second reference viewing angle VA2*s* or 90 degrees, it means that the candidate orientation direction Da of the candidate electronic device 120-*a* is back to the source electronic device 120-*c* to some extent, and it is also means that the user of the candidate electronic device 120-*a* may be back to the user of the source electronic device 120-*c* at that time.

Figure 11:
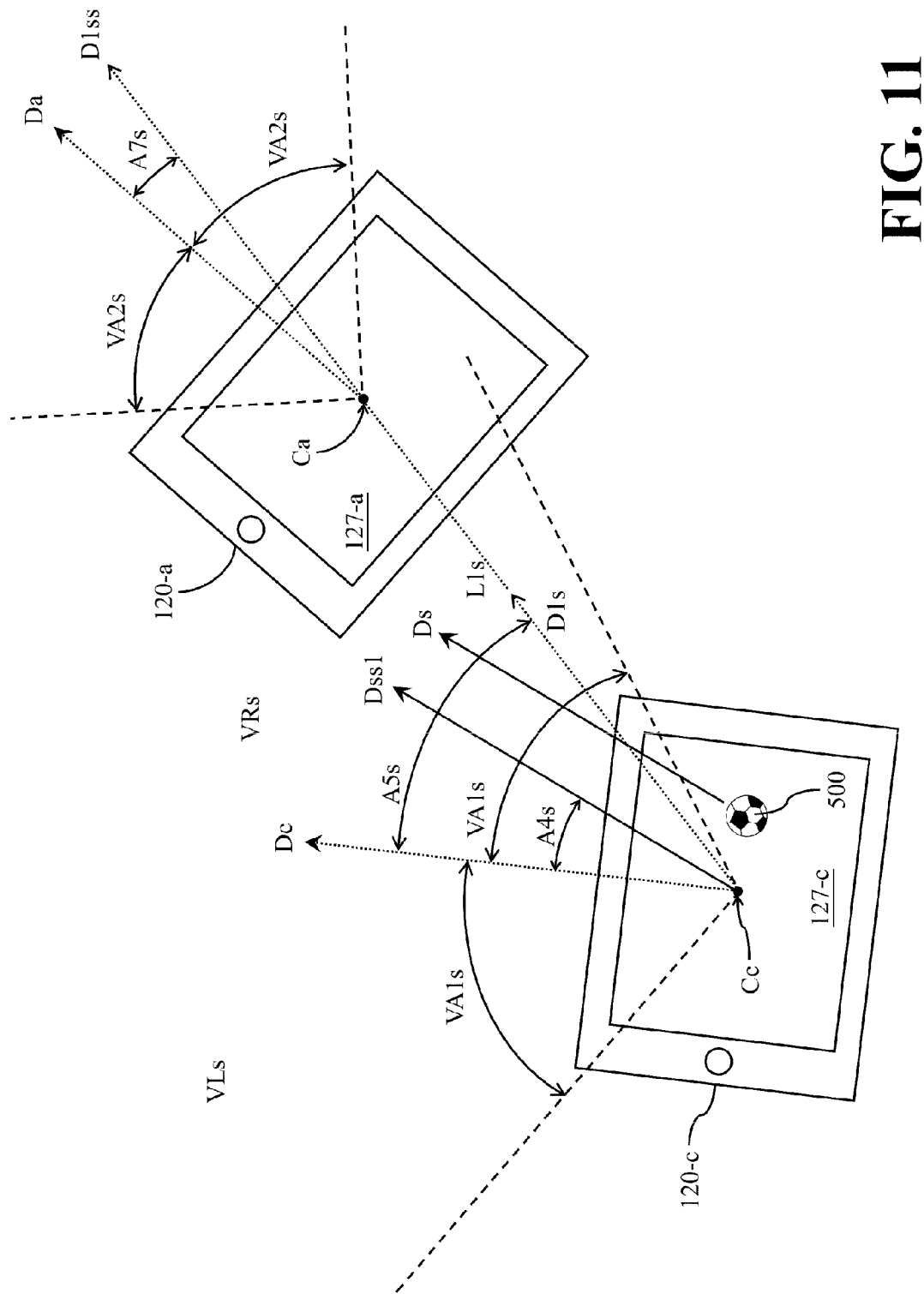

In the pattern of FIG. 11, the source vertical plane (not shown) in which the source orientation direction Dc resides refers the location of the source electronic device 120-*c* (e.g., the location of the centroid Cc in this embodiment) as an axis and rotates the first reference viewing angle VA1*s* toward two sides of the axis to define the source viewing angle space consisting of the right-half reference space VRs and the left-half reference space VLs. The centroid Ca of the display 127-*a* is positioned within the right-half reference space VRs, which means that the electronic device 120-*a* is positioned within the right-half reference space VRs. As shown in FIG. 11, the selected direction Ds points to the right-half reference space VRs.

Similarly, the fourth reference included angle is the included angle A4*s* between the source orientation direction Dc and the first reference shifted direction Dss1. When the included angle A4*s* is less than the first reference viewing angle VA1*s*, it means that the selected direction Ds points to the source viewing angle space of the source electronic device 120-*c*.

When the candidate electronic device is the electronic device 120-*a*, the determining module of the multimedia interaction module 128-*c* may shift the aforementioned first reference direction D1*s* so that the location of the candidate electronic device 120-*a* (e.g., the location of the centroid Ca in this embodiment) becomes a starting point of the shifted version of the first direction D1s. The determining module of the multimedia interaction module 128-c then utilizes the shifted version of the direction D1s as a first shifted direction D1ss. In this situation, the seventh reference included angle is the included angle A7s between the first shifted direction D1ss and the candidate orientation direction Da of the candidate electronic device 120-a.

As shown in FIG. 11, since the included angle A4s and the included angle A5s are both less than the first reference viewing angle VA1s, and the included angle A7s is less than the second reference viewing angle VA2s and also less than 90 degrees, the determining module of the multimedia interaction module 128-c determines that the relative position between the selected direction Ds and the candidate electronic device 120-a satisfies the first predetermined condition in the aforementioned nineteenth and twentieth embodiments.

In the nineteenth embodiment, by restricting the fifth reference included angle to be less than the first reference viewing angle VA1s and restricting the seventh reference included angle to be less than the second reference viewing angle VA2s, the source electronic device 120-c is allowed to select a candidate electronic device as the basis electronic device only if the relative position between the source electronic device 120-c and the candidate electronic device belongs to or is close to a pattern where the candidate electronic device is back to the source electronic device 120-c while the source electronic device 120-c faces to the candidate electronic device.

Similarly, the aforementioned first reference viewing angle VA1s may be the same as the second reference viewing angle VA2s, or may be different from the second reference viewing angle VA2s.

When the multimedia interaction system 100 wants to create a multimedia interaction effect where a candidate electronic device can to be selected as the basis electronic device only if the relative position between the source electronic device 120-c and the candidate electronic device belongs to or is close to the pattern that the candidate electronic device is back to the source electronic device 120-c while the source electronic device 120-c faces to the candidate electronic device, by adopting the configuration of the first predetermined condition illustrated in the aforementioned nineteenth or twentieth embodiment, the multimedia interaction system 100 is enabled to prevent the candidate electronic device from being selected to be the basis electronic device when the candidate electronic device faces to the source electronic device 120 -c. On the other hand, by adopting the configuration of the first predetermined condition illustrated in the aforementioned nineteenth or twentieth embodiment, the multimedia interaction system 100 is also enabled to prevent the candidate electronic device from being selected to be the basis electronic device when the source electronic device 120-c is back to the candidate electronic device.

In practice, the multimedia interaction system 100 may determine whether a relative position between the candidate electronic device and the selected direction Ds satisfies the first predetermined condition in the aforementioned operation 308 according to two dimensional coordinates of the candidate electronic device. The multimedia interaction system 100 may utilize the location detection circuit 110 to detect a projection location, a shape of a projection region, and an orientation on a same reference horizontal plane that is parallel to the ground for each of the electronic devices 120-a~120-n. In the multimedia interaction system 100, a projection location of a particular geometry characteristic of the electronic device 120, a projection location of a particular symbol of the electronic device 120, a projection location of a particular element of the electronic device 120, or a projection location of a particular region of the electronic device 120 on the reference horizontal plane may be utilized to represent a spatial location of the electronic device 120.

For example, the location detection circuit 110 may detect and utilize a projection location of the centroid of the electronic device 120 on the reference horizontal plane to represent the spatial location of the electronic device 120. Alternatively, the location detection circuit 110 may detect and utilize a projection location of the centroid of the display 127 on the reference horizontal plane to represent the spatial location of the electronic device 120.

Similarly, the location detection circuit 110 may cooperate with respective electronic devices 120-a~120-n to compute respective spatial locations of each of the electronic devices 120-a-120-n. For example, in the embodiment of FIG. 2, the location detection circuit 110 may detect and transmit two dimensional coordinates of the projections of multiple reference points of the electronic device 120 on the reference horizontal plane to the electronic device 120, and then the electronic device 120 utilizes the control circuit 121 to compute the projection location of the centroid of the electronic device 120 or the projection location of the centroid of the display 127 on the reference horizontal plane according to the received coordinates of the multiple reference points to represent the spatial location of the electronic device 120.

Since the electronic device 120 is typically equipped with a gyroscope (not shown), the control circuit 121 of the electronic device 120 may utilize the gyroscope to calculate an inclined angle of the electronic device 120. In addition, the length and width of the electronic device 120, the length and width of the display 127, and the spatial arrangement of the display 127 with respect to the electronic device 120 are given parameters. Accordingly, the determining module of the multimedia interaction module 128 is enabled to utilize the control circuit 121 to compute the projection location of the centroid of the electronic device 120 or the projection location of the centroid of the display 127 on the reference horizontal plane according to the coordinates of the aforementioned reference points to represent the spatial location of the electronic device 120.

Alternatively, the determining module of the multimedia interaction module 128 may utilize the control circuit 121 to compute a projection location of a particular geometry characteristic (such as a central location) of a multimedia interaction program window (such as a browser window) being displayed in the display 127 on the reference horizontal plane according to the received coordinates of the reference points to represent the spatial location of the electronic device 120. For example, in the embodiment of FIG. 2, the electronic device 120-a utilizes the display 127-a to display the target browser window 216, and the electronic device 120-b utilizes the display 127-b to display the target browser window 226. The size of the target browser window 216 displayed in the display 127-a and the relative position between the target browser window 216 and the display 127-a are configured by the control circuit 121-a, the size of the target browser window 216, and the relative position between the target browser window 216 and the display 127-a are known parameters to the control circuit 121-a. Accordingly, the location detection circuit 110 may detect and transmit the two dimensional coordinates of the projections of the reference points 211~214 of the electronic device 120-*a* on the reference horizontal plane to the electronic device 120-*a*, and then the determining module of the multimedia interaction module 128-*a* may utilize the control circuit 121-*a* to compute two dimensional coordinates of a projection location of the central location Wa of the target browser window 216 on the reference horizontal plane according to the coordinates of some or all of the reference points to represent the spatial location of the electronic device 120-*a*. Similarly, the size of the target browser window 226 displayed in the display 127-*b* and the relative position between the target browser window 226 and the display 127-*b* are configured by the control circuit 121-*b*, the size of the target browser window 226 and the relative position between the target browser window 226 and the display 127-*b* are known parameters to the control circuit 121-*b*. Accordingly, the location detection circuit 110 may detect and transmit the two dimensional coordinates of the projections of the reference points 221~224 of the electronic device 120-*b* on the reference horizontal plane to the electronic device 120-*b*, and then the determining module of the multimedia interaction module 128-*b* may utilize the control circuit 121-*b* to compute two dimensional coordinates of a projection location of the central location Wb of the target browser window 226 on the reference horizontal plane according to the coordinates of some or all of the reference points to represent the spatial location of the electronic device 120-*b*.

The operations of determining whether the relative position between the candidate electronic device and the selected direction Ds satisfies the first predetermined condition in the aforementioned operation 308 conducted by the source electronic device 120-*c* according to the two dimensional coordinates of the candidate electronic device will be further described below by reference to FIGS. 12~18.

FIGS. 12~18 show simplified schematic diagrams of different types of relative position among partial electronic devices in the multimedia interaction system 100 when the user of the source electronic device 120-*c* instructs the source electronic device 120-*c* to transmit the target image object 500 toward the selected direction Ds according to several embodiments of the present disclosure. In FIGS. 12~18, 120-*ap* denotes a projection region projected by the electronic device 120-*a* on the reference horizontal plane, 127-*ap* denotes a projection region projected by the display 127-*a* on the reference horizontal plane, and Cap denotes a projection location of the centroid Ca of the display 127-*a* on the reference horizontal plane. 120-*bp* denotes a projection region projected by the electronic device 120-*b* on the reference horizontal plane, 127-*bp* denotes a projection region projected by the display 127-*b* on the reference horizontal plane, and Cbp denotes a projection location of the centroid Cb of the display 127-*b* on the reference horizontal plane. 120-*cp* denotes a projection region projected by the electronic device 120-*c* on the reference horizontal plane, 127-*cp* denotes a projection region projected by the display 127-*c* on the reference horizontal plane, and Ccp denotes a projection location of the centroid Cc of the display 127-*c* on the reference horizontal plane. 120-*np* denotes a projection region projected by the electronic device 120-*n* on the reference horizontal plane, 127-*np* denotes a projection region projected by the display 127-*n* on the reference horizontal plane, and Cnp denotes a projection location of the centroid Cn of the display 127-*n* on the reference horizontal plane. A selected projection direction Dsp denotes a projection of the selected direction Ds on the reference horizontal plane. A target projection object 1200 is a projection of the target image object 500 on the reference horizontal plane.

For the purpose of explanatory convenience in the following description, it is assumed hereinafter that the multimedia interaction system 100 utilizes the projection location of the centroid of the display 127 on the reference horizontal plane to represent the projection location of the electronic device 120 on the reference horizontal plane.

In a twenty-first embodiment of the operation 308, the aforementioned first predetermined condition specifies that a projection location (hereinafter, candidate projection location) projected by the candidate electronic device on the reference horizontal plane parallel to the ground is positioned on a selected projection path Psp to which the selected projection direction Dsp points, wherein the selected projection direction Dsp is projected by the selected direction Ds on the reference horizontal plane.

In a twenty-second embodiment of the operation 308, the aforementioned first predetermined condition specifies that a distance between the candidate projection location and the selected projection path Psp is less than the first predetermined distance value R1*s*.

In a twenty-third embodiment of the operation 308, the aforementioned first predetermined condition specifies that the selected projection path Psp passes through a display projection region projected by the display of the candidate electronic device on the reference horizontal plane.

Figure 12:
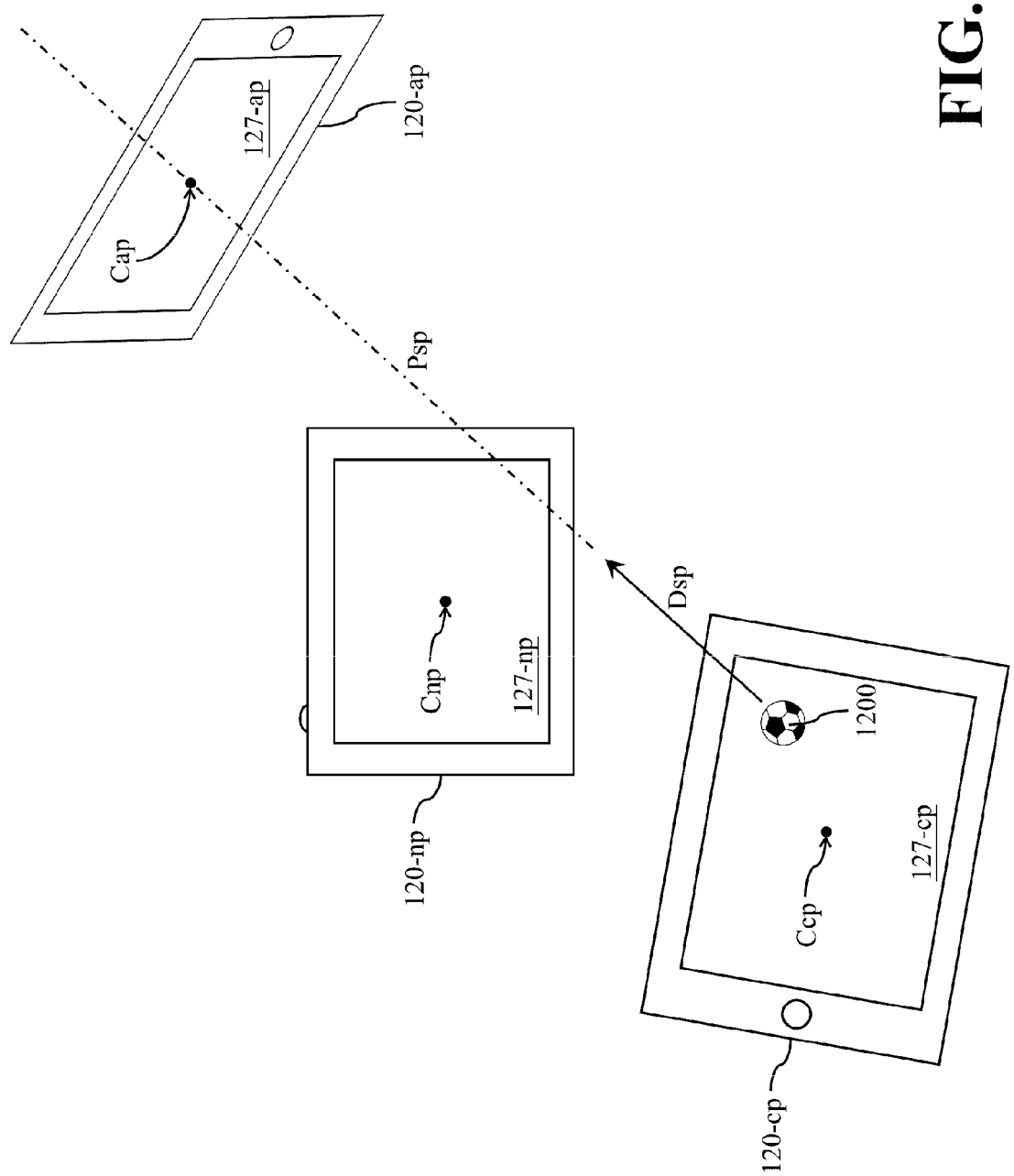
FIGS. 12~18 show simplified schematic diagrams of different types of relative position among projections projected by partial electronic devices in FIG. 1 on a reference horizontal plane according to several embodiments of the present disclosure.

In the pattern of FIG. 12, the selected projection direction Dsp is projected by the selected direction Ds on the reference horizontal plane, and the selected projection path Psp to which the selected projection direction Dsp points passes through the projection location Cap of the centroid Ca of the display 127-*a*. This means that the projection location of the electronic device 120-*a* on the reference horizontal plane is positioned on the selected projection path Psp. Since the projection location of the electronic device 120-*a* is positioned on the selected projection path Psp, a distance between the projection location of the electronic device 120-*a* and the selected projection path Psp is zero. As shown in FIG. 12, the selected projection path Psp passes through the projection region 127-*np* of the display 127-*n* but does not pass through the projection location Cnp of the centroid Cn of the display 127-*n*, which means that the projection location of the electronic device 120-*n* is not positioned on the selected projection path Psp.

Accordingly, for the pattern of FIG. 12, when the candidate electronic device is the electronic device 120-*a*, the determining module of the multimedia interaction module 128-*c* determines that the relative position between the selected direction Ds and the candidate electronic device 120-*a* satisfies the first predetermined condition in the aforementioned twenty-first to twenty-third embodiments. When the candidate electronic device is the electronic device 120-*n*, the determining module of the multimedia interaction module 128-*c* determines that a relative position between the selected direction Ds and the candidate electronic device 120-*n* satisfies the first predetermined condition in the aforementioned twenty-third embodiment. The determining module of the multimedia interaction module 128-*c*, however, determines that the relative position between the selected direction Ds and the candidate electronic device 120-*n* does not satisfy the first predetermined condition in the aforementioned twenty-first embodiment.

Figure 13:
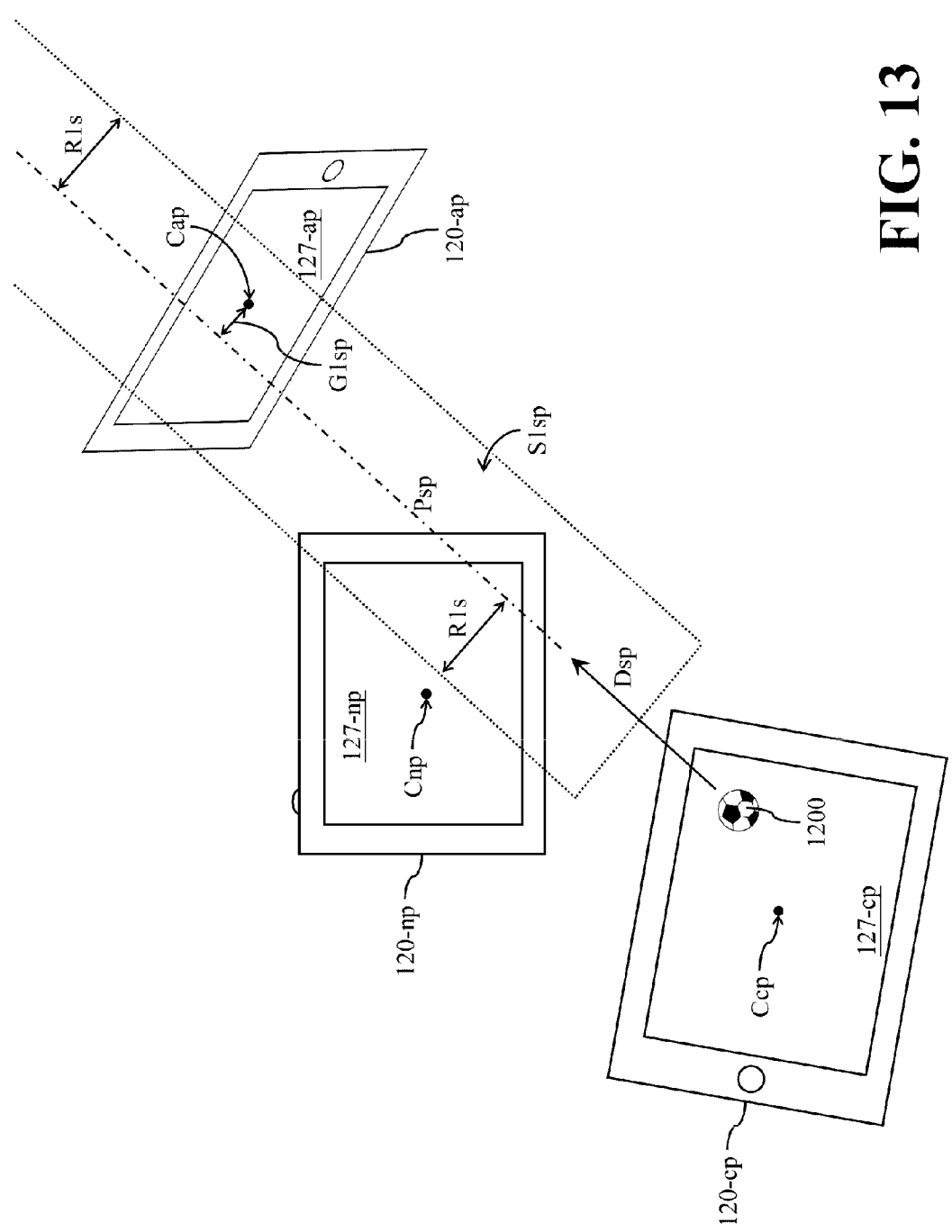

In the pattern of FIG. 13, the selected projection path Psp to which the selected projection direction Dsp points passes through a projection region 127-*ap* of the display 127-*a* but does not pass through the projection location Cap of the centroid Ca of the display 127-*a*. This means that the projection location of the electronic device 120-*a* is not positioned on the selected projection path Psp. A distance between the projection location Cap of the centroid Ca and the selected projection path Psp is G1*sp*, which means that the distance between the projection location of the electronic device 120-*a* and the selected projection path Psp is G1*sp*. In addition, the selected projection path Psp passes through the projection region 127-*np* of the electronic device 120-*n* but does not pass through the projection location Cnp of the display 127-*n*, which means that the projection location of the electronic device 120-*n* is not positioned on the selected projection path Psp. As shown in FIG. 13, the distance G1*sp* between the projection location Cap of the centroid Ca of the display 127-*a* and the selected projection path Psp is less than the first predetermined distance value R1*s*, but a distance between the projection location Cnp of the centroid Cn of the display 127-*n* and the selected projection path Psp is apparently greater than the first predetermined distance value R1*s*.

Accordingly, for the pattern of FIG. 13, when the candidate electronic device is the electronic device 120-*a*, the determining module of the multimedia interaction module 128-*c* determines that the relative position between the selected direction Ds and the candidate electronic device 120-*a* satisfies the first predetermined condition in the aforementioned twenty-second and twenty-third embodiments. In comparison, the determining module of the multimedia interaction module 128-*c* determines that the relative position between the selected direction Ds and the candidate electronic device 120-*a* does not satisfy the first predetermined condition in the aforementioned twenty-first embodiment. When the candidate electronic device is the electronic device 120-*n*, the determining module of the multimedia interaction module 128-*c* determines that the relative position between the selected direction Ds and the candidate electronic device 120-*n* does not satisfy the first predetermined condition in the aforementioned twenty-first and twenty-second embodiments. In comparison, the determining module of the multimedia interaction module 128-*c* determines that the relative position between the selected direction Ds and the candidate electronic device 120-*n* satisfies the first predetermined condition in the aforementioned twenty-third embodiment.

In a twenty-fourth embodiment of the operation 308, the aforementioned first predetermined condition specifies that the selected projection direction Dsp points to the selected projection path Psp and a strip region S1*sp*, and the candidate projection location is positioned in the strip region S1*sp*, wherein the selected projection path Psp is a central line of the strip region S1*sp*, and a width of the strip region S1*sp* is two times of the first predetermined distance value R1*s*.

In the pattern of FIG. 13, the projection location Cap of the centroid Ca of the display 127-*a* is positioned within the strip region S1*sp* to which the selected projection direction Dsp points. This means that the projection location of the electronic device 120-*a* is positioned in the strip region S1*sp*. The projection location Cnp of the centroid Cn of the display 127-*n* is positioned outside the strip region S1*sp*, which means that the projection location of the electronic device 120-*n* is not positioned in the strip region S1*sp*.

Accordingly, for the pattern of FIG. 13, when the candidate electronic device is the electronic device 120-*a*, the determining module of the multimedia interaction module 128-*c* determines that the relative position between the selected direction Ds and the candidate electronic device 120-*a* satisfies the first predetermined condition in the aforementioned twenty-fourth embodiment. When the candidate electronic device is the electronic device 120-*n*, the determining module of the multimedia interaction module 128-*c* determines that the relative position between the selected direction Ds and the candidate electronic device 120-*n* does not satisfy the first predetermined condition in the aforementioned twenty-fourth embodiment.

In a twenty-fifth embodiment of the operation 308, the aforementioned first predetermined condition specifies that the selected projection direction Dsp points to a triangle region S2*sp*, and the candidate projection location is positioned in the triangle region S2*sp*, wherein the selected projection path Psp is a central line of the triangle region S2*sp*, a projection location projected by the target image object 500 (i.e., a location of the target projection object 1200) on the reference horizontal plane is an apex of the triangle region S2*sp*, and a vertex angle of the triangle region S2*sp* is an acute angle.

Figure 14:
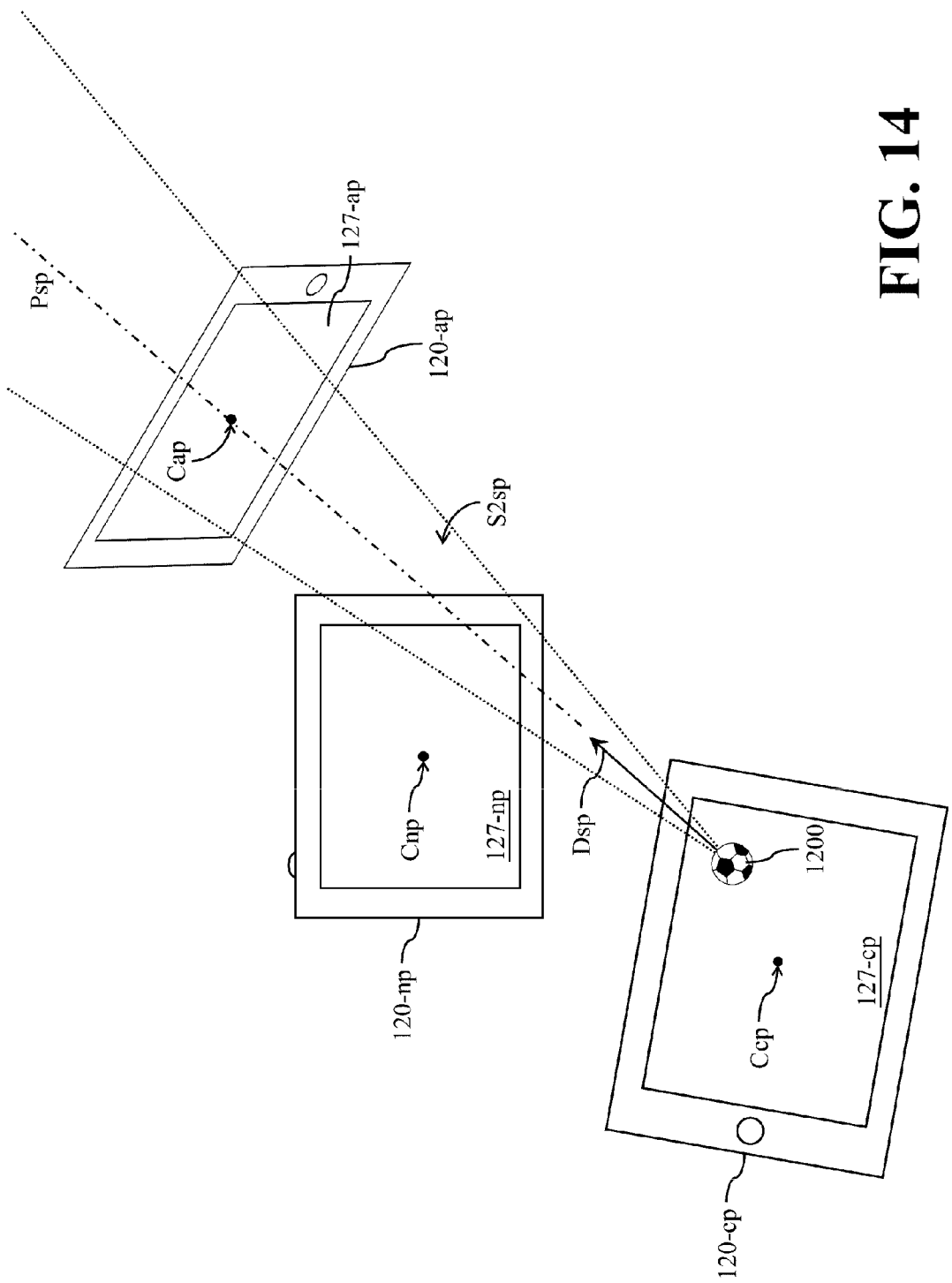

In the pattern of FIG. 14, the projection location Cap of the centroid Ca of the display 127-*a* is positioned within the triangle region S2*sp*, which means that the projection location of the electronic device 120-*a* is positioned in the triangle region S2*sp*. The projection location Cnp of the centroid Cn of the display 127-*n* is positioned outside the triangle region S2*sp*, which means that the projection location of the electronic device 120-*n* is not positioned in the triangle region S2*sp*.

Accordingly, for the pattern of FIG. 14, when the candidate electronic device is the electronic device 120-*a*, the determining module of the multimedia interaction module 128-*c* determines that the relative position between the selected direction Ds and the candidate electronic device 120-*a* satisfies the first predetermined condition in the aforementioned twenty-fifth embodiment. When the candidate electronic device is the electronic device 120-*n*, the determining module of the multimedia interaction module 128-*c* determines that the relative position between the selected direction Ds and the candidate electronic device 120-*n* does not satisfy the first predetermined condition in the aforementioned twenty-fifth embodiment.

In a twenty-sixth embodiment of the operation 308, the aforementioned first predetermined condition specifies that an eleventh reference included angle between the selected projection direction Dsp and a first reference projection direction is an acute angle and less than the reference angle As, wherein a projection location (hereinafter, source projection location) Ccp projected by the source electronic device 120-*c* on the reference horizontal plane is a starting point of the first reference projection direction, and the first reference projection direction points to the candidate projection location.

Figure 15:
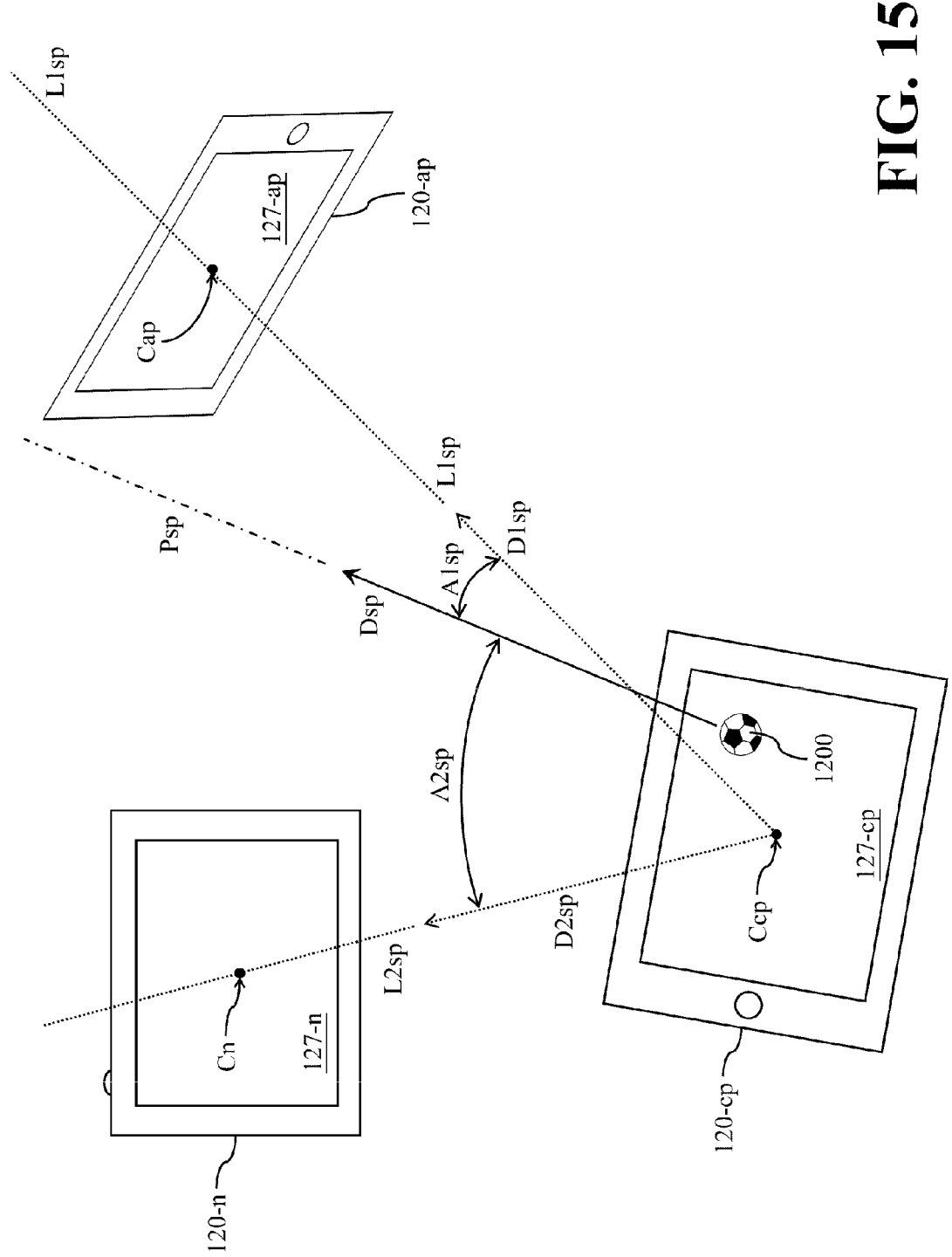

In the pattern of FIG. 15, when the candidate electronic device is the electronic device 120-*a*, the first reference projection direction is a projection direction D1*sp* that points to the projection location Cap of the centroid Ca of the display 127-*a*, and the projection location Ccp of the centroid Cc of the display 127-*c* is a starting point of the first reference projection direction. The eleventh reference included angle is an included angle A1*sp* between the projection direction D1*sp* and the selected projection direction Dsp. The included angle A1*sp* is determined by the distance between the projection location of the candidate electronic device 120-*a* and the selected projection path Psp to which the selected projection direction Dsp points to some extent. In this embodiment, the smaller the included angle A1*sp*, the closer the projection location of the candidate electronic device 120-*a* to the selected projection path Psp. Accordingly, if the included angle A1*sp* is an acute angle and smaller than the reference angle As, the determining module of the multimedia interaction module 128-*c* determines that the relative position between the selected direction Ds and the candidate electronic device 120-*a* satisfies the first predetermined condition in the aforementioned twenty-sixth embodiment. On the contrary, if the included angle A1*sp* is greater than the reference angle As, the determining module of the multimedia interaction module 128-*c* determines that the relative position between the selected direction Ds and the candidate electronic device 120-*a* does not satisfy the first predetermined condition in the aforementioned twenty-sixth embodiment.

In the pattern of FIG. 15, when the candidate electronic device is the electronic device 120-*n*, the first reference projection direction is a projection direction D2*sp* that points to the projection location Cnp of the centroid Cn of the display 127-*n*, and the projection location Ccp of the centroid Cc of the display 127-*c* is a starting point of the first reference projection direction. The eleventh reference included angle is an included angle A2*sp* between the projection direction D2*sp* and the selected projection direction Dsp. The included angle A2*sp* is determined by the distance between the projection location of the candidate electronic device 120-*n* and the selected projection path Psp to some extent. In this embodiment, the smaller the included angle A2*sp*, the closer the projection location of the candidate electronic device 120-*n* to the selected projection path Psp. Accordingly, if the included angle A2*sp* is an acute angle and smaller than the reference angle As, the determining module of the multimedia interaction module 128-*c* determines that the relative position between the selected direction Ds and the electronic device 120-*n* satisfies the first predetermined condition in the aforementioned twenty-sixth embodiment. On the contrary, if the included angle A2*sp* is greater than the reference angle As, the determining module of the multimedia interaction module 128-*c* determines that the relative position between the selected direction Ds and the electronic device 120-*n* does not satisfy the first predetermined condition in the aforementioned twenty-sixth embodiment.

If the relative position between the selected direction Ds and a candidate electronic device satisfies the first predetermined condition specified in any of the aforementioned twenty-first to twenty-sixth embodiments, it means that the candidate electronic device is positioned near the selected path Ps to which the selected direction Ds points, and the distance between the candidate electronic device and the selected path Ps is within an error tolerance range. Accordingly, source electronic device 120-*c* may select the candidate electronic device as the basis electronic device. When the multimedia interaction system 100 wants to create the multimedia interaction effect showing that the target image object 500 is transmitted from the source electronic device 120-*c* to the basis electronic device near the selected path Ps to which the selected direction Ds points, and then the target image object 500 is transmitted from the basis electronic device to another candidate electronic device, the source electronic device 120-*c* may select a single candidate electronic device that satisfies the first predetermined condition specified in any of the aforementioned twenty-first to twenty-sixth embodiments from the other electronic devices of the multimedia interaction system 100 as the basis electronic device.

In practice, the determining module of the multimedia interaction module 128-*c* may perform the determination of the aforementioned operation 308 for each of the other electronic devices of the multimedia interaction system 100 to find a candidate electronic device that satisfies the first predetermined condition the most. Alternatively, the determining module of the multimedia interaction module 128-*c* may finish the operation 308 once the determining module of the multimedia interaction module 128-*c* finds a candidate electronic device that satisfies the first predetermined condition of the operation 308, and omit the determination of the relative position between each of other electronic devices and the selected direction Ds.

In addition, if the multimedia interaction application being carried out by the multimedia interaction system 100 does not demand a highly accurate determination for the relative position between the candidate electronic device and the selected direction Ds, the multimedia interaction system 100 may loosen the aforementioned first predetermined distance value R1*s* or the reference angle As. On the contrary, if the multimedia interaction application demands a higher accurate determination for the relative position between the candidate electronic device and the selected direction Ds, the multimedia interaction system 100 may lower the aforementioned first predetermined distance value R1*s* or the reference angle As, or simply adopt the configuration of the first predetermined condition in the twenty-first embodiment.

In a twenty-seventh embodiment of the operation 308, the aforementioned first predetermined condition specifies that a twelfth reference included angle between the selected projection direction Dsp and a second reference projection direction is an acute angle, and the eleventh reference included angle is less than the twelfth reference included angle, wherein the source projection location Ccp is a starting point of the second reference projection direction, and the second reference projection direction points to a projection location (hereinafter, reference projection location) projected by a reference electronic device of the multimedia interaction system 100 on the reference horizontal plane.

In the pattern of FIG. 15, when the candidate electronic device is the electronic device 120-*a*, the determining module of the multimedia interaction module 128-*c* selects another electronic device whose projection location is near the selected projection path Psp, such as the electronic device 120-*n*, as a reference electronic device. In this situation, the first reference projection direction is the projection direction D1*sp* that points to the projection location Cap of the centroid Ca of the display 127-*a*, and the projection location Ccp of the centroid Cc of the display 127-*c* is the starting point of the projection direction D1*sp*. The eleventh reference included angle is the included angle A1*sp* between the projection direction D1*sp* and the selected projection direction Dsp. The second reference projection direction is the projection direction D2*sp* that points to the projection location Cnp of the centroid Cn of the display 127-*n*, and the projection location Ccp of the centroid Cc of the display 127-*c* is the starting point of the projection direction D2*sp*. The twelfth reference included angle is the included angle A2*sp* between the projection direction D2*sp* and the selected projection direction Dsp. The included angle A2*sp* is determined by the distance between the projection location of the reference electronic device 120-*n* and the selected projection path Psp to some extent. In this embodiment, the smaller the included angle A2*sp*, the closer the projection location of the reference electronic device 120-*n* to the selected projection path Psp. In the pattern of FIG. 15, since the included angle A1*sp* is an acute angle and less than the included angle A2*sp*, it means that the projection location of the electronic device 120-*a* is closer to the selected projection path Psp than the projection location of the reference electronic device 120-*n*. Accordingly, the determining module of the multimedia interaction module 128-*c* determines that the relative position between the selected direction Ds and the candidate electronic device 120-*a* satisfies the first predetermined condition in the twenty-seventh embodiment.

In the pattern of FIG. 15, when the candidate electronic device is the electronic device 120-*n*, the determining module of the multimedia interaction module 128-*c* selects another electronic device whose projection location is near the selected projection path Psp, such as the electronic device 120-*a*, as a reference electronic device. In this situation, the first reference projection direction is the projection direction D2*sp* that points to the projection location Cnp of the centroid Cn of the display 127-*n*, and the projection location Ccp of the centroid Cc is the starting point of the projection direction D2*sp*. The eleventh reference included angle is the included angle A2*sp* between the projection direction D2*sp* and the selected projection direction Dsp. The second reference projection direction is the projection direction D1*sp* that points to the projection location Cap of the centroid Ca of the display 127-*a*, and the projection location Ccp of the centroid Cc of the display 127-*c* is the starting point of the projection direction D1*sp*. The twelfth reference included angle is the included angle A1*sp* between the projection direction D1*sp* and the selected projection direction Dsp. In the pattern of FIG. 15, since the included angle A2*sp* is greater than the included angle A1*sp*, it means that the projection location of the reference electronic device 120-*a* is closer to the selected projection path Psp than the projection location of the electronic device 120-*n*. Accordingly, the determining module of the multimedia interaction module 128-*c* determines that the relative position between the selected direction Ds and the candidate electronic device 120-*n* does not satisfy the first predetermined condition in the aforementioned twenty-seventh embodiment.

When the selecting module of the multimedia interaction module 128-*c* wants to select a single candidate electronic device which is closest to the selected path Ps to which the selected direction Ds points as the basis electronic device, the configuration illustrated in the aforementioned twenty-seventh embodiment may be adopted to configure the first predetermined condition.

In a twenty-eighth embodiment of the operation 308, the aforementioned first predetermined condition specifies that a projection of the source electronic device 120-*c* on the reference horizontal plane is a source projection region 120-*cp*, a projection of the candidate electronic device on the reference horizontal plane is a candidate projection region, the aforementioned candidate projection location is positioned on the selected projection path Psp, and a section of the selected projection path Psp between the source projection region 120-*cp* and the candidate projection region does not contact with projections projected by other electronic devices of the multimedia interaction system 100 on the reference horizontal plane.

In a twenty-ninth embodiment of the operation 308, the aforementioned first predetermined condition specifies that the distance between the aforementioned candidate projection location and the selected projection path Psp is less than the first predetermined distance value R1*s*, and a section of the selected projection path Psp between the source projection region 120-*cp* and the candidate projection region does not contact with the projections projected by other electronic devices of the multimedia interaction system 100 on the reference horizontal plane.

In a thirtieth embodiment of the operation 308, the aforementioned first predetermined condition specifies that the selected projection path Psp passes through the display projection region projected by the display of the candidate electronic device on the reference horizontal plane, and a section of the selected projection path Psp between the source projection region 120-*cp* and the candidate projection region does not contact with the projections projected by other electronic devices of the multimedia interaction system 100 on the reference horizontal plane.

In the pattern of FIG. 12, the projection region 120-*ap* is projected by the electronic device 120-*a* on the reference horizontal plane. The selected projection path Psp passes through the projection location Cap of the centroid Ca of the display 127-*a*, which means that the projection location of the electronic device 120-*a* is positioned on the selected projection path Psp. Therefore, the distance between the projection location Cap of the electronic device 120-*a* and the selected projection path Psp is zero.

In the pattern of aforementioned FIG. 12, a section of the selected projection path Psp between the source projection region 120-*cp* and the projection region 120-*ap* of the electronic device 120-*a* passes through the projection region 127-*np* of the display 127-*n* of the electronic device 120-*n*. In one aspect, this means that the section between the source electronic device 120-*c* and the electronic device 120-*a* is blocked by the electronic device 120-*n*.

Accordingly, for the pattern of FIG. 12, when the candidate electronic device is the electronic device 120-*a*, the determining module of the multimedia interaction module 128-*c* determines that the relative position between the selected direction Ds and the candidate electronic device 120-*a* does not satisfy the first predetermined condition in the aforementioned twenty-eighth to thirtieth embodiments.

If the relative position between the selected direction Ds and the candidate electronic device satisfies the first predetermined condition specified in any of the aforementioned twenty-eighth to thirtieth embodiments, it means that the projection location of the candidate electronic device is positioned near the selected projection path Psp to which the selected projection direction Dsp points, the distance between the projection location of the candidate electronic device and the selected projection path Psp is within an error tolerance range, and no other electronic device is positioned between the candidate electronic device and the source electronic device 120-*c*. Accordingly, when the multimedia interaction system 100 wants to create a multimedia interaction effect where the candidate electronic device can be selected as the basis electronic device only if no other electronic device is positioned between the candidate electronic device and the source electronic device 120-*c*, by adopting the configuration of the first predetermined condition illustrated in any of the aforementioned twenty-eighth to thirtieth embodiments, the multimedia interaction system 100 is enabled to prevent the candidate electronic device from being selected as the basis electronic device if there is other electronic device blocking between the candidate electronic device and the source electronic device 120-*c*.

In a thirty-first embodiment of the operation 308, the aforementioned first predetermined condition specifies that a thirteenth reference included angle is defined by the aforementioned first reference projection direction and the second reference projection direction, and the aforementioned eleventh reference included angle is less than a half of the thirteenth reference included angle In a thirty-second embodiment of the operation 308, the aforementioned first predetermined condition specifies that a first reference line in which the second reference projection direction resides divides the reference horizontal plane into a first reference region and a second reference region, wherein the selected projection direction Dsp points to the first reference region and the candidate projection location is positioned in the first reference region.

Figure 16:
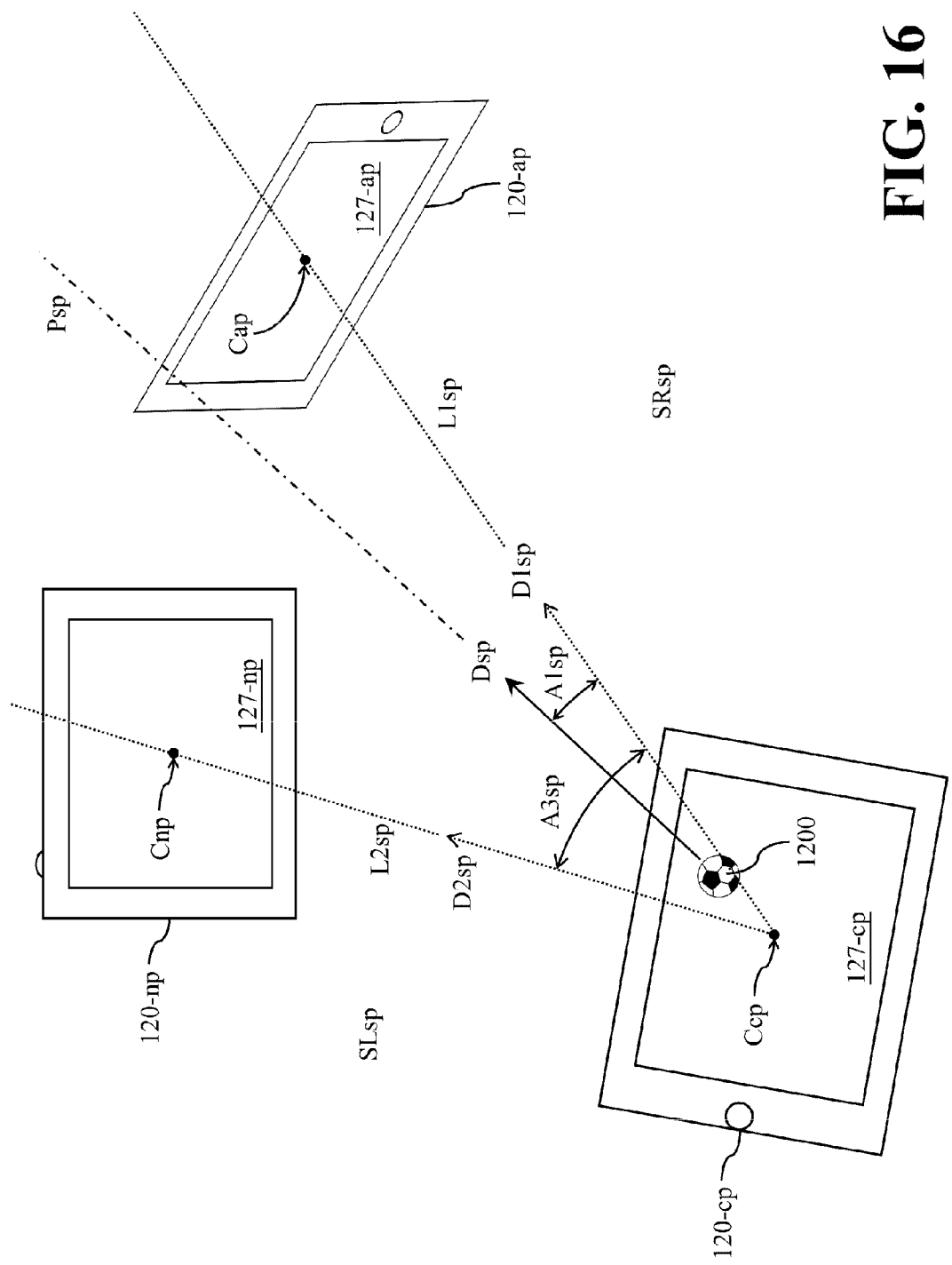

In the pattern of FIG. 16, when the candidate electronic device is the electronic device 120-a, the determining module of the multimedia interaction module 128-c selects another electronic device whose projection location is near the selected projection path Psp, such as the electronic device 120-n, as a reference electronic device. In this situation, the first reference projection direction is the projection direction D1sp that points to the projection location Cap of the centroid Ca of the display 127-a, and the projection location Ccp of the centroid Cc of the display 127-c is the starting point of the projection direction D1sp. The eleventh reference included angle is the included angle A1sp between the projection direction D1sp and the selected projection direction Dsp. The second reference projection direction is the projection direction D2sp that points to the projection location Cnp of the centroid Cn of the display 127-n, and the projection location Ccp of the centroid Cc of the display 127-c is the starting point of the projection direction D2sp. The thirteenth reference included angle is an included angle A3sp between the projection direction D1sp and the projection direction D2sp. If the included angle A1sp is less than a half of the included angle A3sp, it means that the projection location Cap of the candidate electronic device 120-a is closer to the selected projection path Psp than the projection location Cnp of the reference electronic device 120-n. In addition, the first reference line is a reference line L2sp on which the projection direction D2sp resides. The reference line L2sp divides the reference horizontal plane into a first reference region SRsp and a second reference region SLsp. As shown in FIG. 16, the selected projection direction Dsp points to the first reference region SRsp, and the projection location Cap of the candidate electronic device 120-a is positioned in the first reference region SRsp. Accordingly, the determining module of the multimedia interaction module 128-c determines that the relative position between the selected direction Ds and the candidate electronic device 120-a satisfies the first predetermined condition in the aforementioned thirty-first and thirty-second embodiments.

When the selecting module of the multimedia interaction module 128-c wants to select a single candidate electronic device which is closest to the selected projection path Psp to which the selected projection direction Dsp points as the basis electronic device, the configuration illustrated in the aforementioned thirty-first or thirty-second embodiment may be adopted to configure the first predetermined condition.

In a thirty-third embodiment of the operation 308, the aforementioned first predetermined condition specifies that a projection direction (hereinafter, source orientation projection direction Dcp) Dcp projected by the source orientation direction Dc of the source electronic device 120-c on the reference horizontal plane refers the source projection location Ccp as an axis and rotates the first reference viewing angle VA1s toward two sides of the axis to define a source viewing angle region, wherein the source orientation projection direction Dcp divides the source viewing angle region into a first half reference region and a second half reference region, the selected projection direction Dsp points to the first half reference region, and the candidate projection location is positioned in the first half reference region. Meanwhile, a projection direction (hereinafter, candidate orientation projection direction) projected by the candidate orientation direction of the candidate electronic device on the reference horizontal plane refers the candidate projection location as an axis and rotates the second reference viewing angle VA2s toward two sides of the axis to define a first candidate viewing angle region, and the source projection location Ccp is positioned in the first candidate viewing angle region.

In a thirty-fourth embodiment of the operation 308, the aforementioned first predetermined condition specifies that a fourteenth reference included angle is defined by the source orientation projection direction Dcp and the selected projection direction Dsp, a fifteenth reference included angle is defined by the aforementioned first reference projection direction and the source orientation projection direction Dcp, and the fourteenth reference included angle and the fifteenth reference included angle are both less than the first reference viewing angle VA1s. Meanwhile, a sixteenth reference included angle is defined by a first reference inverse projection direction and a candidate orientation projection direction projected by the candidate electronic device, and the sixteenth reference included angle is less than the second reference viewing angle VA2s, wherein the candidate projection location is a starting point of the first reference inverse projection direction, and the first reference inverse projection direction points to the source projection location Ccp.

When the fifteenth reference included angle is less than the first reference viewing angle VA1s, it means that the candidate electronic device is positioned within the source viewing angle space of the source electronic device 120-c. When the sixteenth reference included angle is less than the second reference viewing angle VA2s, it means that the source projection location Ccp of the source electronic device 120-c is positioned within the first candidate viewing angle space of the candidate electronic device.

Figure 17:
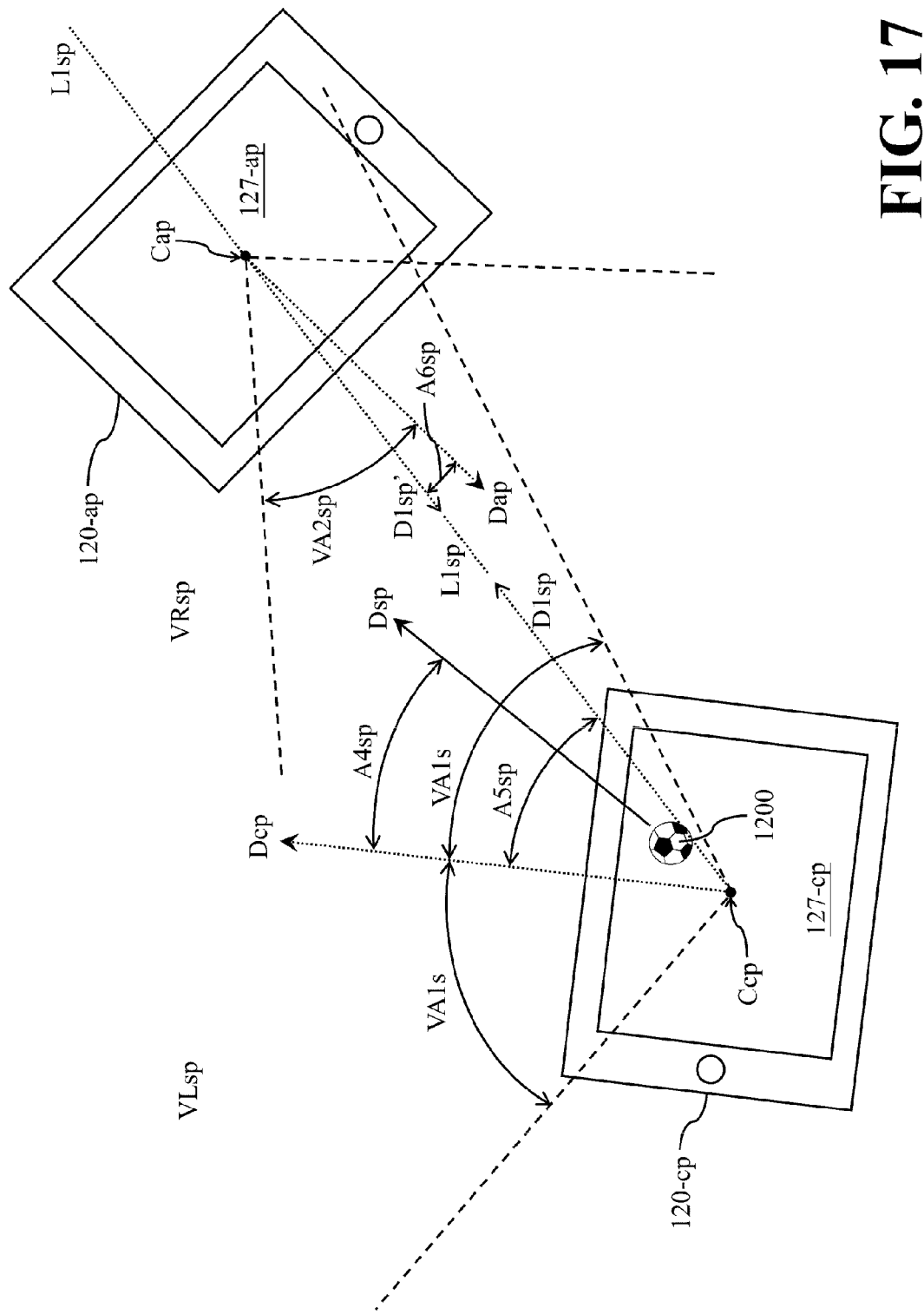

In the pattern of FIG. 17, source orientation projection direction Dcp refers the source projection location Ccp as an axis and rotates the first reference viewing angle VA1s toward two sides of the axis to define the source viewing angle region consisting of a right-half reference region VRsp and a left-half reference region VLsp. The projection location Cap of the centroid Ca of the display 127-a is positioned within the right-half reference region VRsp, which means that the projection location of the electronic device 120-a is positioned within the right-half reference region VRsp. As shown in FIG. 17, the selected projection direction Dsp points to the right-half reference region VRsp.

The fourteenth reference included angle is an included angle A4sp between the source orientation projection direction Dcp and the selected projection direction Dsp. If the included angle A4sp is less than the first reference viewing angle VA1s, it means that the selected projection direction Dsp points to the source viewing angle region of the source electronic device 120-c.

When the candidate electronic device is the electronic device 120-a, the first reference projection direction is the projection direction D1sp that points to the projection location Cap of the centroid Ca, and the projection location Ccp of the centroid Cc is the starting point of the projection direction D1sp. The determining module of the multimedia interaction module 128-c may shift the projection direction D1sp so that the projection location of the candidate electronic device 120-a (e.g., the projection location Cap of the centroid Ca in this embodiment) becomes a starting point of the shifted version of the projection direction D1sp. The determining module of the multimedia interaction module 128-c then inverses the shifted version of the projection direction D1sp and utilizes the inversed result of the shifted version of the projection direction D1sp as a first reference inverse projection direction D1sp'. In this situation, the fifteenth reference included angle is the included angle A5sp between the projection direction D1sp and the source orientation projection direction Dcp. The sixteenth reference included angle is an included angle A6sp between the first reference inverse projection direction D1sp' and the candidate orientation projection direction Dap of the candidate electronic device 120-a.

The candidate orientation projection direction Dap of the candidate electronic device 120-a refers the candidate projection location of the candidate electronic device 120-a (e.g., the projection location Cap of the centroid Ca of the display 127-a in this embodiment) as an axis and rotates the second reference viewing angle VA2s toward two sides of the axis to define a first candidate viewing angle region. As shown in FIG. 17, since the included angle A4sp and the included angle A5sp are both less than the first reference viewing angle VA1s, and the included angle A6sp is less than the second reference viewing angle VA2s, the determining module of the multimedia interaction module 128-c determines that the relative position between the selected direction Ds and the candidate electronic device 120-a satisfies the first predetermined condition in the aforementioned thirty-third and thirty-fourth embodiments.

In the thirty-third embodiment, by restricting the fifteenth reference included angle to be less than the first reference viewing angle VA 1s and restricting the sixteenth reference included angle to be less than the second reference viewing angle VA2s, the source electronic device 120-c is allowed to select the candidate electronic device as the basis electronic device only if the relative position between the source electronic device 120-c and the candidate electronic device belongs to or is close to a face-to-face pattern.

In practice, the aforementioned first reference viewing angle VA1s may be the same as the second reference viewing angle VA2s, or may be different from the second reference viewing angle VA2s.

When the multimedia interaction system 100 wants to create the multimedia interaction effect where a candidate electronic device is enabled to be selected as the basis electronic device only if the relative position between the source electronic device 120-c and the candidate electronic device belongs to or is close to a face-to-face pattern, by adopting the configuration of the first predetermined condition illustrated in the aforementioned thirty-third or thirty-fourth embodiment, the multimedia interaction system 100 is enabled to prevent the candidate electronic device from being selected as the basis electronic device when the candidate electronic device is back to the source electronic device 120-c. On the other hand, by adopting the configuration of the first predetermined condition illustrated in the aforementioned thirty-third or thirty-fourth embodiment, the multimedia interaction system 100 is enabled to prevent the candidate electronic device from being selected as the basis electronic device when the source electronic device 120-c is back to the candidate electronic device.

In a thirty-fifth embodiment of the operation 308, the aforementioned first predetermined condition specifies that a seventeenth reference included angle is defined by the aforementioned first reference projection direction and the candidate orientation projection direction projected by the candidate electronic device, the aforementioned fourteenth reference included angle and the aforementioned fifteenth reference included angle are both less than the first reference viewing angle VA1s, and the seventeenth reference included angle is less than the second reference viewing angle VA2s.

In a thirty-sixth embodiment of the operation 308, the aforementioned first predetermined condition specifies that the selected projection direction Dsp points to the first half reference region, the candidate projection location of the candidate electronic device is positioned in the first half reference region, and the aforementioned seventeenth reference included angle is less than 90 degrees.

When the fifteenth reference included angle is less than the first reference viewing angle VA1s, it means that the candidate electronic device is positioned within the source viewing angle space of the source electronic device 120-c. When the seventeenth reference included angle is less than the second reference viewing angle VA2s or 90 degrees, it means that the candidate orientation projection direction Dap of the candidate electronic device 120-a is back to the source projection region 120-cp of the source electronic device 120-c to some extent, and it is also means that the user of the candidate electronic device 120-a may be back to the user of the source electronic device 120-c at that time.

Figure 18:
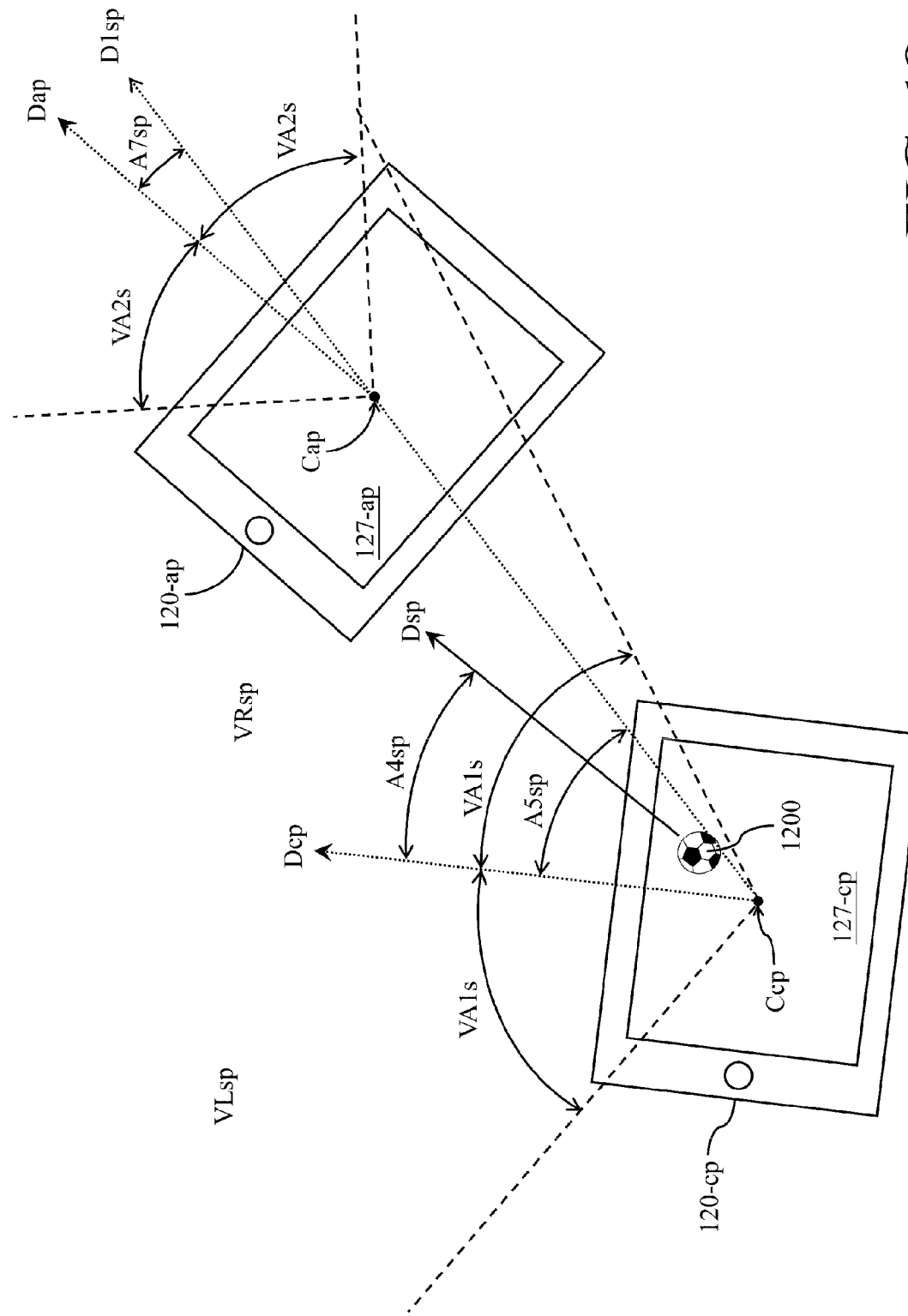

In the pattern of FIG. 18, source orientation projection direction Dcp refers the source projection location Ccp as an axis and rotates the first reference viewing angle VA1s toward two sides of the axis to define the source viewing angle region consisting of a right-half reference region VRsp and a left-half reference region VLsp. The projection location Cap of the centroid Ca of the display 127-a is positioned within the right-half reference region VRsp, which means that the projection location of the electronic device 120-a is positioned within the right-half reference region VRsp. As shown in FIG. 18, the selected projection direction Dsp points to the right-half reference region VRsp.

Similarly, the fourteenth reference included angle is the included angle A4sp between the source orientation projection direction Dcp and the selected projection direction Dsp. If the included angle A4sp is less than the first reference viewing angle VA1s, it means that the selected projection direction Dsp points to the source viewing angle region of the source electronic device 120-c.

When the candidate electronic device is the electronic device 120-a, the seventeenth reference included angle is the included angle A7sp between the projection direction D1sp and the candidate orientation projection direction Dap of the candidate electronic device 120-a.

As shown in FIG. 18, since the included angle A4sp and the included angle A5sp are both less than the first reference viewing angle VA1s, and the included angle A7sp is less than the second reference viewing angle VA2s and less than 90 degrees, the determining module of the multimedia interaction module 128-c determines that the relative position between the selected direction Ds and the candidate electronic device 120-a satisfies the first predetermined condition in the aforementioned thirty-fifth and thirty-sixth embodiments.

In the thirty-fifth embodiment, by restricting the fifteenth reference included angle to be less than the first reference viewing angle VA1s and restricting the seventeenth reference included angle to be less than the second reference viewing angle VA2s, the source electronic device 120-c is allowed to select the candidate electronic device as the basis electronic device only if the relative position between the source electronic device 120-c and the candidate electronic device belongs to or is close to a pattern that the candidate electronic device is back to the source electronic device 120-c while the source electronic device 120-c faces to the candidate electronic device.

Similarly, the aforementioned first reference viewing angle VA1s may be the same as the second reference viewing angle VA2s, or may be different from the second reference viewing angle VA2s.

When the multimedia interaction system 100 wants to create a multimedia interaction effect where a candidate electronic device is enabled to be selected as the basis electronic device only if the relative position between the source electronic device 120-c and the candidate electronic device belongs to or is close to the pattern that the candidate electronic device is back to the source electronic device 120-c while the source electronic device 120-c faces to the candidate electronic device, by adopting the configuration of the first predetermined condition illustrated in the aforementioned thirty-fifth or thirty-sixth embodiment, the multimedia interaction system 100 is enabled to prevent the candidate electronic device from being selected as the basis electronic device when the candidate electronic device faces to the source electronic device 120-c. On the other hand, by adopting the configuration of the first predetermined condition illustrated in the aforementioned thirty-fifth or thirty-sixth embodiment, the multimedia interaction system 100 is enabled to prevent the candidate electronic device from being selected as the basis electronic device when the source electronic device 120-c is back to the candidate electronic device.

As described previously, the target direction decision module of the multimedia interaction module 128-c decides the target direction Dt according to the selected direction Ds and the location of the basis electronic device in the aforementioned operation 312. For the purpose of explanatory convenience, it is assumed hereinafter that the selecting module of the multimedia interaction module 128-c selects the electronic device 120-a as the basis electronic device.

The operations of deciding the target direction conducted by the source electronic device 120-c in the aforementioned operation 312 will be further described below by reference to FIGS. 19~21.

Figure 19:
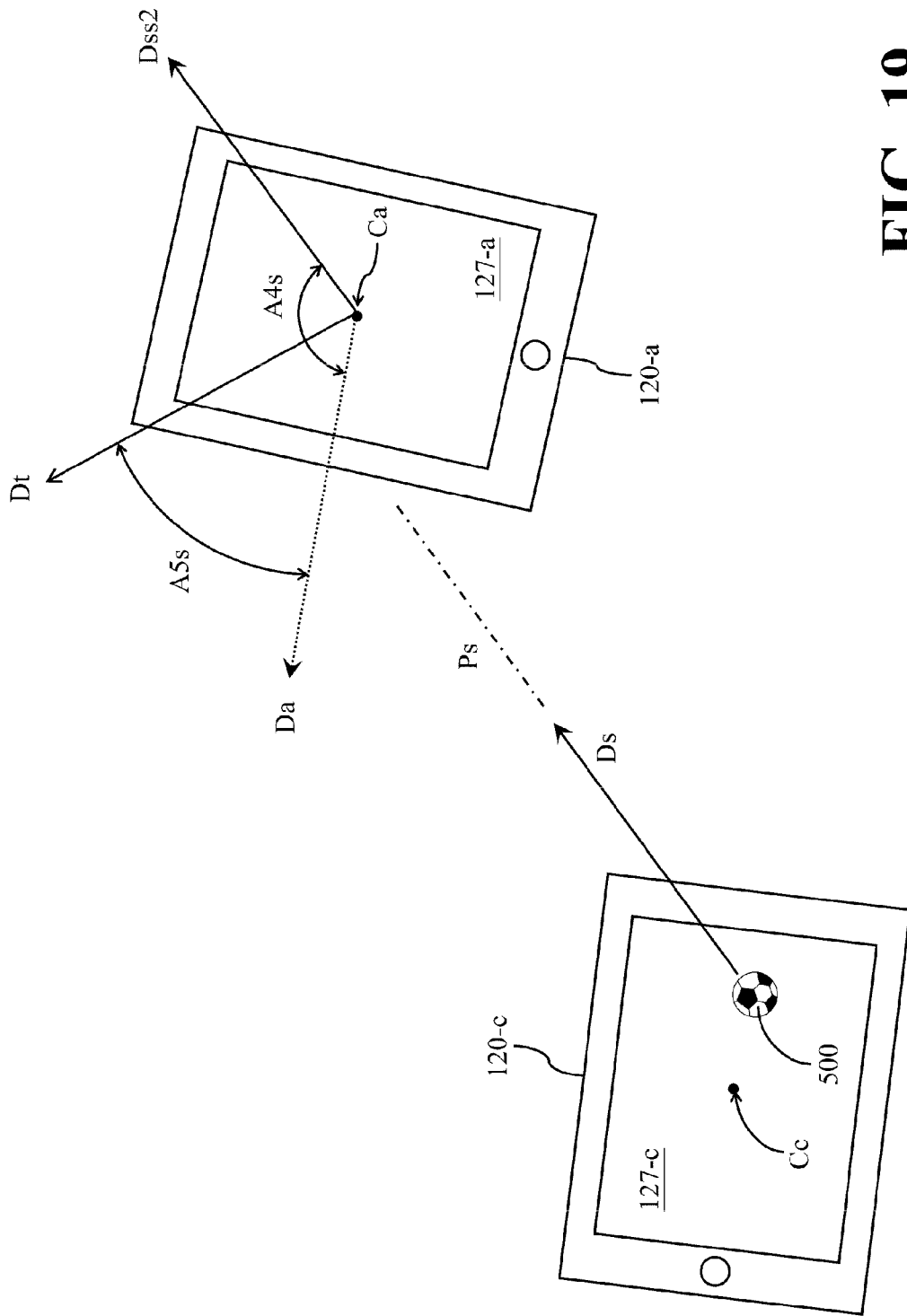
FIGS. 19~21 show simplified schematic diagrams of different types of relative position between a source electronic device and a basis electronic device according to several embodiments of the present disclosure.
Figure 20:
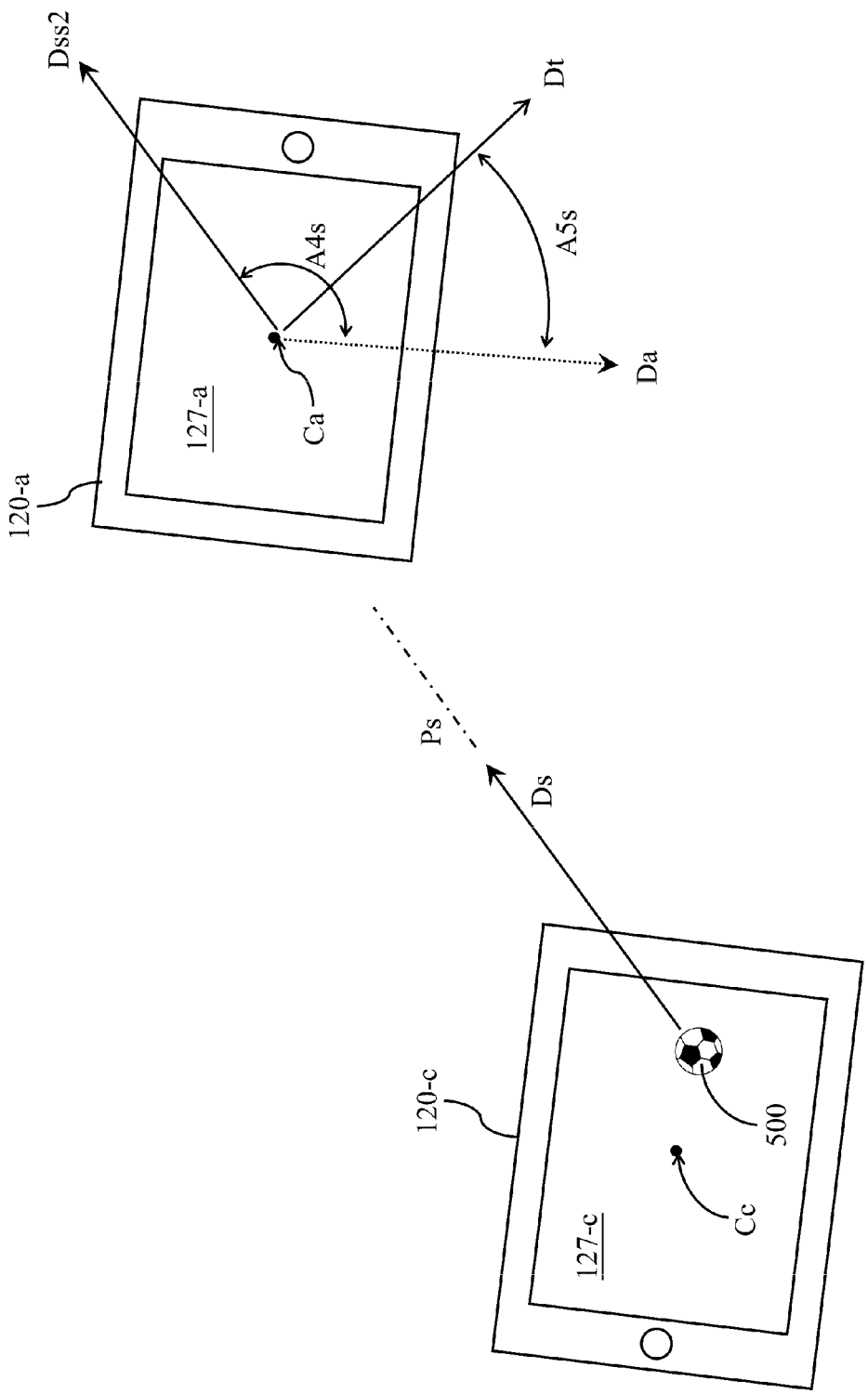
Figure 21:
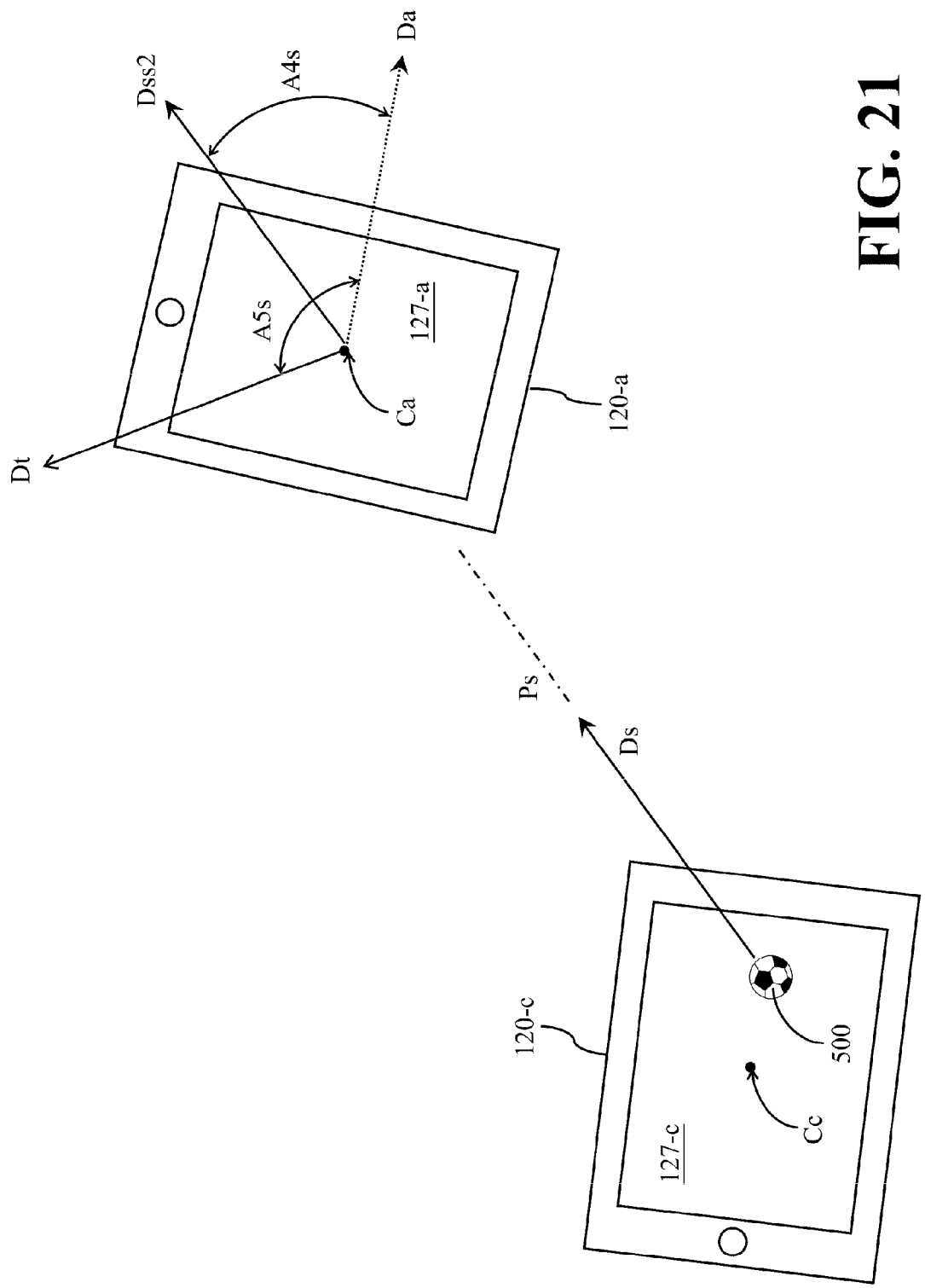

FIGS. 19~21 show simplified schematic diagrams of different types of relative positions between the source electronic device 120-c and the basis electronic device 120-a according to several embodiments of the present disclosure.

The target direction decision module of the multimedia interaction module 128-c may shift the selected direction Ds so that the location of the basis electronic device 120-a becomes a starting point of the shifted version of the selected direction Ds. The target direction decision module of the multimedia interaction module 128-c then utilizes the shifted version of the selected direction Ds to be a second reference shifted direction Dss2 parallel to the selected direction Ds. As described previously, in the multimedia interaction system 100, a spatial location of a particular geometry characteristic of the basis electronic device 120-a, a spatial location of a particular symbol of the basis electronic device 120-a, a spatial location of a particular element of the basis electronic device 120-a, a spatial location of a particular region of the basis electronic device 120-a, a spatial location of a particular geometry characteristic of the display 127-a, or a spatial location of a particular geometry characteristic of a particular display region of the display 127-a may be utilized to represent a spatial location of the basis electronic device 120-a. For the purpose of explanatory convenience, it is assumed hereinafter that the determining module of the multimedia interaction module 128-c utilizes the centroid Ca of the display 127-a to represent the spatial location of the basis electronic device 120-a.

In the patterns of FIGS. 19~21, a fourth reference included angle A4s less than 180 degrees is defined by the second reference shifted direction Dss2 and the basis orientation direction Da of the basis electronic device 120-a. The target direction decision module of the multimedia interaction module 128-c may refer the location of the basis electronic device 120-a as a starting point of the target direction Dt so that a fifth reference included angle A5s is defined by the target direction Dt and the orientation direction Da of the basis electronic device 120-a.

In practice, the fifth reference included angle A5s may be a supplementary angle of the aforementioned fourth reference included angle A4s. Additionally, the target direction decision module of the multimedia interaction module 128-c may configure the target direction Dt on a spatial plane in which the orientation direction Da of the basis electronic device 120-a and the second reference shifted direction Dss2 reside.

As shown in FIGS. 19~21, when the orientation direction Da of the basis electronic device 120-a changes, the target direction Dt defined by the target direction decision module of the multimedia interaction module 128-c changes correspondingly.

The operations of the source electronic device 120-c in the aforementioned operation 414 will be further described below by reference to FIGS. 22~30.

FIGS. 22~30 show simplified schematic diagrams of different types of relative position among partial electronic devices in the multimedia interaction system 100 when the user of the source electronic device 120-c instructs the source electronic device 120-c to transmit the target image object 500 toward the selected direction Ds according to several embodiments of the present disclosure.

In practice, the source electronic device 120-c may determine whether a relative position between the candidate electronic device and the target direction Dt satisfies the second predetermined condition in the aforementioned operation 414 according to the three dimensional coordinates of the candidate electronic device.

In a first embodiment of the operation 414, the aforementioned second predetermined condition specifies that the candidate electronic device is positioned on a target path Pt to which the target direction Dt points.

In a second embodiment of the operation 414, the aforementioned second predetermined condition specifies that a distance between the location of the candidate electronic device and the target path Pt is less than a first predetermined value R1.

In a third embodiment of the operation 414, the aforementioned second predetermined condition specifies that the target path Pt passes through any part of the display of the candidate electronic device.

In a fourth embodiment of the operation 414, the aforementioned second predetermined condition specifies that the candidate electronic device is positioned on a target vertical plane (not shown) in which the target path Pt resides, and the target vertical plane is perpendicular to the ground.

In a fifth embodiment of the operation 414, the aforementioned second predetermined condition specifies that a distance between the location of the candidate electronic device and the aforementioned target vertical plane is less than the first predetermined value R1.

Figure 22:
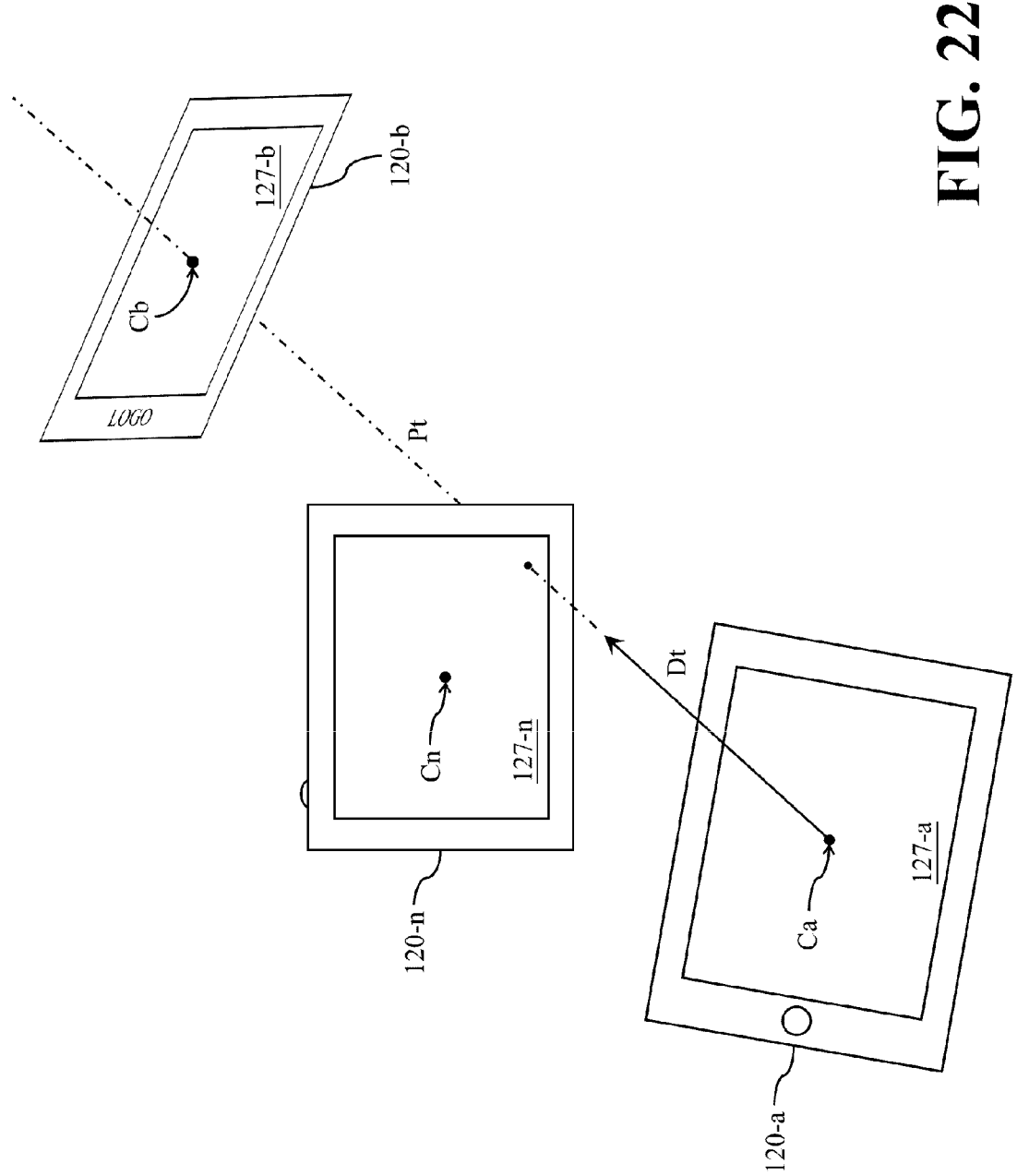
FIGS. 22~30 show simplified schematic diagrams of different types of relative position among partial electronic devices in FIG. 1 according to several embodiments of the present disclosure.

In the pattern of FIG. 22, the target path Pt to which the target direction Dt points passes through the centroid Cb of the display 127-b. This means that the electronic device 120-b is positioned on the target path Pt and also positioned on the target vertical plane in which the target path Pt resides. Since the electronic device 120-b is positioned on the target path Pt and the target vertical plane, a distance between the location of the electronic device 120-b and the target path Pt is zero, and a distance between the location of the electronic device 120-b and the target vertical plane is zero as well. As shown in FIG. 22, the target path Pt passes through the display 127-n but does not pass through the centroid Cn of the display 127-n, which means that the electronic device 120-n is not positioned on the target path Pt and not positioned on the target vertical plane in which the target path Pt resides.

Accordingly, for the pattern of FIG. 22, when the candidate electronic device is the electronic device 120-b, the determining module of the multimedia interaction module 128-c determines that a relative position between the target direction Dt and the candidate electronic device 120-b satisfies the second predetermined condition in the first to fifth embodiments of the aforementioned operation 414. When the candidate electronic device is the electronic device 120-n, the determining module of the multimedia interaction module 128-c determines that a relative position between the target direction Dt and the electronic device 120-n satisfies the second predetermined condition in the third embodiment of the aforementioned operation 414. The determining module of the multimedia interaction module 128-c, however, determines that the relative position between the target direction Dt and the electronic device 120-n does not satisfy the second predetermined condition in the first or fourth embodiment of the aforementioned operation 414.

Figure 23:
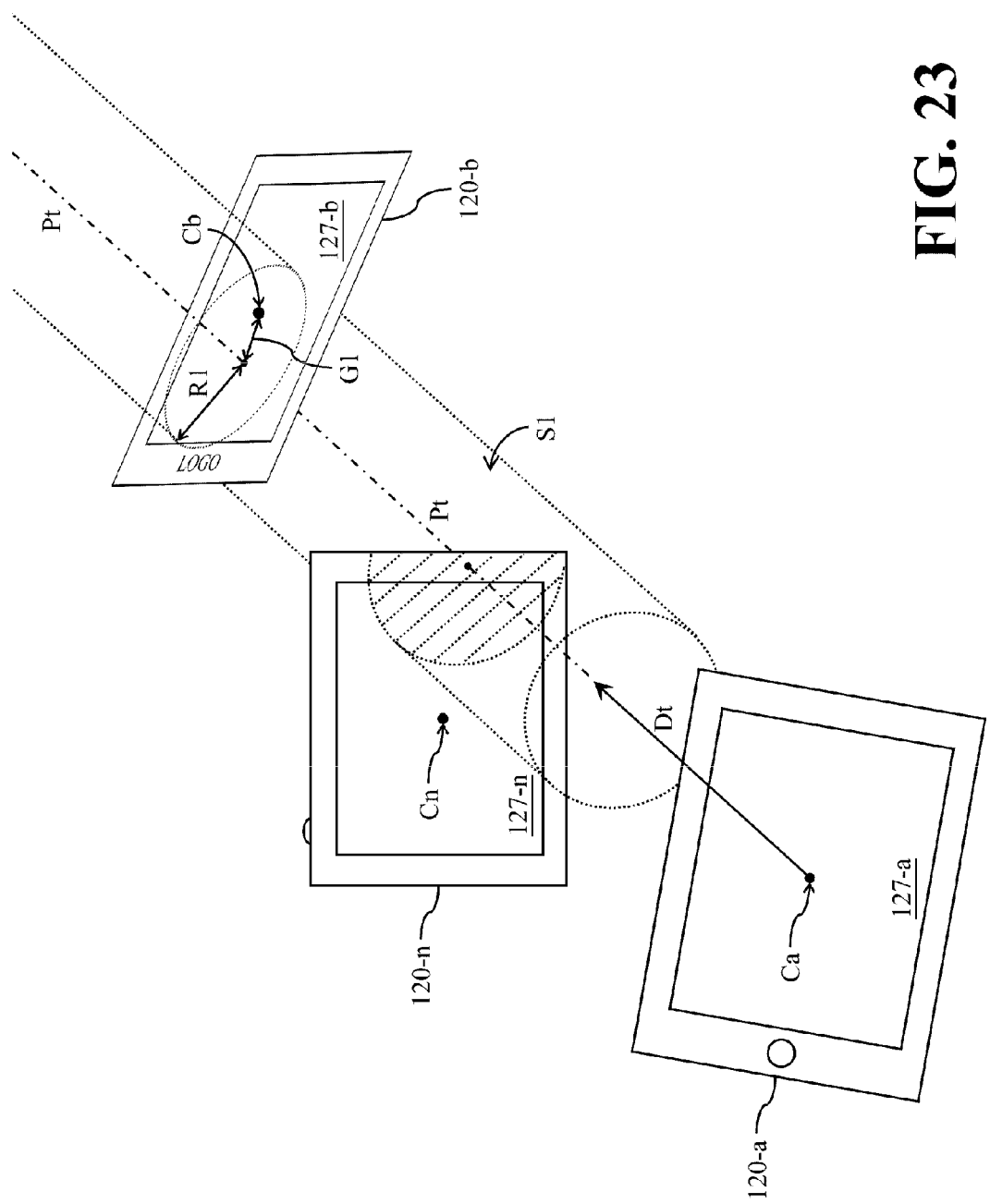

In the pattern of FIG. 23, the target path Pt to which the target direction Dt points passes through a region of the display 127-b but does not pass through the centroid Cb of the display 127-b. This means that the electronic device 120-b is not positioned on the target path Pt and not positioned on the target vertical plane in which the target path Pt resides. A distance between the centroid Cb and the target path Pt is G1, which means that the distance between the location of the electronic device 120-b and the target path Pt is G1. In addition, the target path Pt passes through a peripheral region of the electronic device 120-n but does not pass through a region of the display 127-n, which means that the electronic device 120-n is not positioned on the target path Pt and not positioned on the target vertical plane in which the target path Pt resides. As shown in FIG. 23, the distance G1 between the centroid Cb of the display 127-b and the target path Pt is less than the first predetermined value R1, but a distance between the centroid Cn of the display 127-n and the target path Pt is apparently greater than the first predetermined value R1.

Accordingly, for the pattern of FIG. 23, when the candidate electronic device is the electronic device 120-b, the determining module of the multimedia interaction module 128-c determines that the relative position between the target direction Dt and the candidate electronic device 120-b satisfies the second predetermined condition in the second, third, and fifth embodiments of the aforementioned operation 414. In comparison, the determining module of the multimedia interaction module 128-c determines that the relative position between the target direction Dt and the candidate electronic device 120-b does not satisfy the second predetermined condition in the first and fourth embodiments of the aforementioned operation 414. When the candidate electronic device is the electronic device 120-n, the determining module of the multimedia interaction module 128-c determines that the relative position between the target direction Dt and the candidate electronic device 120-n does not satisfy the second predetermined condition in the first to fifth embodiments of the aforementioned operation 414.

In a sixth embodiment of the operation 414, the aforementioned second predetermined condition specifies that the candidate electronic device is positioned in a pillar region S1 to which the target direction Dt points, wherein the target direction Dt is an axis of the pillar region S1, and a radius of the pillar region S1 is the first predetermined value R1.

In the pattern of FIG. 23, the centroid Cb of the display 127-b is positioned within the pillar region S1 to which the target direction Dt points. This means that the electronic device 120-b is positioned in the pillar region S1. The centroid Cn of the display 127-n is positioned outside the pillar region S1, which means that the electronic device 120-n is not positioned in the pillar region S1.

Accordingly, for the pattern of FIG. 23, when the candidate electronic device is the electronic device 120-b, the determining module of the multimedia interaction module 128-c determines that the relative position between the target direction Dt and the candidate electronic device 120-b satisfies the second predetermined condition in the sixth embodiment of the aforementioned operation 414. When the candidate electronic device is the electronic device 120-n, the determining module of the multimedia interaction module 128-c determines that the relative position between the target direction Dt and the candidate electronic device 120-n does not satisfy the second predetermined condition in the sixth embodiment of the aforementioned operation 414.

In a seventh embodiment of the operation 414, the aforementioned second predetermined condition specifies that the candidate electronic device is positioned in a pyramidal or cone region S2 to which the target direction Dt points, wherein the target direction Dt is an axis of the pyramidal or cone region S2, a location of the basis electronic device 120-a is an apex of the pyramidal or cone region S2, and a vertex angle of the pyramidal or cone region S2 is an acute angle. In practice, the pyramidal or cone region S2 may be a pyramidal region or a cone region.

Figure 24:
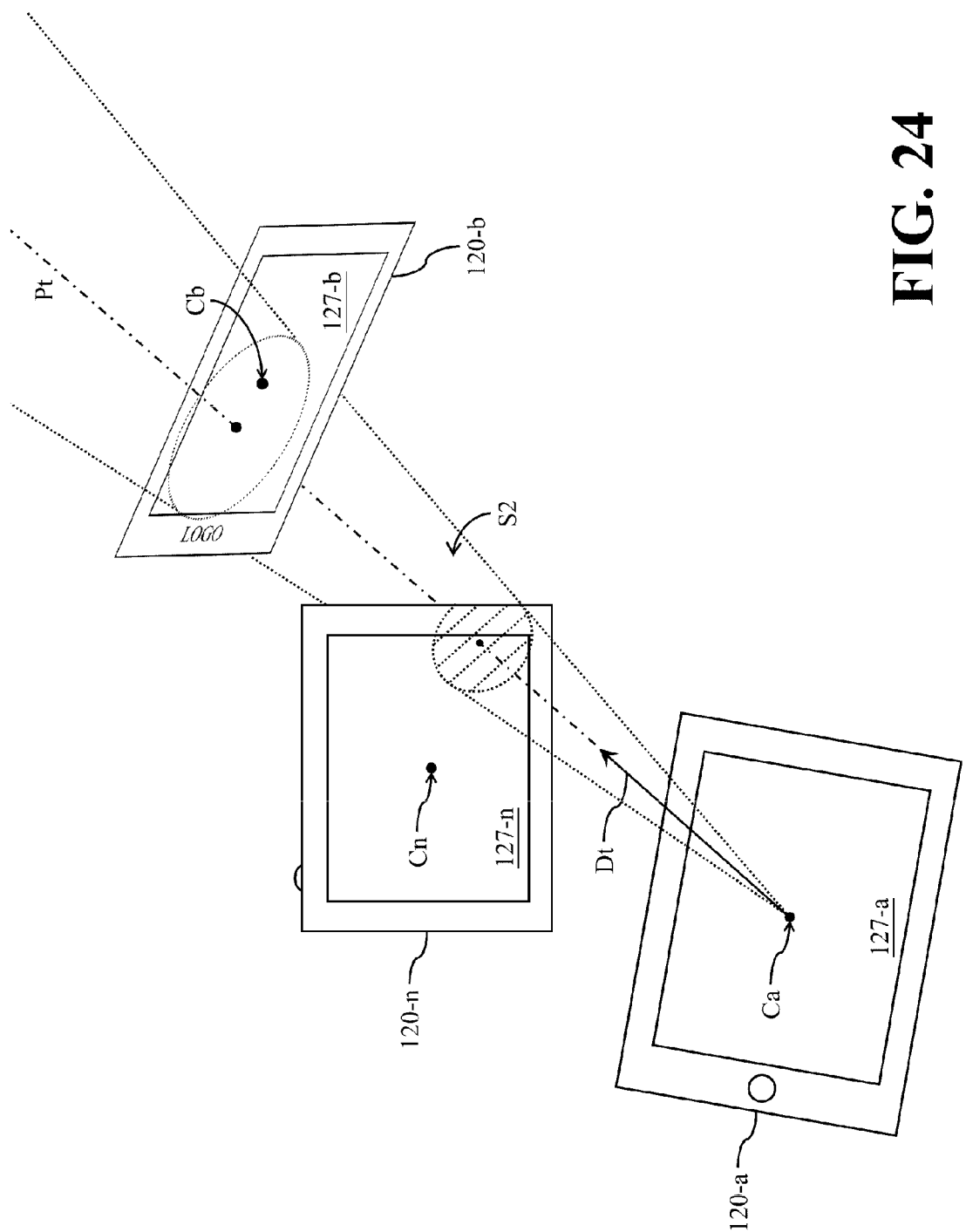

In the pattern of FIG. 24, the pyramidal or cone region S2 is a cone region and the centroid Cb of the display 127-b is positioned within the cone region S2, which means that the electronic device 120-b is positioned in the cone region S2. The centroid Cn of the display 127-n is positioned outside the cone region S2, which means that the electronic device 120-n is not positioned in the cone region S2.

Accordingly, for the pattern of FIG. 24, when the candidate electronic device is the electronic device 120-b, the determining module of the multimedia interaction module 128-c determines that the relative position between the target direction Dt and the candidate electronic device 120-b satisfies the second predetermined condition in the seventh embodiment of the aforementioned operation 414. When the candidate electronic device is the electronic device 120-n, the determining module of the multimedia interaction module 128-c determines that the relative position between the target direction Dt and the electronic device 120-n does not satisfy the second predetermined condition in the seventh embodiment of the aforementioned operation 414.

In an eighth embodiment of the operation 414, the aforementioned second predetermined condition specifies that a first included angle between the target direction Dt and a first direction is an acute angle and less than a threshold angle Ath, wherein the location of the basis electronic device 120-*a* is a starting point of the first direction, and the first direction points to the location of the candidate electronic device.

Figure 25:
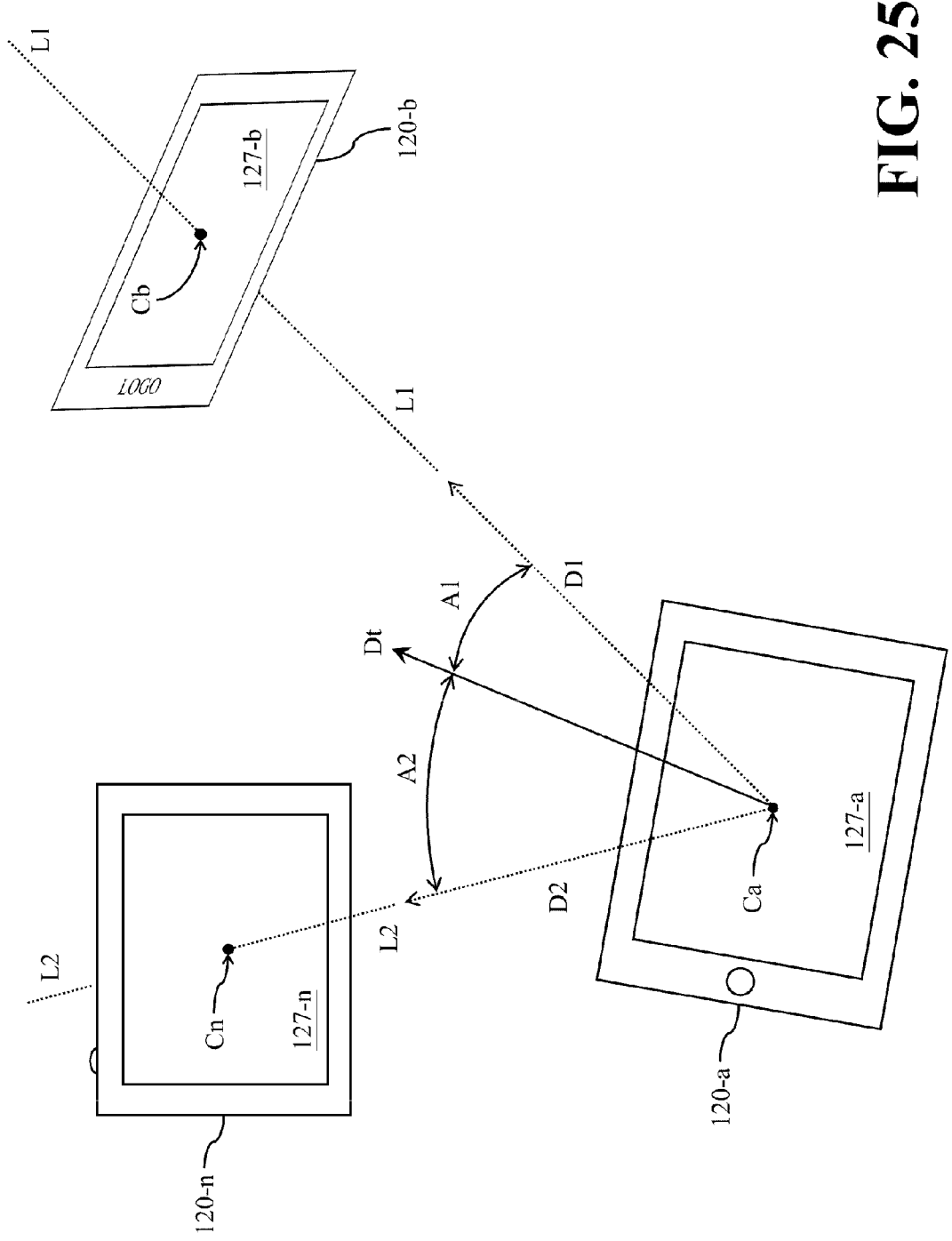

In the pattern of FIG. 25, when the candidate electronic device is the electronic device 120-*b*, the first direction is a direction D1 that points to the centroid Cb of the display 127-*b*, and the centroid Ca of the display 127-*a* is the starting point of the direction D1. A line L1 to which the direction D1 points passes through the centroid Cb of the display 127-*b*. The first included angle is an included angle A1 between the direction D1 and the target direction Dt. The included angle A1 is determined by the distance between the location of the candidate electronic device 120-*b* and the target path Pt to which the target direction Dt points to some extent. In this embodiment, the smaller the included angle A1, the closer the location of the candidate electronic device 120-*b* to the target path Pt. Accordingly, if the included angle A1 is an acute angle and smaller than the threshold angle Ath, the determining module of the multimedia interaction module 128-*c* determines that the relative position between the target direction Dt and the candidate electronic device 120-*b* satisfies the second predetermined condition in the eighth embodiment of the aforementioned operation 414. On the contrary, if the included angle A1 is greater than the threshold angle Ath, the determining module of the multimedia interaction module 128-*c* determines that the relative position between the target direction Dt and the candidate electronic device 120-*b* does not satisfy the second predetermined condition in the eighth embodiment of the aforementioned operation 414.

In the pattern of FIG. 25, when the candidate electronic device is the electronic device 120-*n*, the first direction is a direction D2 that points to the centroid Cn of the display 127-*n*, and the centroid Ca of the display 127-*a* is the starting point of the direction D2. A line L2 to which the direction D2 points passes through the centroid Cn of the display 127-*n*. The first included angle is an included angle A2 between the direction D2 and the target direction Dt. The included angle A2 is determined by the distance between the location of the candidate electronic device 120-*n* and the target path Pt to which the target direction Dt points to some extent. In this embodiment, the smaller the included angle A2, the closer the location of the candidate electronic device 120-*n* to the target path Pt. Accordingly, if the included angle A2 is an acute angle and smaller than the threshold angle Ath, the determining module of the multimedia interaction module 128-*c* determines that the relative position between the target direction Dt and the electronic device 120-*n* satisfies the second predetermined condition in the eighth embodiment of the aforementioned operation 414. On the contrary, if the included angle A2 is greater than the threshold angle Ath, the determining module of the multimedia interaction module 128-*c* determines that the relative position between the target direction Dt and the electronic device 120-*n* does not satisfy the second predetermined condition in the eighth embodiment of the aforementioned operation 414.

In the patterns illustrated in the aforementioned FIG. 25 and some of the following drawings, if the centroids Ca, Cb, and Cn are not positioned on the same spatial plane, the target direction Dt, the direction D1, and the direction D2 are not positioned on the same spatial plane.

If the relative position between the candidate electronic device and the target direction Dt satisfies the second predetermined condition specified in any of the aforementioned first to eighth embodiments, it means that the candidate electronic device is positioned near the target path Pt to which the target direction Dt points, and the distance between the candidate electronic device and the target path Pt is within an error tolerance range. Accordingly, when the multimedia interaction system 100 wants to create a multimedia interaction effect showing that the target image object is transmitted from the source electronic device 120-*c* to the basis electronic device 120-*a* and then rebounds to the candidate electronic device, by adopting the configuration of the second predetermined condition illustrated in any of the aforementioned first to eighth embodiments, the multimedia interaction system 100 is enabled to prevent the candidate electronic device from receiving the target image object when the distance between the candidate electronic device and the target path Pt to which the target direction Dt points is beyond a reasonable range, or to prevent similar unexpected results.

In addition, if the multimedia interaction application being carried out by the multimedia interaction system 100 does not demand a highly accurate determination for the relative position between the candidate electronic device and the target direction Dt, the multimedia interaction system 100 may loosen the aforementioned first predetermined value R1 or the threshold angle Ath. On the contrary, if the multimedia interaction application demands a higher accurate determination for the relative position between the candidate electronic device and the target direction Dt, the multimedia interaction system 100 may lower the aforementioned first predetermined value R1 or the threshold angle Ath, or simply adopt the configuration of the second predetermined condition in the first embodiment of the operation 414.

In a ninth embodiment of the operation 414, the aforementioned second predetermined condition specifies that a second included angle between the target direction Dt and a second direction is an acute angle, and the aforementioned first included angle is less than the second included angle, wherein the location of the basis electronic device 120-*a* is a starting point of the second direction, and the second direction points to a location of a third electronic device of the multimedia interaction system 100.

Figure 26:
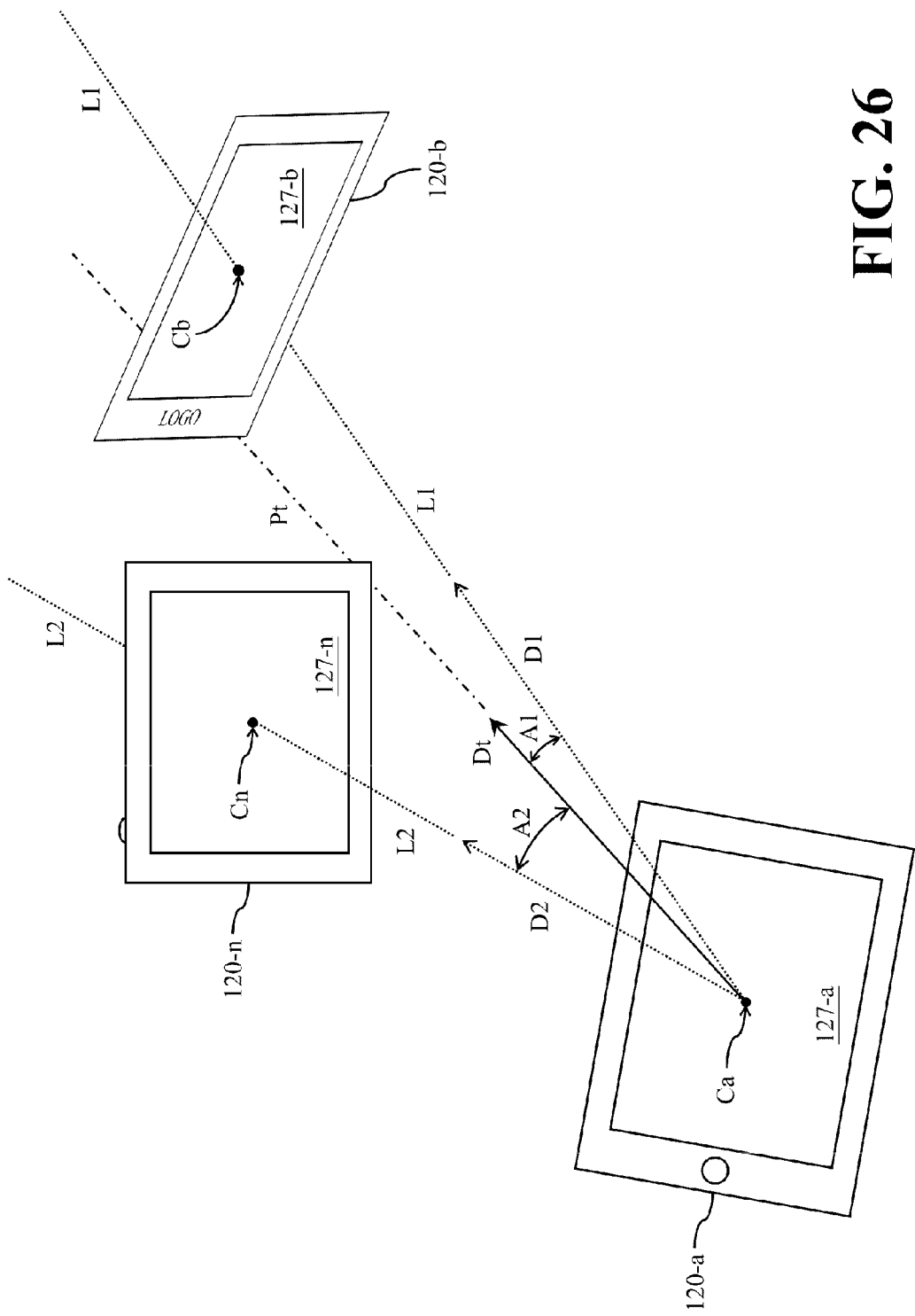

In the pattern of FIG. 26, when the candidate electronic device is the electronic device 120-*b*, the determining module of the multimedia interaction module 128-*c* selects another electronic device near the target path Pt, such as the electronic device 120-*n*, as a third electronic device. In this situation, the first direction is the direction D1 that points to the centroid Cb of the display 127-*b*, and the centroid Ca of the display 127-*a* is the starting point of the direction D1. The first included angle is the included angle A1 between the direction D1 and the target direction Dt. The second direction is the direction D2 that points to the centroid Cn of the display 127-*n*, and the centroid Ca of the display 127-*a* is the starting point of the direction D2. The second included angle is the included angle A2 between the direction D2 and the target direction Dt. The included angle A2 is determined by the distance between the location of the third electronic device 120-*n* and the target path Pt to some extent. In this embodiment, the smaller the included angle A2, the closer the third electronic device 120-*n* to the target path Pt. In the pattern of FIG. 26, since the included angle A1 is an acute angle and less than the included angle A2, it means that the location of the candidate electronic device 120-*b* is closer to the target path Pt than the third electronic device 120-*n*. Accordingly, the determining module of the multimedia interaction module 128-*c* determines that the relative position between the target direction Dt and the candidate electronic device 120-*b* satisfies the second predetermined condition in the ninth embodiment of the aforementioned operation 414.

In the pattern of FIG. 26, when the candidate electronic device is the electronic device 120-*n*, the determining module of the multimedia interaction module 128-*c* selects another electronic device near the target path Pt, such as the electronic device 120-*b*, as a third electronic device. In this situation, the first direction is the direction D2 that points to the centroid Cn of the display 127-*n*, and the centroid Ca of the display 127-*a* is the starting point of the direction D2. The first included angle is the included angle A2 between the direction D2 and the target direction Dt. The second direction is the direction D1 that points to the centroid Cb of the display 127-*b*, and the centroid Ca of the display 127-*a* is the starting point of the direction D1. The second included angle is the included angle A1 between the direction D1 and the target direction Dt. In the pattern of FIG. 26, the included angle A2 is greater than the included angle A1, it means that the location of the third electronic device 120-*b* is closer to the target path Pt to which the target direction Dt points than the location of the electronic device 120-*n*. Accordingly, the determining module of the multimedia interaction module 128-*c* determines that the relative position between the target direction Dt and the candidate electronic device 120-*n* does not satisfy the second predetermined condition in the ninth embodiment of the aforementioned operation 414.

When the multimedia interaction system 100 wants to create a multimedia interaction effect where the target image object or the target command transmitted from the source electronic device 120-*c* can only be received by a single candidate electronic device which is closest to the target path Pt to which the target direction Dt points, by adopting the configuration of the second predetermined condition illustrated in the aforementioned ninth embodiment, the multimedia interaction system 100 is enabled to prevent the target image object from being received by multiple candidate electronic devices, or to prevent similar unexpected results.

In a tenth embodiment of the operation 414, the aforementioned second predetermined condition specifies that the candidate electronic device is positioned on the target path Pt, and a section of the target path Pt between the basis electronic device 120-*a* and the candidate electronic device does not contact with other electronic devices of the multimedia interaction system 100.

In an eleventh embodiment of the operation 414, the aforementioned second predetermined condition specifies that the distance between the location of the candidate electronic device and the target path Pt is less than the first predetermined value R1, and a section of the target path Pt between the basis electronic device 120-*a* and the candidate electronic device does not contact with other electronic devices of the multimedia interaction system 100.

In a twelfth embodiment of the operation 414, the aforementioned second predetermined condition specifies that the target path Pt passes through the display of the candidate electronic device, and a section of the target path Pt between the basis electronic device 120-*a* and the candidate electronic device does not contact with other electronic devices of the multimedia interaction system 100.

In a thirteenth embodiment of the operation 414, the aforementioned second predetermined condition specifies that the candidate electronic device is positioned on the target vertical plane in which the target path Pt resides, and a section of the target vertical plane between the basis electronic device 120-*a* and the candidate electronic device does not contact with other electronic devices of the multimedia interaction system 100.

In a fourteenth embodiment of the operation 414, the aforementioned second predetermined condition specifies that a distance between the location of the candidate electronic device and the target vertical plane is less than the first predetermined value R1, and a section of the target vertical plane between the basis electronic device 120-*a* and the candidate electronic device does not contact with other electronic devices of the multimedia interaction system 100.

Figure 27:
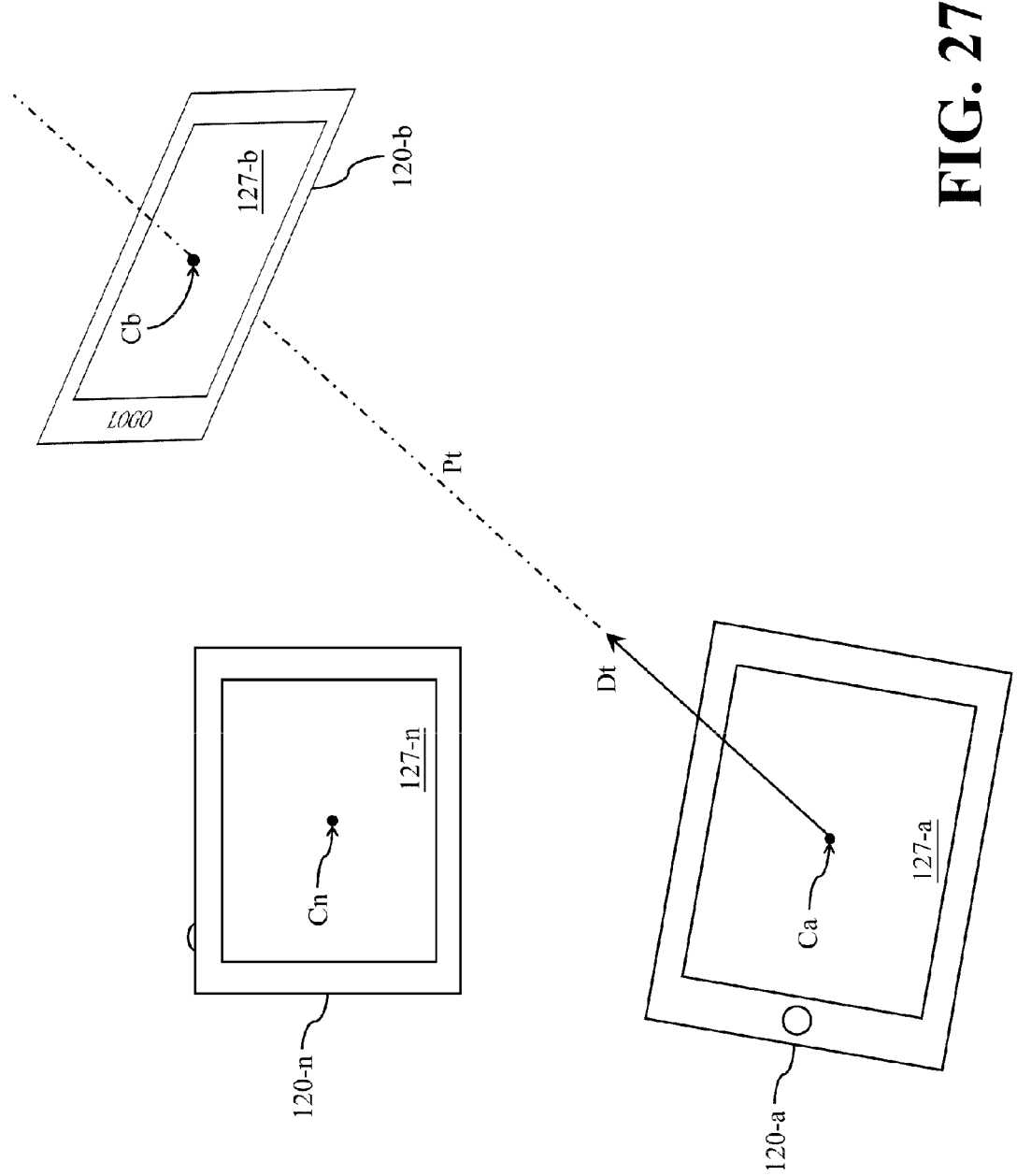

In the pattern of FIG. 27, the target path Pt to which the target direction Dt points passes through the centroid Cb of the display 127-*b*, which means that the electronic device 120-*b* is positioned on the target path Pt and also positioned on the target vertical plane in which the target path Pt resides. Since the electronic device 120-*b* is positioned on the target path Pt and the target vertical plane, the distance between the electronic device 120-*b* and the target path Pt is zero, and the distance between the electronic device 120-*b* and the target vertical plane is zero as well. In addition, a section of the target path Pt between the basis electronic device 120-*a* and the electronic device 120-*b* does not contact with other electronic devices. In one aspect, this means that the section between the basis electronic device 120-*a* and the electronic device 120-*b* is not blocked by other electronic devices.

Accordingly, for the pattern of FIG. 27, when the candidate electronic device is the electronic device 120-*b*, the determining module of the multimedia interaction module 128-*c* determines that the relative position between the target direction Dt and the candidate electronic device 120-*b* satisfies the second predetermined condition in the tenth to fourteenth embodiments of the aforementioned operation 414.

In comparison with FIG. 27, in the pattern of aforementioned FIG. 22, the section of the target path Pt between the basis electronic device 120-*a* and the electronic device 120-*b* passes through the region of the display 127-*n* of the electronic device 120-*n*. In one aspect, this means that the section between the basis electronic device 120-*a* and the electronic device 120-*b* is blocked by the electronic device 120-*n*.

Accordingly, for the pattern of FIG. 22, when the candidate electronic device is the electronic device 120-*b*, the determining module of the multimedia interaction module 128-*c* determines that the relative position between the target direction Dt and the candidate electronic device 120-*b* does not satisfy the second predetermined condition in the tenth to fourteenth embodiments of the aforementioned operation 414.

If the relative position between the candidate electronic device and the target direction Dt satisfies the second predetermined condition specified in any of the aforementioned tenth to fourteenth embodiments, it means that the candidate electronic device is positioned near the target path Pt to which the target direction Dt points, the distance between the candidate electronic device and the target path Pt is within an error tolerance range, and no other electronic device is positioned between the candidate electronic device and the basis electronic device 120-*a*. Accordingly, when the multimedia interaction system 100 wants to create a multimedia interaction effect where the target image object can be transmitted from the source electronic device 120-*c* to the basis electronic device 120-*a* and then rebounds to the candidate electronic device only if no other electronic device is positioned between the candidate electronic device and the basis electronic device 120-*a*, by adopting the configuration of the second predetermined condition illustrated in any of the tenth to fourteenth embodiments of the aforementioned operation 414, the multimedia interaction system 100 is enabled to prevent the candidate electronic device from receiving the target image object if there is other electronic device blocking between the candidate electronic device and the basis electronic device 120-a, or to prevent similar unexpected results.

In a fifteenth embodiment of the operation 414, the aforementioned second predetermined condition specifies that a third included angle is defined by the aforementioned first direction and second direction, and the first included angle is less than a half of the third included angle.

In a sixteenth embodiment of the operation 414, the aforementioned second predetermined condition specifies that a second vertical plane (not shown) in which the aforementioned second direction resides divides a space into a first space and a second space, wherein the second vertical plane is perpendicular to the ground, the target direction Dt points to the first space, and the candidate electronic device is positioned in the first space.

Figure 28:
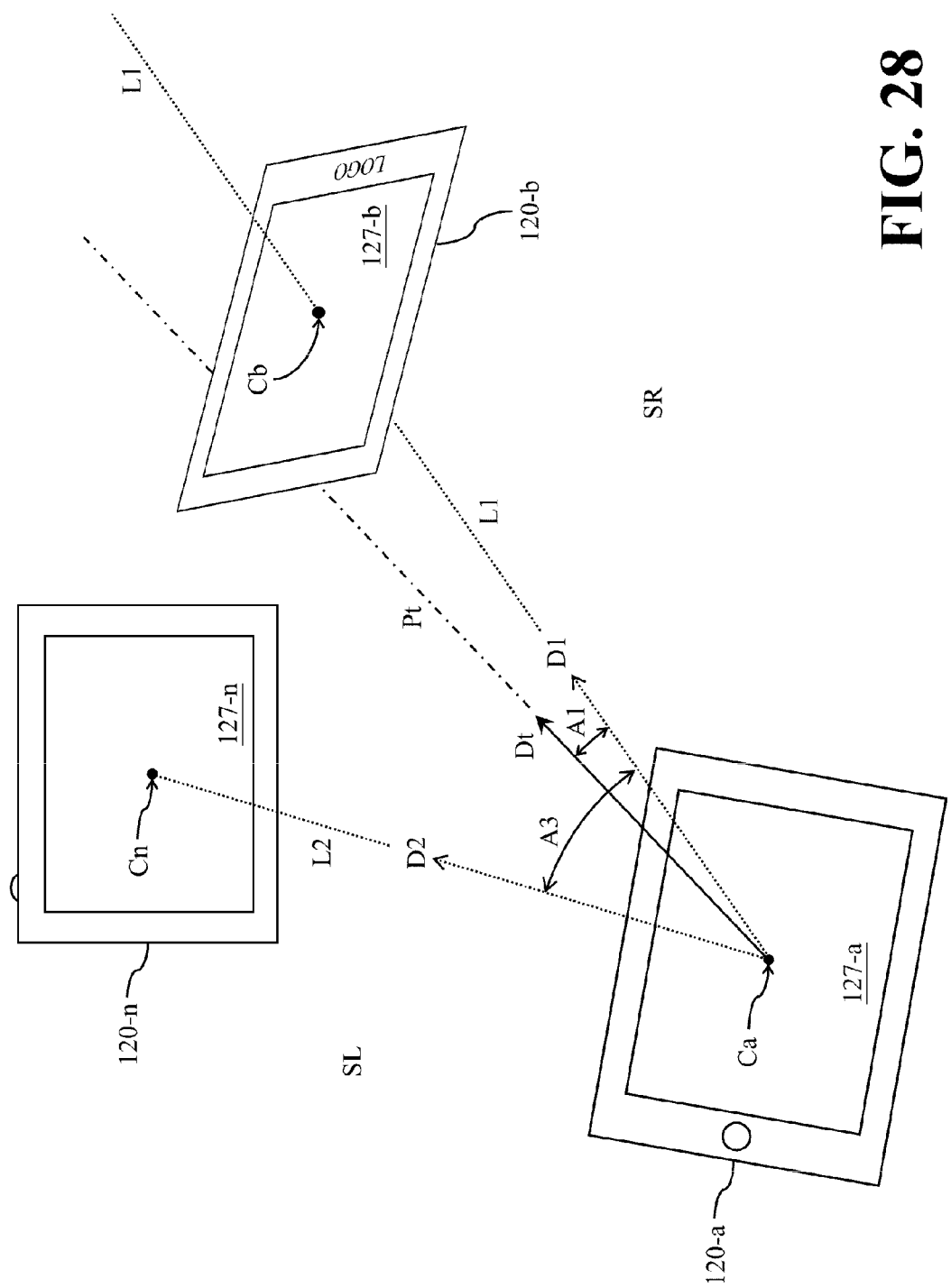

In the pattern of FIG. 28, when the candidate electronic device is the electronic device 120-b, the determining module of the multimedia interaction module 128-c selects another electronic device near the target path Pt, such as the electronic device 120-n, as a third electronic device. In this situation, the first direction is the direction D1 that points to the centroid Cb of the display 127-b, and the centroid Ca of the display 127-a is the starting point of the direction D1. The first included angle is the included angle A1 between the direction D1 and the target direction Dt. The second direction is the direction D2 that points to the centroid Cn of the display 127-n, and the centroid Ca of the display 127-a is the starting point of the direction D2. The third included angle is an included angle A3 between the direction D1 and the direction D2. If the included angle A1 is less than a half of the included angle A3, it means that the location of the candidate electronic device 120-b is closer to the target path Pt than the location of the third electronic device 120-n. In addition, a second vertical plane (not shown) in which the direction D2 resides divides a space into a first space SR and a second space SL, wherein the second vertical plane is perpendicular to the ground. As shown in FIG. 28, the target direction Dt points to the first space SR, and the candidate electronic device 120-b is positioned in the first space SR. Accordingly, the determining module of the multimedia interaction module 128-c determines that the relative position between the target direction Dt and the candidate electronic device 120-b satisfies the second predetermined condition in the fifteenth and sixteenth embodiments of the aforementioned operation 414.

When the multimedia interaction system 100 wants to create a multimedia interaction effect where the target image object or the target command transmitted from the source electronic device 120-c can only be received by a single candidate electronic device which is closest to the target path Pt to which the target direction Dt points, by adopting the configuration of the second predetermined condition illustrated in the fifteenth or sixteenth embodiment of the aforementioned operation 414, the multimedia interaction system 100 is enabled to prevent the target image object from being received by multiple candidate electronic devices, or to prevent similar unexpected results.

In a seventeenth embodiment of the operation 414, the aforementioned second predetermined condition specifies that a basis vertical plane (not shown) in which an orientation direction (hereinafter, basis orientation direction) Da of the basis electronic device 120-a resides refers the location of the basis electronic device 120-a as an axis and rotates a first viewing angle VA1 toward two sides of the axis to define a target viewing angle region, wherein the basis vertical plane is perpendicular to the ground, the basis vertical plane divides the target viewing angle region into a first half space and a second half space, the target direction Dt points to the first half space, and the candidate electronic device is positioned in the first half space.

In an eighteenth embodiment of the operation 414, the aforementioned second predetermined condition specifies that a fourth included angle is defined by the basis orientation direction Da and the target direction Dt, a fifth included angle is defined by the aforementioned first direction and the basis orientation direction Da, and the fourth included angle and the fifth included angle are both less than the first viewing angle VA1.

Figure 29:
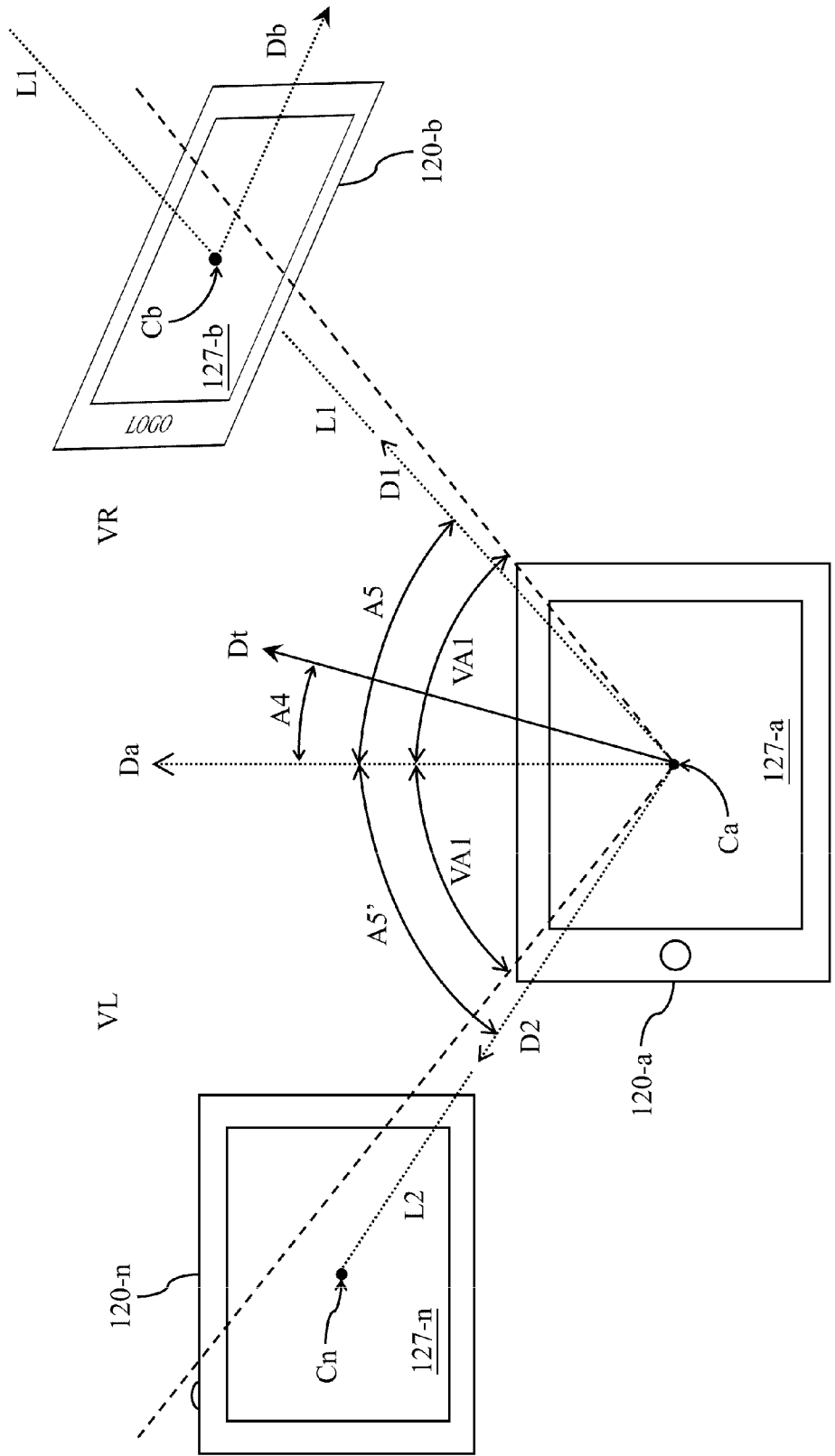

In the pattern of FIG. 29, a basis vertical plane (not shown) in which the basis orientation direction Da resides refers the location of the basis electronic device 120-a (e.g., the location of the centroid Ca of the display 127-a in this embodiment) as an axis and rotates the first viewing angle VA1 toward two sides of the axis to define the target viewing angle region consisting of a right-half space VR and a left-half space VL, wherein the basis vertical plane is perpendicular to the ground. The centroid Cb of the display 127-b is positioned within the right-half space VR, which means that the electronic device 120-b is positioned within the right-half space VR. As shown in FIG. 29, the target direction Dt points to the right-half space VR. The fourth included angle is an included angle A4 between the basis orientation direction Da and the target direction Dt. If the included angle A4 is less than the first viewing angle VA1, it means that the target direction Dt points to the target viewing angle region of the basis electronic device 120-a.

For the pattern of FIG. 29, when the candidate electronic device is the electronic device 120-b, the first direction is the direction D1 that points to the centroid Cb of the display 127-b, and the centroid Ca of the display 127-a is the starting point of the direction D1. The fifth included angle is an included angle A5 between the direction D1 and the basis orientation direction Da. Since the included angle A4 and the included angle A5 are both less than the first viewing angle VA1, the determining module of the multimedia interaction module 128-c determines that the relative position between the target direction Dt and the candidate electronic device 120-b satisfies the second predetermined condition in the seventeenth and eighteenth embodiments of the aforementioned operation 414.

As shown in FIG. 29, the centroid Cn of the display 127-n is positioned outside the target viewing angle region, which means that the electronic device 120-n is positioned outside the target viewing angle region.

For the pattern of FIG. 29, when the candidate electronic device is the electronic device 120-n, the first direction is the direction D2 that points to the centroid Cn of the display 127-n, and the centroid Ca of the display 127-a is the starting point of the direction D2. The fifth included angle in this case is an included angle A5' between the direction D2 and the basis orientation direction Da. As shown in FIG. 29, the included angle A5' is greater than the first viewing angle VA1, which means that the candidate electronic device 120-n is positioned outside the target viewing angle region. Accordingly, the determining module of the multimedia interaction module 128-c determines that the relative position between the target direction Dt and the candidate electronic device 120-n does not satisfy the second predetermined condition in the seventeenth and eighteenth embodiments of the aforementioned operation 414.

When the multimedia interaction system 100 wants to create a multimedia interaction effect where the target image object or the target command transmitted from the source electronic device 120-c can be received by a candidate electronic device only if the candidate electronic device is positioned within the target viewing angle region of the basis electronic device 120-a, by adopting the configuration of the second predetermined condition illustrated in the aforementioned seventeenth or eighteenth embodiment, the multimedia interaction system 100 is enabled to prevent the target image object from being received by other electronic devices outside the target viewing angle region of the basis electronic device 120-a, or to prevent similar unexpected results.

In a nineteenth embodiment of the operation 414, the aforementioned second predetermined condition specifies that a sixth included angle is defined by a candidate orientation direction of the candidate electronic device and a first inverse direction, the aforementioned fourth included angle and fifth included angle are both less than the aforementioned first viewing angle VAL and the sixth included angle is less than a second viewing angle VA2, wherein the location of the candidate electronic device is a starting point of the first inverse direction, and the first inverse direction points to the location of the basis electronic device 120-a.

In a twentieth embodiment of the operation 414, the aforementioned second predetermined condition specifies that a candidate vertical plane (not shown) in which the candidate orientation direction resides refers the location of the candidate electronic device as an axis and rotates the second viewing angle VA2 toward two sides of the axis to define a second candidate viewing angle space, wherein the candidate vertical plane is perpendicular to the ground, the basis electronic device 120-a is positioned in the second candidate viewing angle space, the target direction Dt points to the aforementioned first half space, and the candidate electronic device is positioned in the first half space.

When the fifth included angle is less than the first viewing angle VAL it means that the candidate electronic device is positioned within the target viewing angle region of the basis electronic device 120-a. When the sixth included angle is less than the second viewing angle VA2, it means that the basis electronic device 120-a is positioned within the second candidate viewing angle space of the candidate electronic device.

Figure 30:
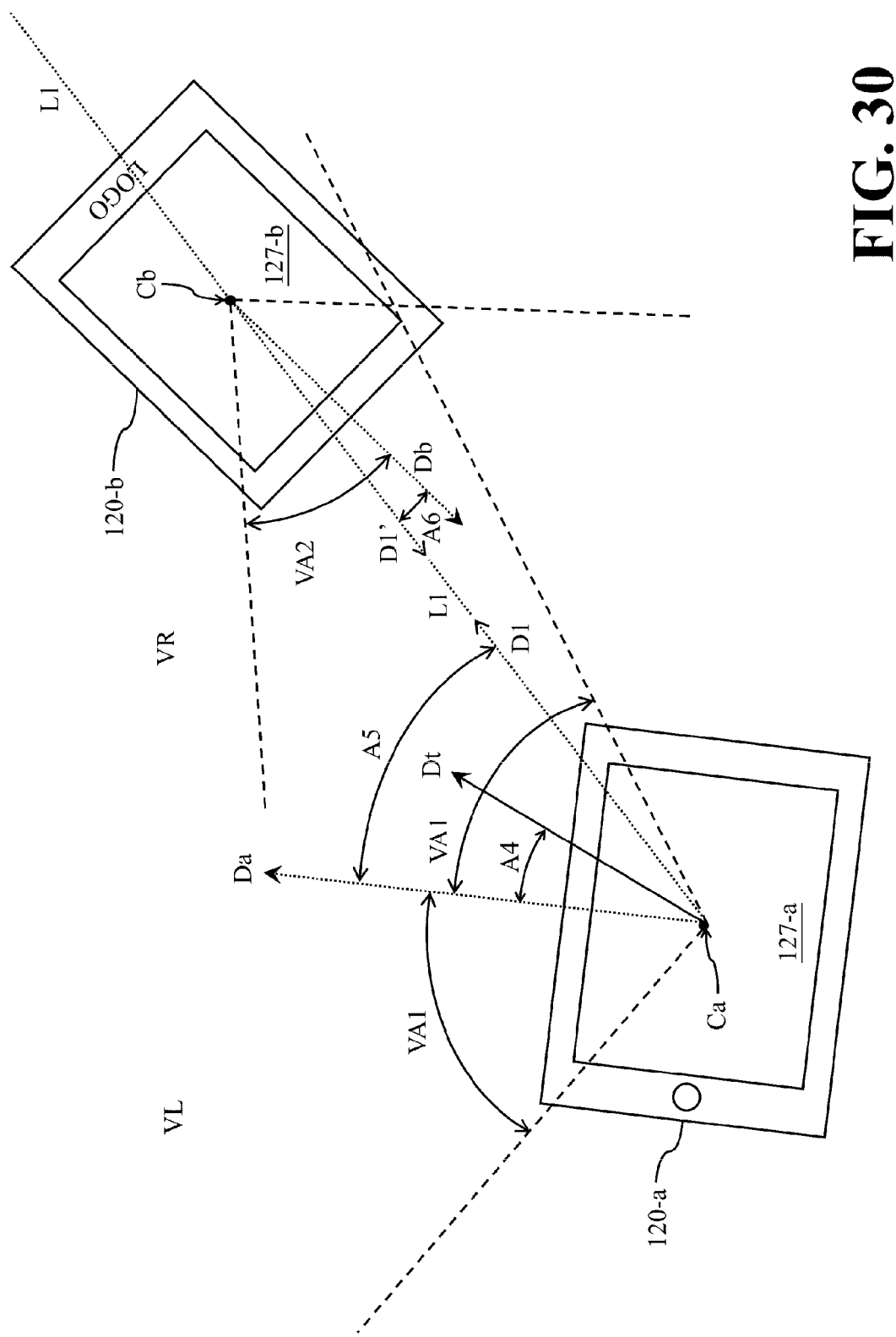

In the pattern of FIG. 30, the basis vertical plane (not shown) in which the basis orientation direction Da resides refers the location of the basis electronic device 120-a (e.g., the location of the centroid Ca of the display 127-a in this embodiment) as an axis and rotates the first viewing angle VA1 toward two sides of the axis to define the target viewing angle region consisting of the right-half space VR and the left-half space VL. The centroid Cb of the display 127-b is positioned within the right-half space VR, which means that the electronic device 120-b is positioned within the right-half space VR. As shown in FIG. 30, the target direction Dt points to the right-half space VR. The fourth included angle is the included angle A4 between the basis orientation direction Da and the target direction Dt. When the included angle A4 is less than the first viewing angle VA1, it means that the target direction Dt points to the target viewing angle region of the basis electronic device 120-a. When the candidate electronic device is the electronic device 120-b, the first direction is the direction D1 that points to the centroid Cb of the display 127-b, and the centroid Ca of the display 127-a is the starting point of the direction D1. The fifth included angle is the included angle A5 between the direction D1 and the basis orientation direction Da. The determining module of the multimedia interaction module 128-c may shift the first direction D1 so that the location of the candidate electronic device 120-b (e.g., the location of the centroid Cb in this embodiment) becomes a starting point of the shifted version of the first direction D1. The determining module of the multimedia interaction module 128-c then inverses the shifted version of the first direction D1 and utilizes the inversed result of the shifted version of the first direction D1 as a first inverse direction D1'. The sixth included angle is an included angle A6 between the first inverse direction D1' and the candidate orientation direction Db of the candidate electronic device 120-b. The candidate vertical plane (not shown) in which the candidate orientation direction Db resides refers the location of the candidate electronic device 120-b (e.g., the location of the centroid Cb in this embodiment) as an axis and rotates the second viewing angle VA2 toward two sides of the axis to define a second candidate viewing angle space. As shown in FIG. 30, since the included angle A5 is less than the first viewing angle VA1, and the included angle A6 is less than the second viewing angle VA2, the determining module of the multimedia interaction module 128-c determines that the relative position between the target direction Dt and the candidate electronic device 120-b satisfies the second predetermined condition in the nineteenth and twentieth embodiments of the aforementioned operation 414. In the nineteenth embodiment of the operation 414, by restricting the fifth included angle to be less than the first viewing angle VA1 and restricting the sixth included angle to be less than the second viewing angle VA2, the source electronic device 120-c is allowed to transmit the target command to the candidate electronic device 120-b only if the relative position between the basis electronic device 120-a and the candidate electronic device 120-b belongs to or is close to a face-to-face pattern, thereby avoiding strange user experience.

In practice, the aforementioned first viewing angle VA1 may be the same as the second viewing angle VA2, or may be different from the second viewing angle VA2.

When the multimedia interaction system 100 wants to create the multimedia interaction effect where the target image object or the target command transmitted from the source electronic device 120-c can be received by a candidate electronic device only if the relative position between basis electronic device 120-a and the candidate electronic device 120-b belongs to or is close to a face-to-face pattern, by adopting the configuration of the second predetermined condition illustrated in the nineteenth or twentieth embodiment of the aforementioned operation 414, the multimedia interaction system 100 is enabled to prevent the target image object or the target command from being received by the candidate electronic device when the candidate electronic device is back to the basis electronic device 120-a, or to prevent similar unexpected results. On the other hand, by adopting the configuration of the second predetermined condition illustrated in the nineteenth or twentieth embodiment of the aforementioned operation 414, the multimedia interaction system 100 is enabled to prevent the target image object or the target command from being received by the candidate electronic device when the basis electronic device 120-a is back to the candidate electronic device, or to prevent similar unexpected results.

In practice, the multimedia interaction system 100 may determine whether a relative position between the candidate electronic device and the target direction Dt satisfies the second predetermined condition in the aforementioned operation 414 according to the two dimensional coordinates of the candidate electronic device. As described previously, the multimedia interaction system 100 may utilize the location detection circuit 110 to detect the projection location, the shape of the projection region, and the orientation on the same reference horizontal plane that is parallel to the ground for each of the electronic devices 120-a~120-n. In the multimedia interaction system 100, the projection location of the particular geometry characteristic of the electronic device 120, the projection location of the particular symbol of the electronic device 120, the projection location of the particular element of the electronic device 120, or the projection location of the particular region of the electronic device 120 on the reference horizontal plane may be utilized to represent the spatial location of the electronic device 120.

The operations of determining whether the relative position between the candidate electronic device and the target direction Dt satisfies the second predetermined condition in the aforementioned operation 414 conducted by the source electronic device 120-c according to the two dimensional coordinates of the candidate electronic device will be further described below by reference to FIGS. 31~39.

FIGS. 31~39 show simplified schematic diagrams of different types of relative position among partial electronic devices in the multimedia interaction system 100 when the user of the source electronic device 120-c instructs the source electronic device 120-c to transmit the target image object 500 toward the selected direction Ds according to several embodiments of the present disclosure. In FIGS. 31~39, 120-ap denotes a projection region projected by the electronic device 120-a on the reference horizontal plane, 127-ap denotes a projection region projected by the display 127-a on the reference horizontal plane, and Cap denotes a projection location of the centroid Ca of the display 127-a on the reference horizontal plane. 120-bp denotes a projection region projected by the electronic device 120-b on the reference horizontal plane, 127-bp denotes a projection region projected by the display 127-b on the reference horizontal plane, and Cbp denotes a projection location of the centroid Cb of the display 127-b on the reference horizontal plane. 120-cp denotes a projection region projected by the electronic device 120-c on the reference horizontal plane, 127-cp denotes a projection region projected by the display 127-c on the reference horizontal plane, and Ccp denotes a projection location of the centroid Cc of the display 127-c on the reference horizontal plane. 120-np denotes a projection region projected by the electronic device 120-n on the reference horizontal plane, 127-np denotes a projection region projected by the display 127-n on the reference horizontal plane, and Cnp denotes a projection location of the centroid Cn of the display 127-n on the reference horizontal plane. A target projection direction Dtp denotes a projection of the target direction Dt on the reference horizontal plane.

For the purpose of explanatory convenience in the following description, it is assumed hereinafter that the multimedia interaction system 100 utilizes the projection location of the centroid of the display 127 on the reference horizontal plane to represent the projection location of the electronic device 120 on the reference horizontal plane.

In a twenty-first embodiment of the operation 414, the aforementioned second predetermined condition specifies that a projection location (hereinafter, candidate projection location) projected by the candidate electronic device on the reference horizontal plane parallel to the ground is positioned on a target projection path Ptp to which the target projection direction Dtp points, wherein the target projection direction Dtp is projected by the target direction Dt on the reference horizontal plane.

In a twenty-second embodiment of the operation 414, the aforementioned second predetermined condition specifies that a distance between the candidate projection location and the target projection path Ptp is less than the first predetermined value R1.

In a twenty-third embodiment of the operation 414, the aforementioned second predetermined condition specifies that the target projection path Ptp passes through a display projection region projected by the display of the candidate electronic device on the reference horizontal plane.

Figure 31:
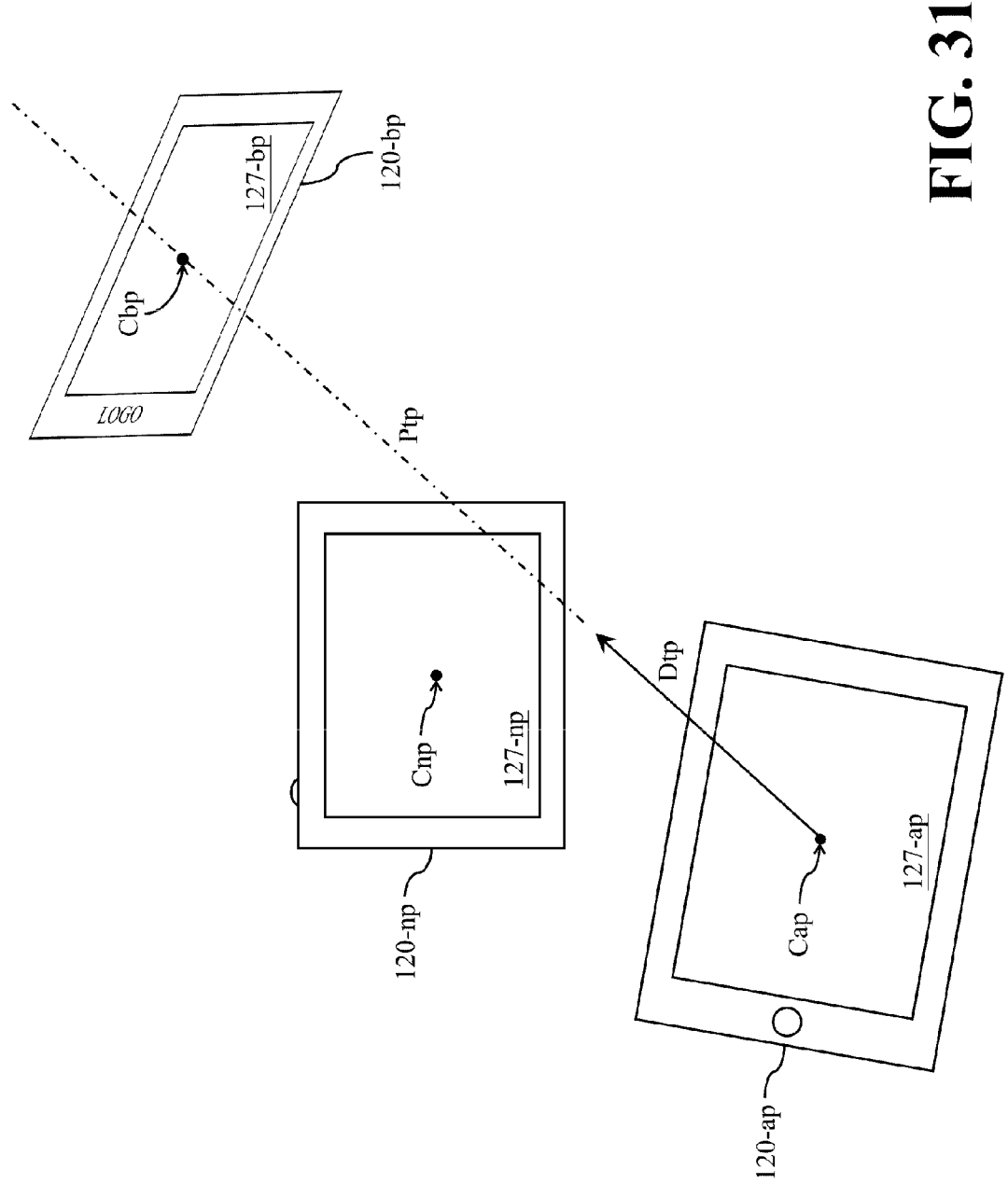
FIGS. 31~39 show simplified schematic diagrams of different types of relative position among projections projected by partial electronic devices in FIG. 1 on a reference horizontal plane according to several embodiments of the present disclosure.

In the pattern of FIG. 31, the target projection direction Dtp is projected by the target direction Dt on the reference horizontal plane, and the target projection path Ptp to which the target projection direction Dtp points passes through the projection location Cbp of the centroid Cb of the display 127-b. This means that the projection location of the electronic device 120-b on the reference horizontal plane is positioned on the target projection path Ptp. Since the projection location of the electronic device 120-b is positioned on the target projection path Ptp, a distance between the projection location of the electronic device 120-b and the target projection path Ptp is zero. As shown in FIG. 31, the target projection path Ptp passes through the projection region 127-np of the display 127-n but does not pass through the projection location Cnp of the centroid Cn of the display 127-n, which means that the projection location of the electronic device 120-n is not positioned on the target projection path Ptp.

Accordingly, for the pattern of FIG. 31, when the candidate electronic device is the electronic device 120-b, the determining module of the multimedia interaction module 128-c determines that a relative position between the electronic device 120-b and the target direction Dt satisfies the second predetermined condition in the twenty-first to twenty-third embodiments of the aforementioned operation 414. When the candidate electronic device is the electronic device 120-n, the determining module of the multimedia interaction module 128-c determines that a relative position between the target direction Dt and the electronic device 120-n satisfies the second predetermined condition in the twenty-third embodiment of the aforementioned operation 414. The determining module of the multimedia interaction module 128-c, however, determines that the relative position between the target direction Dt and the electronic device 120-n does not satisfy the second predetermined condition in the twenty-first embodiment of the aforementioned operation 414.

Figure 32:
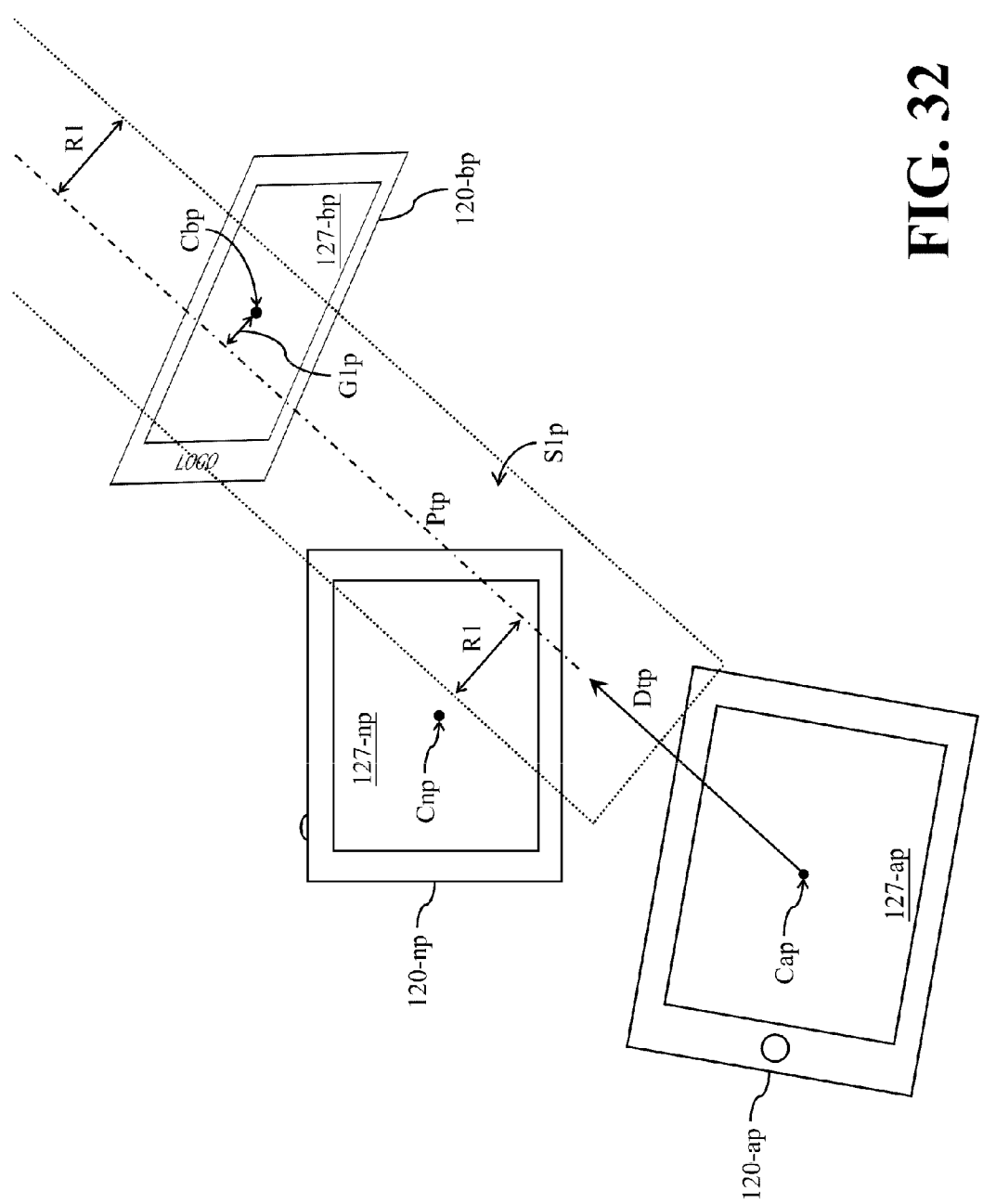

In the pattern of FIG. 32, the target projection path Ptp to which the target projection direction Dtp points passes through a projection region 127-bp of the display 127-b but does not pass through the projection location Cbp of the centroid Cb of the display 127-b. This means that the projection location of the electronic device 120-b is not positioned on the target projection path Ptp. A distance between the projection location Cbp of the centroid Cb and the target projection path Ptp is G1p, which means that the distance between the projection location of the electronic device 120-b and the target projection path Ptp is G1p. In addition, the target projection path Ptp passes through the projection region 127-np of the electronic device 120-n but does not pass through the projection location Cnp of the display 127-n, which means that the projection location of the electronic device 120-n is not positioned on the target projection path Ptp. As shown in FIG. 32, the distance G1p between the projection location Cbp of the centroid Cb of the display 127-b and the target projection path Ptp is less than the first predetermined value R1, but a distance between the projection location Cnp of the centroid Cn of the display 127-n and the target projection path Ptp is apparently greater than the first predetermined value R1.

Accordingly, for the pattern of FIG. 32, when the candidate electronic device is the electronic device 120-b, the determining module of the multimedia interaction module 128-c determines that the relative position between the electronic device 120-b and the target direction Dt satisfies the second predetermined condition in the twenty-second and twenty-third embodiments of the aforementioned operation 414. In comparison, the determining module of the multimedia interaction module 128-c determines that the relative position between the electronic device 120-b and the target direction Dt does not satisfy the second predetermined condition in the twenty-first embodiment of the aforementioned operation 414. When the candidate electronic device is the electronic device 120-n, the determining module of the multimedia interaction module 128-c determines that the relative position between the target direction Dt and the electronic device 120-n does not satisfy the second predetermined condition in the twenty-first and twenty-second embodiments of the aforementioned operation 414. In comparison, the determining module of the multimedia interaction module 128-c determines that the relative position between the target direction Dt and the electronic device 120-n satisfies the second predetermined condition in the twenty-third embodiment of the aforementioned operation 414.

In a twenty-fourth embodiment of the operation 414, the aforementioned second predetermined condition specifies that the target projection direction Dtp points to the target projection path Ptp and a strip region S1p, and the aforementioned candidate projection location is positioned in the strip region S1p, wherein the target projection path Ptp is a central line of the strip region S1p, and a width of the strip region S1p is two times of the first predetermined value R1.

In the pattern of FIG. 32, the projection location Cbp of the centroid Cb of the display 127-b is positioned within the strip region S1p to which the target projection direction Dtp points. This means that the projection location of the electronic device 120-b is positioned in the strip region S1p. The projection location Cnp of the centroid Cn of the display 127-n is positioned outside the strip region S1p, which means that the projection location of the electronic device 120-n is not positioned in the strip region S1p.

Accordingly, for the pattern of FIG. 32, when the candidate electronic device is the electronic device 120-b, the determining module of the multimedia interaction module 128-c determines that the relative position between the target direction Dt and the candidate electronic device 120-b satisfies the second predetermined condition in the twenty-fourth embodiment of the aforementioned operation 414. When the candidate electronic device is the electronic device 120-n, the determining module of the multimedia interaction module 128-c determines that the relative position between the target direction Dt and the candidate electronic device 120-n does not satisfy the second predetermined condition in the twenty-fourth embodiment of the aforementioned operation 414.

In a twenty-fifth embodiment of the operation 414, the aforementioned second predetermined condition specifies that the target projection direction Dtp points to a triangle region S2p, and the aforementioned candidate projection location is positioned in the triangle region S2p, wherein the target projection path Ptp is a central line of the triangle region S2p, a projection location (hereinafter, basis projection location) Cap projected by the basis electronic device 120-a on the reference horizontal plane is an apex of the triangle region S2p, and a vertex angle of the triangle region S2p is an acute angle.

Figure 33:
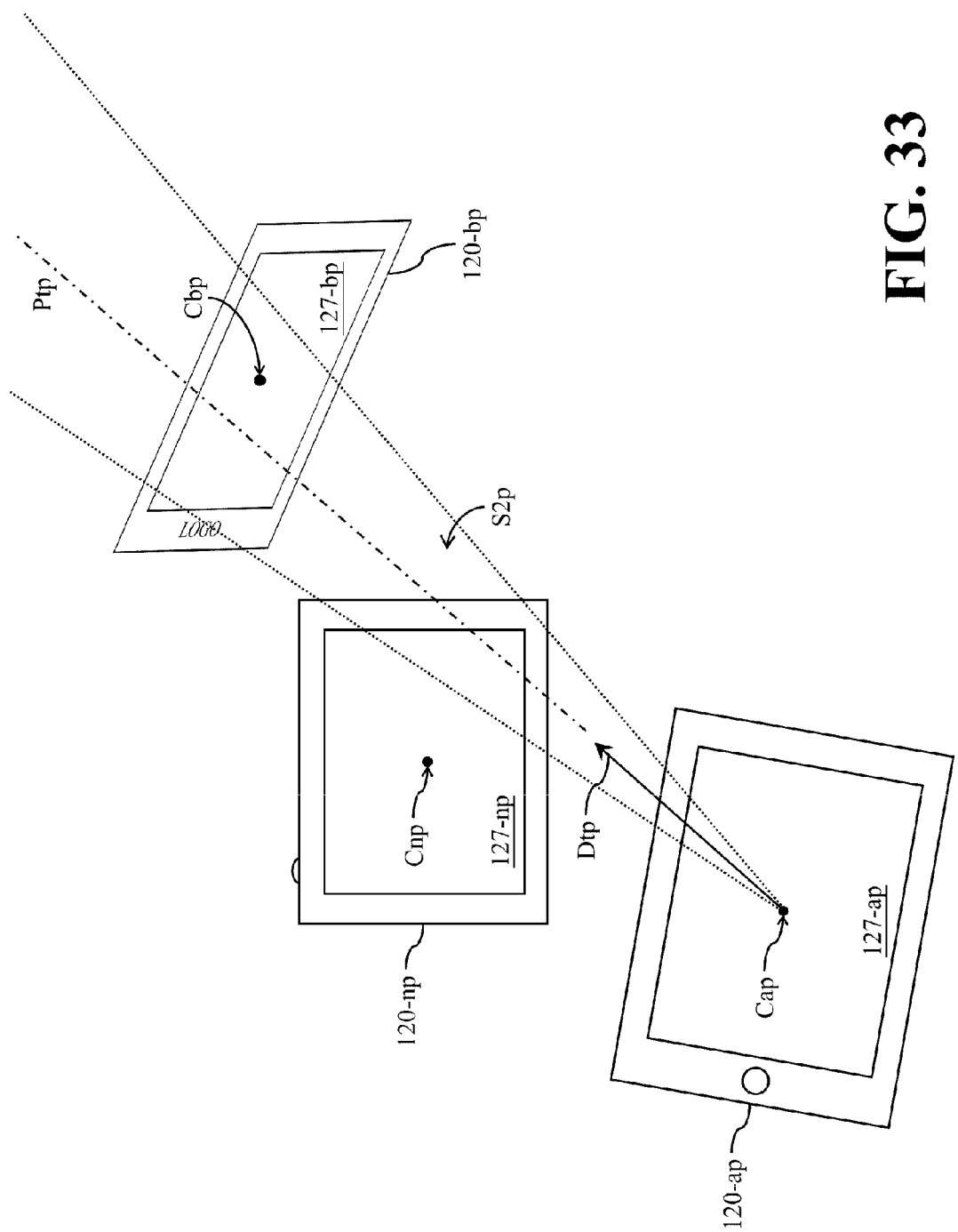

In the pattern of FIG. 33, the projection location Cbp of the centroid Cb of the display 127-b is positioned within the triangle region S2p, which means that the projection location of the electronic device 120-b is positioned in the triangle region S2p. The projection location Cnp of the centroid Cn of the display 127-n is positioned outside the triangle region S2p, which means that the projection location of the electronic device 120-n is not positioned in the triangle region S2p.

Accordingly, for the pattern of FIG. 33, when the candidate electronic device is the electronic device 120-b, the determining module of the multimedia interaction module 128-c determines that the relative position between the electronic device 120-b and the target direction Dt satisfies the second predetermined condition in the twenty-fifth embodiment of the aforementioned operation 414. When the candidate electronic device is the electronic device 120-n, the determining module of the multimedia interaction module 128-c determines that the relative position between the target direction Dt and the electronic device 120-n does not satisfy the second predetermined condition in the twenty-fifth embodiment of the aforementioned operation 414.

In a twenty-sixth embodiment of the operation 414, the aforementioned second predetermined condition specifies that an eleventh included angle between the target projection direction Dtp and a first projection direction is an acute angle and less than a threshold angle Ath, wherein the basis projection location Cap is a starting point of the first projection direction, and the first projection direction points to the aforementioned candidate projection location.

Figure 34:
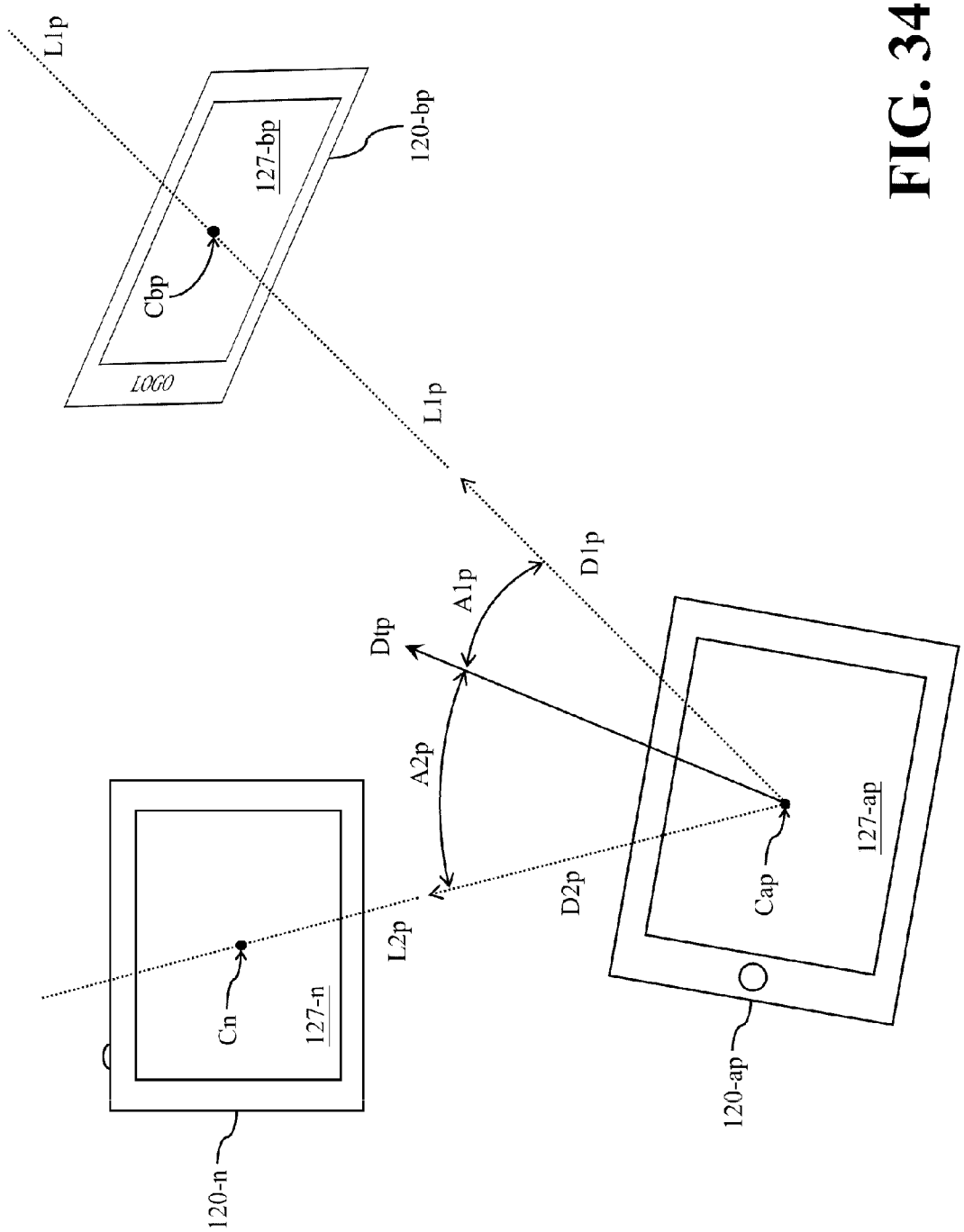

In the pattern of FIG. 34, when the candidate electronic device is the electronic device 120-b, the first projection direction is a projection direction D1p that points to the projection location Cbp of the centroid Cb of the display 127-b, and the projection location Cap of the centroid Ca of the display 127-a is the starting point of the projection direction D1p. The eleventh included angle is an included angle A1p between the projection direction D1p and the target projection direction Dtp. The included angle A1p is determined by the distance between the projection location of the candidate electronic device 120-b and the target projection path Ptp to which the target projection direction Dtp points to some extent. In this embodiment, the smaller the included angle A1p, the closer the projection location of the candidate electronic device 120-b to the target projection path Ptp. Accordingly, if the included angle A1p is an acute angle and smaller than the threshold angle Ath, the determining module of the multimedia interaction module 128-c determines that the relative position between the electronic device 120-b and the target direction Dt satisfies the second predetermined condition in the twenty-sixth embodiment of the aforementioned operation 414. On the contrary, if the included angle A1p is greater than the threshold angle Ath, the determining module of the multimedia interaction module 128-c determines that the relative position between the electronic device 120-b and the target direction Dt does not satisfy the second predetermined condition in the twenty-sixth embodiment of the aforementioned operation 414.

In the pattern of FIG. 34, when the candidate electronic device is the electronic device 120-n, the first projection direction is a projection direction D2p that points to the projection location Cnp of the centroid Cn of the display 127-n, and the projection location Cap of the centroid Ca of the display 127-a is the starting point of the projection direction D2p. The eleventh included angle is an included angle A2p between the projection direction D2p and the target projection direction Dtp. The included angle A2p is determined by the distance between the projection location of the candidate electronic device 120-n and the target projection path Ptp to some extent. In this embodiment, the smaller the included angle A2p, the closer the projection location of the candidate electronic device 120-n to the target projection path Ptp. Accordingly, if the included angle A2p is an acute angle and smaller than the threshold angle Ath, the determining module of the multimedia interaction module 128-c determines that the relative position between the target direction Dt and the electronic device 120-n satisfies the second predetermined condition in the twenty-sixth embodiment of the aforementioned operation 414. On the contrary, if the included angle A2p is greater than the threshold angle Ath, the determining module of the multimedia interaction module 128-c determines that the relative position between the target direction Dt and the electronic device 120-n does not satisfy the second predetermined condition in the twenty-sixth embodiment of the aforementioned operation 414.

If the relative position between the candidate electronic device and the target direction Dt satisfies the second predetermined condition specified in any of the aforementioned twenty-first to twenty-sixth embodiments, it means that the candidate electronic device is positioned near the target path Pt to which the target direction Dt points, and the distance between the candidate electronic device and the target path Pt is within an error tolerance range. Accordingly, when the multimedia interaction system 100 wants to create the multimedia interaction effect showing that the target image object is transmitted from the source electronic device 120-c to the basis electronic device 120-a and then rebounds to the candidate electronic device, by adopting the configuration of the second predetermined condition illustrated in any of the aforementioned twenty-first to twenty-sixth embodiments, the multimedia interaction system 100 is enabled to prevent the candidate electronic device from receiving the target image object when the distance between the candidate electronic device and the target path Pt to which the target direction Dt points is beyond a reasonable range, or to prevent similar unexpected results.

In addition, if the multimedia interaction application being carried out by the multimedia interaction system 100 does not demand a highly accurate determination for the relative position between the candidate electronic device and the target direction Dt, the multimedia interaction system 100 may loosen the aforementioned first predetermined value R1 or the threshold angle Ath. On the contrary, if the multimedia interaction application demands a higher accurate determination for the relative position between the candidate electronic device and the target direction Dt, the multimedia interaction system 100 may lower the aforementioned first predetermined value R1 or the threshold angle Ath, or simply adopt the configuration of the second predetermined condition in the twenty-first embodiment.

In a twenty-seventh embodiment of the operation 414, the aforementioned second predetermined condition specifies that a twelfth included angle between the target projection direction Dtp and a second projection direction is an acute angle, and the aforementioned eleventh included angle is less than the twelfth included angle, wherein the basis projection location Cap is a starting point of the second projection direction, and the second projection direction points to a projection location (hereinafter, third projection location) projected by a third electronic device of the multimedia interaction system 100 on the reference horizontal plane.

Figure 35:
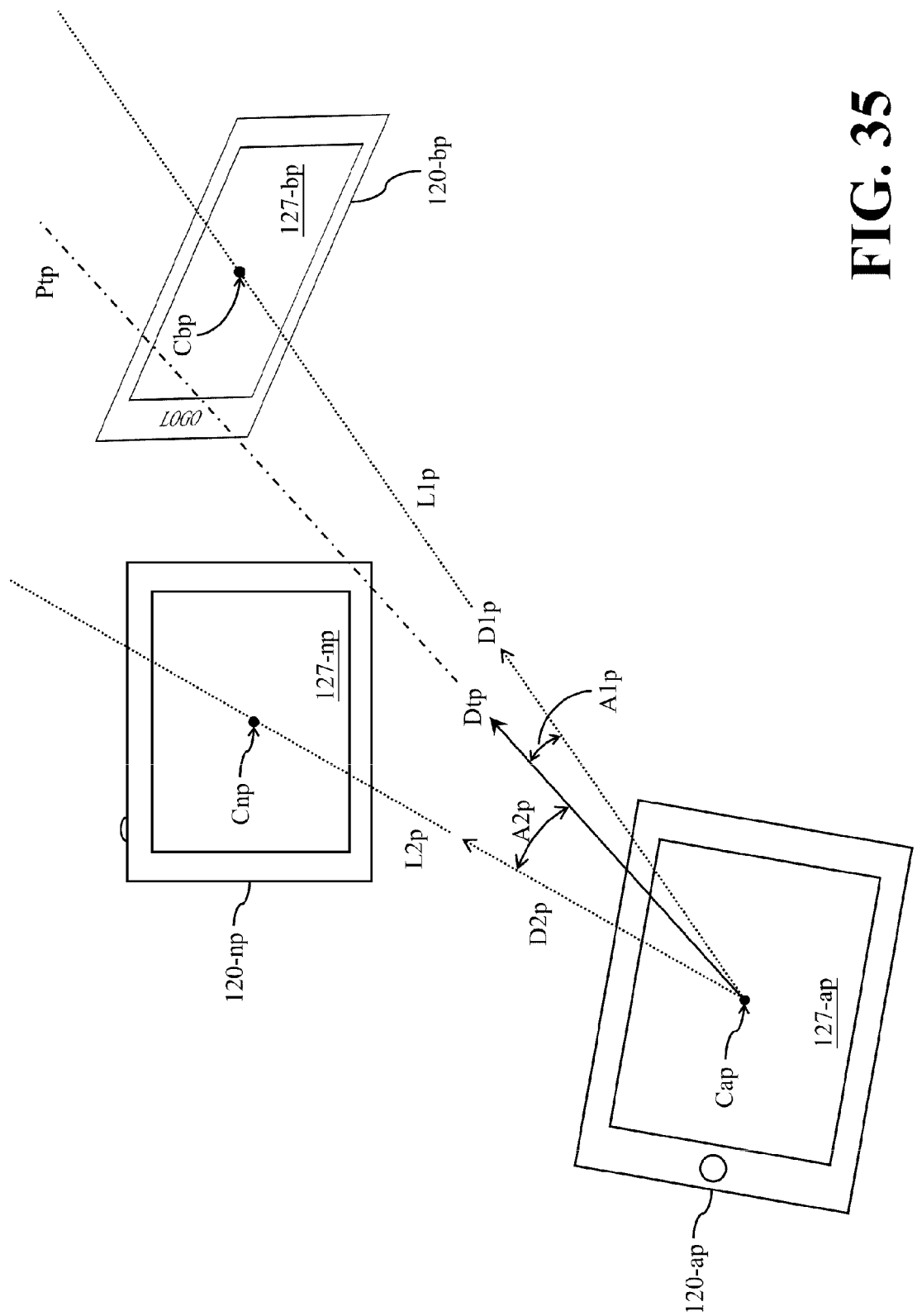

In the pattern of FIG. 35, when the candidate electronic device is the electronic device 120-b, the determining module of the multimedia interaction module 128-c selects another electronic device whose projection location is near the target projection path Ptp, such as the electronic device 120-n, as a third electronic device. In this situation, the first projection direction is the projection direction D1p that points to the projection location Cbp of to the centroid Cb of the display 127-b, and the projection location Cap of the centroid Ca of the display 127-a is the starting point of the projection direction D1p. The eleventh included angle is the included angle A1p between the projection direction D1p and the target projection direction Dtp. The second projection direction is the projection direction D2p that points to the projection location Cnp of the centroid Cn of the display 127-n, and the projection location Cap of the centroid Ca of the display 127-a is the starting point of the projection direction D2p. The twelfth included angle is the included angle A2p between the projection direction D2p and the target projection direction Dtp. The included angle A2p is determined by the distance between the projection location of the third electronic device 120-n and the target projection path Ptp to some extent. In this embodiment, the smaller the included angle A2p, the closer the projection location of the third electronic device 120-n to the target projection path Ptp. In the pattern of FIG. 35, since the included angle A1p is an acute angle and less than the included angle A2p, it means that the projection location of the electronic device 120-b is closer to the target projection path Ptp than the projection location of the third electronic device 120-n. Accordingly, the determining module of the multimedia interaction module 128-c determines that the relative position between the target direction Dt and the candidate electronic device 120-b satisfies the second predetermined condition in the twenty-seventh embodiment of the aforementioned operation 414.

In the pattern of FIG. 35, when the candidate electronic device is the electronic device 120-n, the determining module of the multimedia interaction module 128-c selects another electronic device whose projection location is near the target projection path Ptp, such as the electronic device 120-b, as a third electronic device. In this situation, the first projection direction is the projection direction D2p that points to the projection location Cnp of the centroid Cn of the display 127-n, and the projection location Cap of the centroid Ca of the display 127-a is the starting point of the projection direction D2p. The eleventh included angle is the included angle A2p between the projection direction D2p and the target projection direction Dtp. The second projection direction is the projection direction D1p that points to the projection location Cbp of the centroid Cb of the display 127-b, and the projection location Cap of the centroid Ca of the display 127-a is the starting point of the projection direction D1p. The twelfth included angle is the included angle A1p between the projection direction D1p and the target projection direction Dtp. In the pattern of FIG. 35, the included angle A2p is greater than the included angle A1p, it means that the projection location of the third electronic device 120-b is closer to the target projection path Ptp than the projection location of the electronic device 120-n. Accordingly, the determining module of the multimedia interaction module 128-c determines that the relative position between the target direction Dt and the candidate electronic device 120-n does not satisfy the second predetermined condition in the twenty-seventh embodiment of the aforementioned operation 414.

When the multimedia interaction system 100 wants to create a multimedia interaction effect where the target image object or the target command transmitted from the source electronic device 120-c can only be received by a single candidate electronic device whose projection location is closest to the target projection path Ptp, by adopting the configuration of the second predetermined condition illustrated in the aforementioned twenty-seventh embodiment, the multimedia interaction system 100 is enabled to prevent the target image object from being received by multiple candidate electronic devices, or to prevent similar unexpected results.

In a twenty-eighth embodiment of the operation 414, the aforementioned second predetermined condition specifies that a projection of the basis electronic device 120-a on the reference horizontal plane is a basis projection region 120-ap, a projection of the candidate electronic device on the reference horizontal plane is a candidate projection region, the candidate projection region is positioned on the target projection path Ptp, and a section of the target projection path Ptp between the basis projection region 120-ap and the candidate projection region does not contact with projections projected by other electronic devices of the multimedia interaction system 100 on the reference horizontal plane.

In a twenty-ninth embodiment of the operation 414, the aforementioned second predetermined condition specifies that the distance between the candidate projection location and the target projection path Ptp is less than the first predetermined value R1, and a section of the target projection path Ptp between the basis projection region 120-ap and the candidate projection region does not contact with the projections projected by other electronic devices of the multimedia interaction system 100 on the reference horizontal plane.

In a thirtieth embodiment of the operation 414, the aforementioned second predetermined condition specifies that the target projection path Ptp passes through the display projection region projected by the display of the candidate electronic device on the reference horizontal plane, and a section of the target projection path Ptp between the basis projection region 120-ap and the candidate projection region does not contact with the projections projected by other electronic devices of the multimedia interaction system 100 on the reference horizontal plane.

Figure 36:
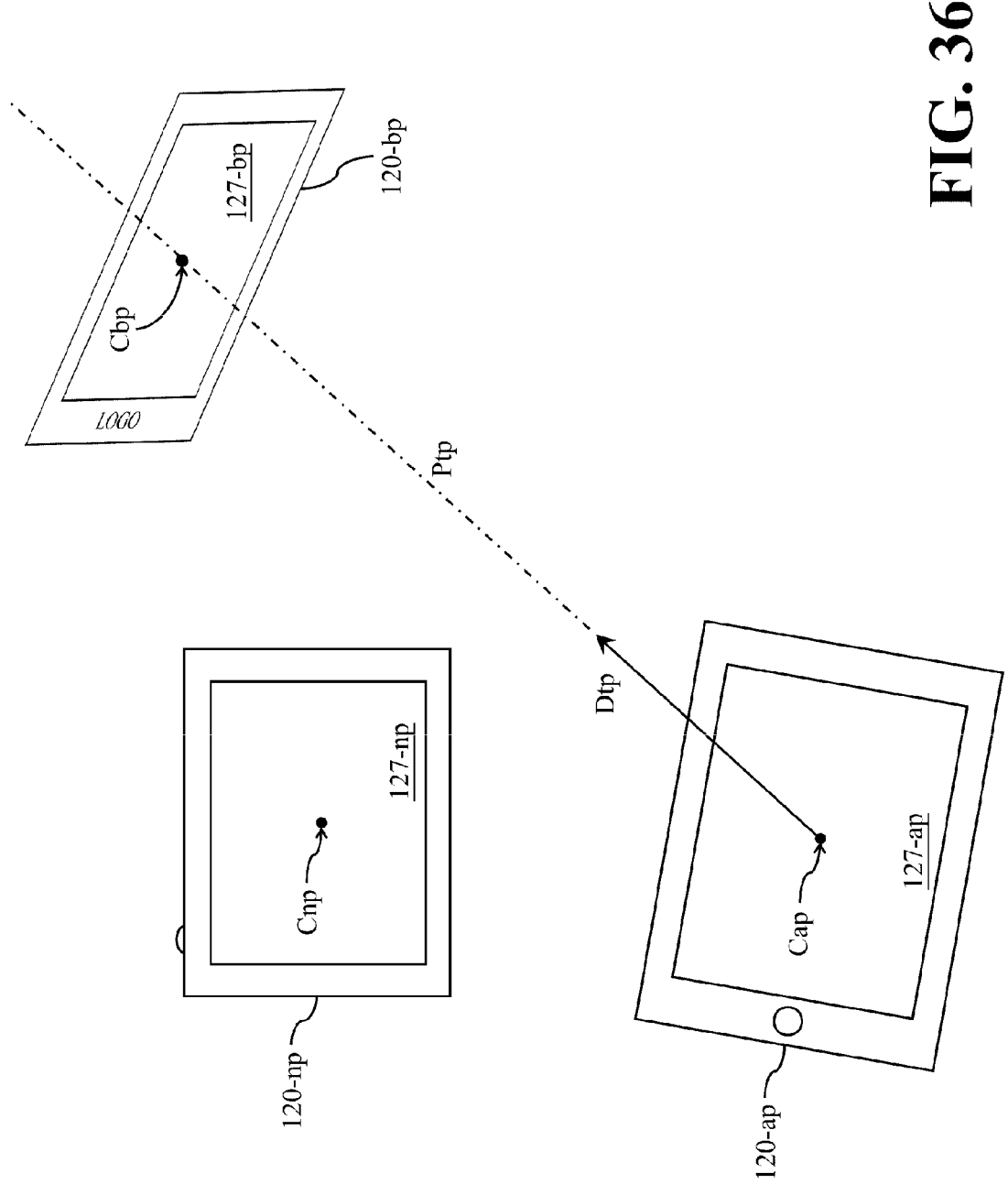

In the pattern of FIG. 36, the projection region 120-bp is projected by the electronic device 120-b on the reference horizontal plane. The target projection path Ptp passes through the projection location Cbp of the centroid Cb of the display 127-b, which means that the projection location of the electronic device 120-b is positioned on the target projection path Ptp. Therefore, the distance between the projection location Cbp of the electronic device 120-b and the target projection path Ptp is zero. In addition, a section of the target projection path Ptp between the basis projection region 120-ap and the projection region 120-bp of the electronic device 120-b does not contact with the projections of other electronic devices. In one aspect, this means that the section between the basis electronic device 120-a and the electronic device 120-b is not blocked by other electronic devices.

Accordingly, for the pattern of FIG. 36, when the candidate electronic device is the electronic device 120-b, the determining module of the multimedia interaction module 128-c determines that the relative position between the target direction Dt and the candidate electronic device 120-b satisfies the second predetermined condition in the twenty-eighth to thirtieth embodiments of the aforementioned operation 414.

In comparison with FIG. 36, in the pattern of aforementioned FIG. 31, the section of the target projection path Ptp between the basis projection region 120-ap and the projection region 120-bp of the electronic device 120-b passes through the projection 127-np of the display 127-n of the electronic device 120-n. In one aspect, this means that the section between the basis electronic device 120-a and the electronic device 120-b is blocked by the electronic device 120-n.

Accordingly, for the pattern of FIG. 31, when the candidate electronic device is the electronic device 120-b, the determining module of the multimedia interaction module 128-c determines that the relative position between the target direction Dt and the candidate electronic device 120-b does not satisfy the second predetermined condition in the twenty-eighth to thirtieth embodiments of the aforementioned operation 414.

If the relative position between the candidate electronic device and the target direction Dt satisfies the second predetermined condition specified in any of the aforementioned twenty-eighth to thirtieth embodiments, it means that the projection location of the candidate electronic device is positioned near the target projection path Ptp to which the target projection direction Dtp points, the distance between the projection location of the candidate electronic device and the target projection path Ptp is within an error tolerance range, and no other electronic device is positioned between the candidate electronic device and the basis electronic device 120-a. Accordingly, when the multimedia interaction system 100 wants to create a multimedia interaction effect where the target image object can be transmitted from the source electronic device 120-c to the candidate electronic device only if no other electronic device is positioned between the candidate electronic device and the basis electronic device 120-a, by adopting the configuration of the second predetermined condition illustrated in any of the twenty-eighth to thirtieth embodiments of the aforementioned operation 414, the multimedia interaction system 100 is enabled to prevent the candidate electronic device from receiving the target image object if there is other electronic device blocking between the candidate electronic device and the basis electronic device 120-a, or to prevent similar unexpected results.

In a thirty-first embodiment of the operation 414, the aforementioned second predetermined condition specifies that a thirteenth included angle is defined by the aforementioned first projection direction and second projection direction, and the aforementioned eleventh included angle is less than a half of the thirteenth included angle.

In a thirty-second embodiment of the operation 414, the aforementioned second predetermined condition specifies that a second reference line in which the second projection direction resides divides the reference horizontal plane into a first region and a second region, wherein the target projection direction Dtp points to the first region, and the candidate projection location is positioned in the first region.

Figure 37:
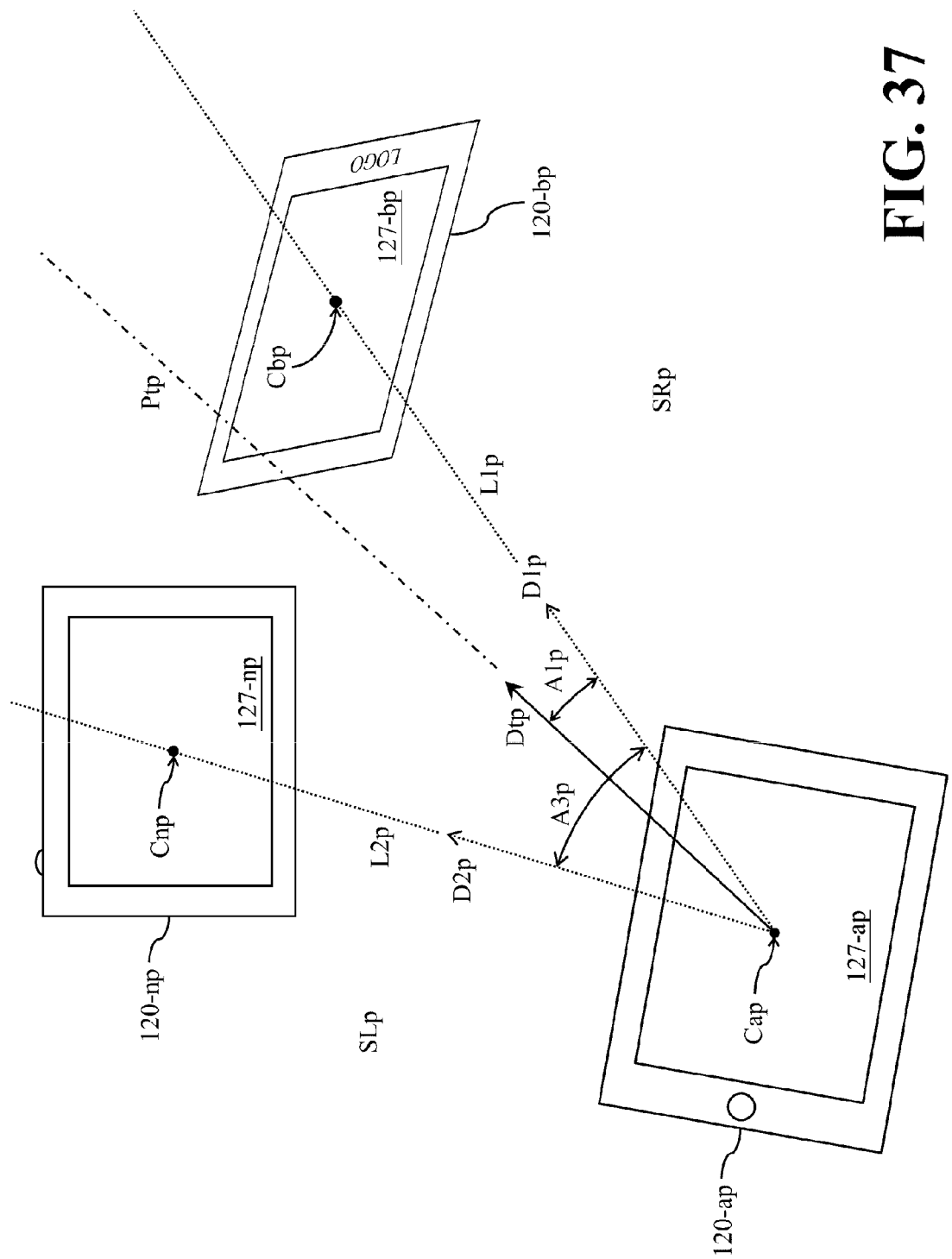

In the pattern of FIG. 37, when the candidate electronic device is the electronic device 120-b, the determining module of the multimedia interaction module 128-c selects another electronic device whose projection location is near the target projection path Ptp, such as the electronic device 120-n, as a third electronic device. In this situation, the first projection direction is the projection direction D1p that points to the projection location Cbp of the centroid Cb of the display 127-b, and the projection location Cap of the centroid Ca of the display 127-a is the starting point of the projection direction D1p. The eleventh included angle is the included angle A1p between the projection direction D1p and the target projection direction Dtp. The second projection direction is the projection direction D2p that points to the projection location Cnp of the centroid Cn of the display 127-n, and the projection location Cap of the centroid Ca of the display 127-a is the starting point of the projection direction D2p. The thirteenth included angle is an included angle A3p between the projection direction D1p and the projection direction D2p. If the included angle A1p is less than a half of the included angle A3p, it means that the projection location of the candidate electronic device 120-b is closer to the target projection path Ptp than the projection location of the third electronic device 120-n. In addition, the second reference line is a reference line L2p on which the projection direction D2p resides. The reference line L2p divides the reference horizontal plane into a first region SRp and a second region SLp. As shown in FIG. 37, the target projection direction Dtp points to the first region SRp, and the candidate electronic device 120-b is positioned in the first region SRp. Accordingly, the determining module of the multimedia interaction module 128-c determines that the relative position between the target direction Dt and the candidate electronic device 120-b satisfies the second predetermined condition in the thirty-first and thirty-second embodiments of the aforementioned operation 414.

When the multimedia interaction system 100 wants to create a multimedia interaction effect where the target image object or the target command transmitted from the source electronic device 120-c can only be received by a single candidate electronic device which is closest to the target projection path Ptp to which the target projection direction Dtp points, by adopting the configuration of the second predetermined condition illustrated in the thirty-first or thirty-second embodiment of the aforementioned operation 414, the multimedia interaction system 100 is enabled to prevent the target image object from being received by multiple candidate electronic devices, or to prevent similar unexpected results.

In a thirty-third embodiment of the operation 414, the aforementioned second predetermined condition specifies that a projection direction (hereinafter, basis orientation projection direction) Dap projected by the basis orientation direction Da of the basis electronic device 120-a on the reference horizontal plane refers the basis projection location Cap as an axis and rotates the first viewing angle VA1 toward two sides of the axis to define a target viewing angle region, wherein the basis orientation projection direction Dap divides the target viewing angle region into a first half region and a second half region, the target projection direction Dtp points to the first half region, and the candidate projection location is positioned in the first half region.

In a thirty-fourth embodiment of the operation 414, the aforementioned second predetermined condition specifies that a fourteenth included angle is defined by the basis orientation projection direction Dap and the target projection direction Dtp, and a fifteenth included angle is defined by the aforementioned first projection direction and the basis orientation projection direction Dap, wherein the fourteenth included angle and the fifteenth included angle are both less than the first viewing angle VA1.

Figure 38:
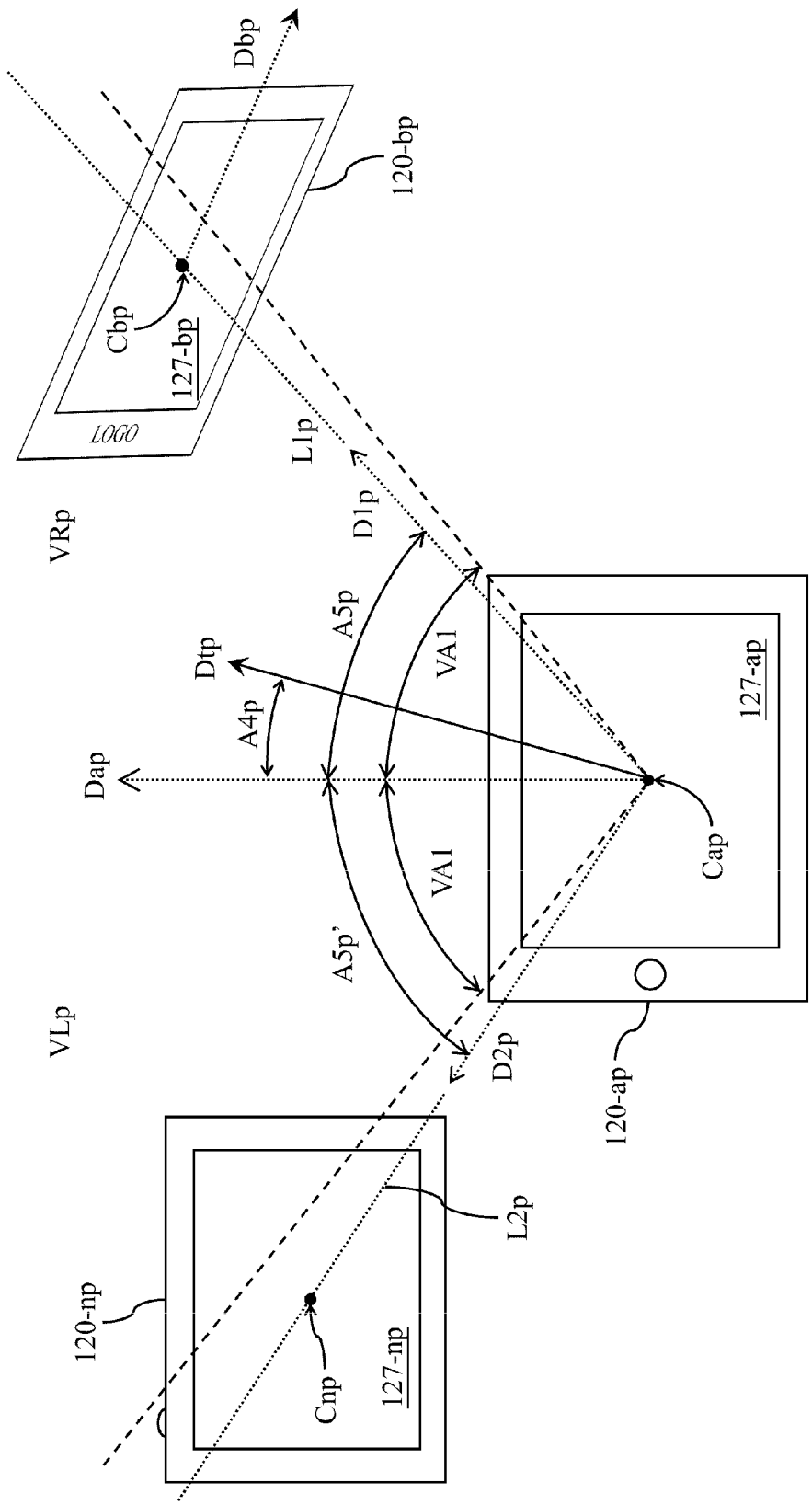

In the pattern of FIG. 38, the basis orientation projection direction Dap refers the projection location of the basis electronic device 120-a (e.g., the projection location Cap of the centroid Ca in this embodiment) as an axis and rotates the first viewing angle VA1 toward two sides of the axis to define the target viewing angle region consisting of a right-half region VRp and a left-half region VLp. The projection location Cbp of the centroid Cb of the display 127-b is positioned within the right-half region VRp, which means that the projection location of the electronic device 120-b is positioned within the right-half region VRp. As shown in FIG. 20, the target projection direction Dtp points to the right-half region VRp. The fourteenth included angle is an included angle A4p between the basis orientation projection direction Dap and the target projection direction Dtp. If the included angle A4p is less than the first viewing angle VA1, it means that the target projection direction Dtp points to the target viewing angle region of the basis electronic device 120-a.

For the pattern of FIG. 38, when the candidate electronic device is the electronic device 120-b, the first projection direction is the projection direction D1p that points to the projection location Cbp of the centroid Cb of the display 127-b, and the projection location Cap of the centroid Ca of the display 127-a is the starting point of the projection direction D1p. The fifteenth included angle is an included angle A5p between the projection direction D1p and the basis orientation projection direction Dap. Since the included angle A4p and the included angle A5p are both less than the first viewing angle VA1, the determining module of the multimedia interaction module 128-c determines that the relative position between the target direction Dt and the candidate electronic device 120-b satisfies the second predetermined condition in the thirty-third and thirty-fourth embodiments of the aforementioned operation 414.

As shown in FIG. 38, the projection location Cnp of the centroid Cn of the display 127-n is positioned outside the target viewing angle region, which means that the projection location of the electronic device 120-n is positioned outside the target viewing angle region.

For the pattern of FIG. 38, when the candidate electronic device is the electronic device 120-n, the first projection direction is the projection direction D2p that points to the projection location Cnp of the centroid Cn of the display 127-n, and the projection location Cap of the centroid Ca of the display 127-a is the starting point of the projection direction D2p. The fifteenth included angle in this case is an included angle A5p' between the projection direction D2p and the basis orientation projection direction Dap. Since the included angle A5p' is greater than the first viewing angle VA1, and the projection location of the electronic device 120-n is positioned outside the target viewing angle region, the determining module of the multimedia interaction module 128-c determines that the relative position between the target direction Dt and the candidate electronic device 120-n does not satisfy the second predetermined condition in the thirty-third and thirty-fourth embodiments of the aforementioned operation 414.

When the multimedia interaction system 100 wants to create the multimedia interaction effect where the target image object or the target command transmitted from the source electronic device 120-c can be received by a candidate electronic device only if the projection location of the candidate electronic device is positioned within the target viewing angle region of the basis electronic device 120-a, by adopting the configuration of the second predetermined condition illustrated in the thirty-third or thirty-fourth embodiment of the aforementioned operation 414, the multimedia interaction system 100 is enabled to prevent the target image object from being received by other electronic device whose projection location is outside the target viewing angle region of the basis electronic device 120-a, or to prevent similar unexpected results.

In a thirty-fifth embodiment of the operation 414, the aforementioned second predetermined condition specifies that a sixteenth included angle is defined by a projection direction (hereinafter, candidate orientation projection direction) projected by the candidate orientation direction of the candidate electronic device on the reference horizontal plane and a first inverse projection direction, the aforementioned fourteenth included angle and fifteenth included angle are both less than the first viewing angle VA1, and the sixteenth included angle is less than the second viewing angle VA2, wherein the aforementioned candidate projection location is a starting point of the first inverse projection direction, and the first inverse projection direction points to the aforementioned basis projection location Cap.

In a thirty-sixth embodiment of the operation 414, the aforementioned second predetermined condition specifies that the candidate orientation projection direction refers the candidate projection location as an axis and rotates the second viewing angle VA2 toward two sides of the axis to define a second candidate viewing angle region, wherein the aforementioned basis projection location Cap is positioned in the second candidate viewing angle region, the target projection direction Dtp points to the aforementioned first half region, and the aforementioned candidate projection location is positioned in the first half region.

When the fifteenth included angle is less than the first viewing angle VA1, it means that the candidate electronic device is positioned within the target viewing angle region of the basis electronic device 120-a. When the sixteenth included angle is less than the second viewing angle VA2, it means that the basis electronic device 120-a is positioned within the second candidate viewing angle region of the candidate electronic device.

Figure 39:
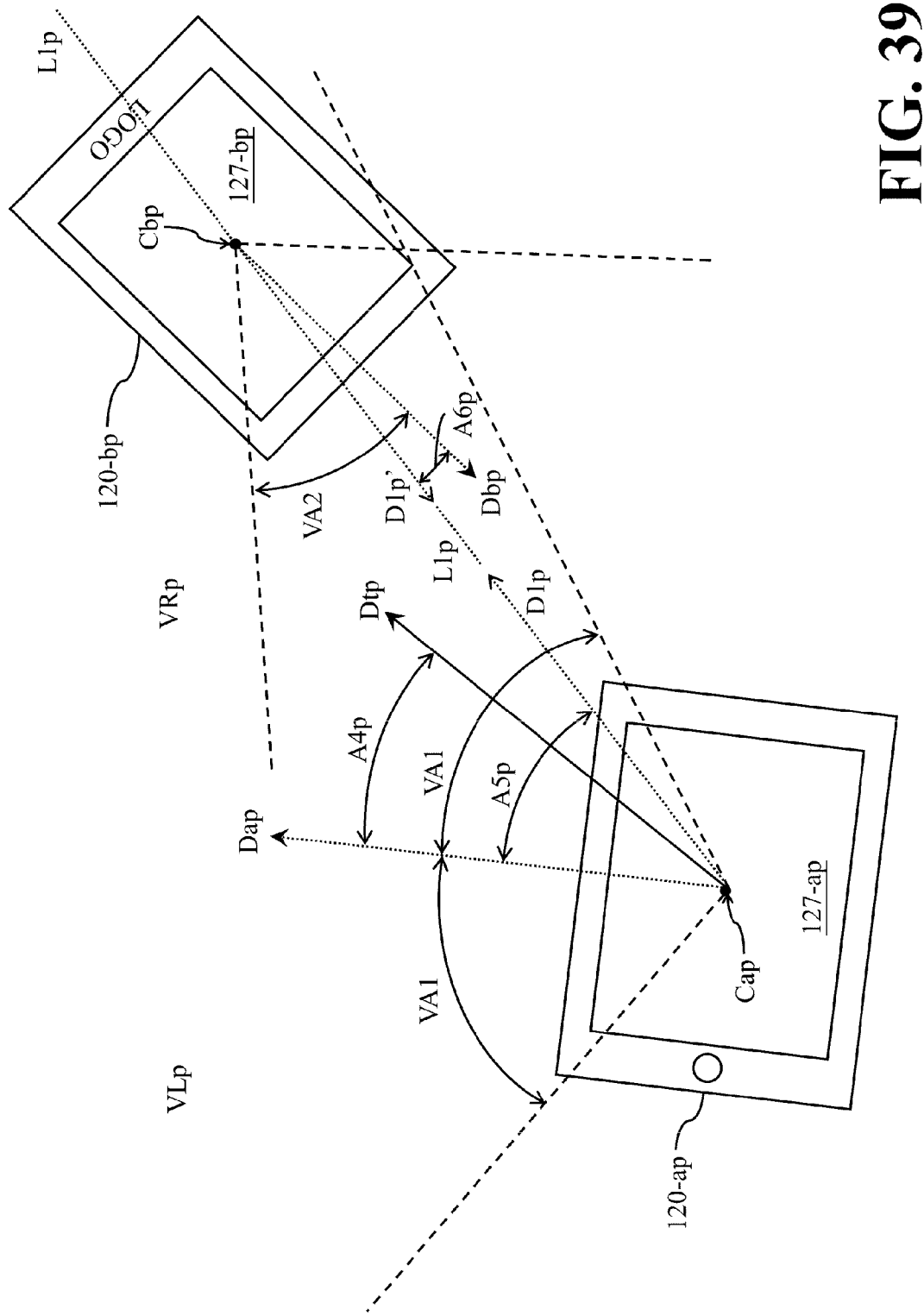

In the pattern of FIG. 39, the basis orientation projection direction Dap refers the projection location of the basis electronic device 120-a (e.g., the projection location Cap of the centroid Ca of the display 127-a in this embodiment) as an axis and rotates the first viewing angle VA1 toward two sides of the axis to define the target viewing angle region consisting of the right-half region VRp and the left-half region VLp. The projection location Cbp of the centroid Cb of the display 127-b is positioned within the right-half region VRp, which means that the projection location of the electronic device 120-b is positioned within the right-half region VRp. As shown in FIG. 39, the target projection direction Dtp points to the right-half region VRp. The fourteenth included angle is the included angle A4$p$ between the basis orientation projection direction Dap and the target projection direction Dtp. If the included angle A4$p$ is less than the first viewing angle VA1, it means that the target projection direction Dtp points to the target viewing angle region of the basis electronic device 120-a. When the candidate electronic device is the electronic device 120-b, the first projection direction is the projection direction D1$p$ that points to the projection location Cbp of the centroid Cb of the display 127-b, and the projection location Cap of the centroid Ca of the display 127-a is the starting point of the projection direction D1$p$. The fifteenth included angle is the included angle A5$p$ between the projection direction D1$p$ and the basis orientation projection direction Dap. The determining module of the multimedia interaction module 128-c may shift the projection direction D1$p$ so that the projection location of the source electronic device 120-b (e.g., the projection location Cbp of the centroid Cb in this embodiment) becomes a starting point of the shifted version of the projection direction D1$p$. The determining module of the multimedia interaction module 128-c then inverses the shifted version of the projection direction D1$p$ and utilizes the inversed result of the shifted version of the projection direction D1$p$ as a first inverse projection direction D1$p'$. The sixteenth included angle is an included angle A6$p$ between the first inverse projection direction D1$p'$ and a candidate orientation projection direction Dbp of the candidate electronic device 120-b. The candidate orientation projection direction Dbp refers the candidate projection location Cbp as an axis and rotates the second viewing angle VA2 toward two sides of the axis to define a second candidate viewing angle region. As shown in FIG. 39, since the included angle A5$p$ is less than the first viewing angle VA1 and the included angle A6$p$ is less than the second viewing angle VA2, the determining module of the multimedia interaction module 128-c determines that the relative position between the target direction Dt and the candidate electronic device 120-b satisfies the second predetermined condition in the thirty-fifth and thirty-sixth embodiments of the aforementioned operation 414.

In the thirty-fifth embodiment of the operation 414, by restricting the fifteenth included angle to be less than the first viewing angle VA1 and restricting the sixteenth included angle to be less than the second viewing angle VA2, the source electronic device 120-c is allowed to transmit the target command to the candidate electronic device 120-b only if the relative position between the projection locations of the basis electronic device 120-a and the candidate electronic device 120-b on the reference horizontal plane belongs to or is close to a face-to-face pattern, thereby avoiding strange user experience.

In practice, the aforementioned first viewing angle VA1 may be the same as the second viewing angle VA2, or may be different from the second viewing angle VA2.

When the multimedia interaction system 100 wants to create the multimedia interaction effect where the target image object or the target command transmitted from the source electronic device 120-c can be received by a candidate electronic device only if the relative position between basis electronic device 120-a and the candidate electronic device belongs to or is close to a face-to-face pattern, by adopting the configuration of the second predetermined condition illustrated in the thirty-fifth or thirty-sixth embodiment of the aforementioned operation 414, the multimedia interaction system 100 is enabled to prevent the target image object or the target command from being received by the candidate electronic device when the candidate electronic device is back to the basis electronic device 120-a, or to prevent similar unexpected results. On the other hand, by adopting the configuration of the second predetermined condition illustrated in the thirty-fifth or thirty-sixth embodiment of the aforementioned operation 414, the multimedia interaction system 100 is enabled to prevent the target image object or the target command from being received by the candidate electronic device when the basis electronic device 120-a is back to the candidate electronic device, or to prevent similar unexpected results.

As can be appreciated from the foregoing descriptions, the source electronic device 120-c transmits the target command corresponding to the target image object to the selected candidate electronic device only if a relative position between the basis electronic device's three-dimensional location or two-dimensional location and the selected direction Ds satisfies the first predetermined condition, and a relative position between the candidate electronic device's three-dimensional location or two-dimensional location and the target direction Dt satisfies the second predetermined condition, i.e., a relative position between the source electronic device, the basis electronic device, and the candidate electronic device satisfies a specific condition. In other words, the candidate electronic device is allowed to utilize the corresponding display to perform a multimedia operation corresponding to the target image object according to the target command only if the relative position between the source electronic device, the basis electronic device, and the candidate electronic device satisfies the specific condition. Accordingly, by adopting the multimedia interaction method illustrated in aforementioned FIGS. 3 and 4, the multimedia interaction system 100 is enabled to create the multimedia interaction effect showing that the target image object is transmitted from the source electronic device 120-c to the basis electronic device 120-a and then rebounds to the candidate electronic device.

if none of the other electronic devices of the multimedia interaction system 100 satisfies the first predetermined condition, the source electronic device 120-c does not select the basis electronic device, and does not transmit the target command to the other electronic devices, so as to prevent the other electronic devices from performing the multimedia operation corresponding to the target image object. Additionally, if the source electronic device 120-c selects the basis electronic device from the multiple candidate electronic devices, but none of the other candidate electronic devices satisfies the second predetermined condition, the source electronic device 120-c does not transmit the target command to the other candidate electronic devices, so as to prevent the other candidate electronic devices from performing the multimedia operation corresponding to the target image object.

Apparently, by adopting the multimedia interaction method illustrated in FIGS. 3 and 4, the multimedia interaction system 100 is capable of effectively reducing multimedia interaction results that do not conform to normal user experiences, multimedia interaction results that are not supposed to occur in the design of the multimedia interaction applications, multimedia interaction results that violate rules configured by the interaction applications, or unexpected multimedia interaction results.

In addition, by utilizing the source electronic device 120-c to determine whether the location and orientation of other electronic device satisfies the second predetermined condition, the required computing resource for other electronic devices can be effectively reduced, thereby increasing the battery duration of the other electronic devices participating in the multimedia interaction application.

In practice, various combinations of the aforementioned criteria specified in the second predetermined condition of different embodiments may be adopted based on the design purpose of the multimedia interaction applications, so as to enable the multimedia interaction system 100 to have more powerful determining capability in determining the relative position among different electronic devices, thereby providing rich and more diversified user experience. For example, the criteria specified in the second predetermined condition of the nineteenth or twentieth embodiment of the operation 414 may be combined with the criteria specified in the second predetermined condition of any of the first to eighteenth embodiments of the operation 414 to form the criteria of a new second predetermined condition. The criteria specified in the second predetermined condition of the thirty-fifth or thirty-sixth embodiment of the operation 414 may be combined with the criteria specified in the second predetermined condition of any of the twenty-first to thirty-fourth embodiments of the operation 414 to form the criteria of a new second predetermined condition. The criteria specified in the second predetermined condition of the seventeenth or eighteenth embodiment of the operation 414 may be combined with the criteria specified in the second predetermined condition of any of the first to sixteenth embodiments of the operation 414 to form the criteria of a new second predetermined condition. The criteria specified in the second predetermined condition of the thirty-third or thirty-fourth embodiment of the operation 414 may be combined with the criteria specified in the second predetermined condition of any of the twenty-first to thirty-second embodiments of the operation 414 to form the criteria of a new second predetermined condition.

The multimedia interaction system 100 may dynamically assign one of the electronic devices 120-a~120-n as a forwarding electronic device. The forwarding electronic device is utilized as a command transmitting medium among the electronic devices 120-a~120-n, so that the electronic devices 120-a~120-n are able to transmit multimedia interaction commands with each other through the forwarding electronic device instead of through a remote central server (not shown). In this way, the transmission efficiency and transmission speed of the multimedia interaction commands among the electronic devices 120-a~120-n can be improved. Additionally, the forwarding electronic device may be utilized as the medium for transmitting information related to spatial locations and orientations among the electronic devices 120-a~120-n.

For example, in the previous embodiment of FIG. 3 and FIG. 4, if an unspecified electronic device (e.g., electronic device 120-n) is assigned as the forwarding electronic device by the multimedia interaction system 100, the forwarding electronic device may dynamically receive information related to the spatial location and the orientation of each of the other electronic devices from the location detection circuit 110 or from the other electronic devices, and record the received information. Each electronic device may dynamically receive information related to the spatial location and the orientation of each of the other electronic devices from the forwarding electronic device, and record the received information, thereby simplifying the propagation of information related to the spatial location and the orientation of respective electronic devices among all electronic devices.

In addition, some multimedia data, such as background images, initial image objects, animations, or parameters for generating above multimedia data required for the electronic device 120 during conducting the interaction operations regarding multimedia contents, may be provided by the source electronic device that generates the multimedia interaction command or provided by other multimedia servers (not shown).

Furthermore, each electronic device 120 may display the relative position among some or all of the electronic devices 120-a~120-n in a partial region of its own display, and display an animation related to a motion of the target image object in the partial region. In this way, the electronic device 120 is enabled to provide more related multimedia information to the user when participating in the multimedia interaction application, thereby offering more multimedia interaction experience to the user.

Figure 40:
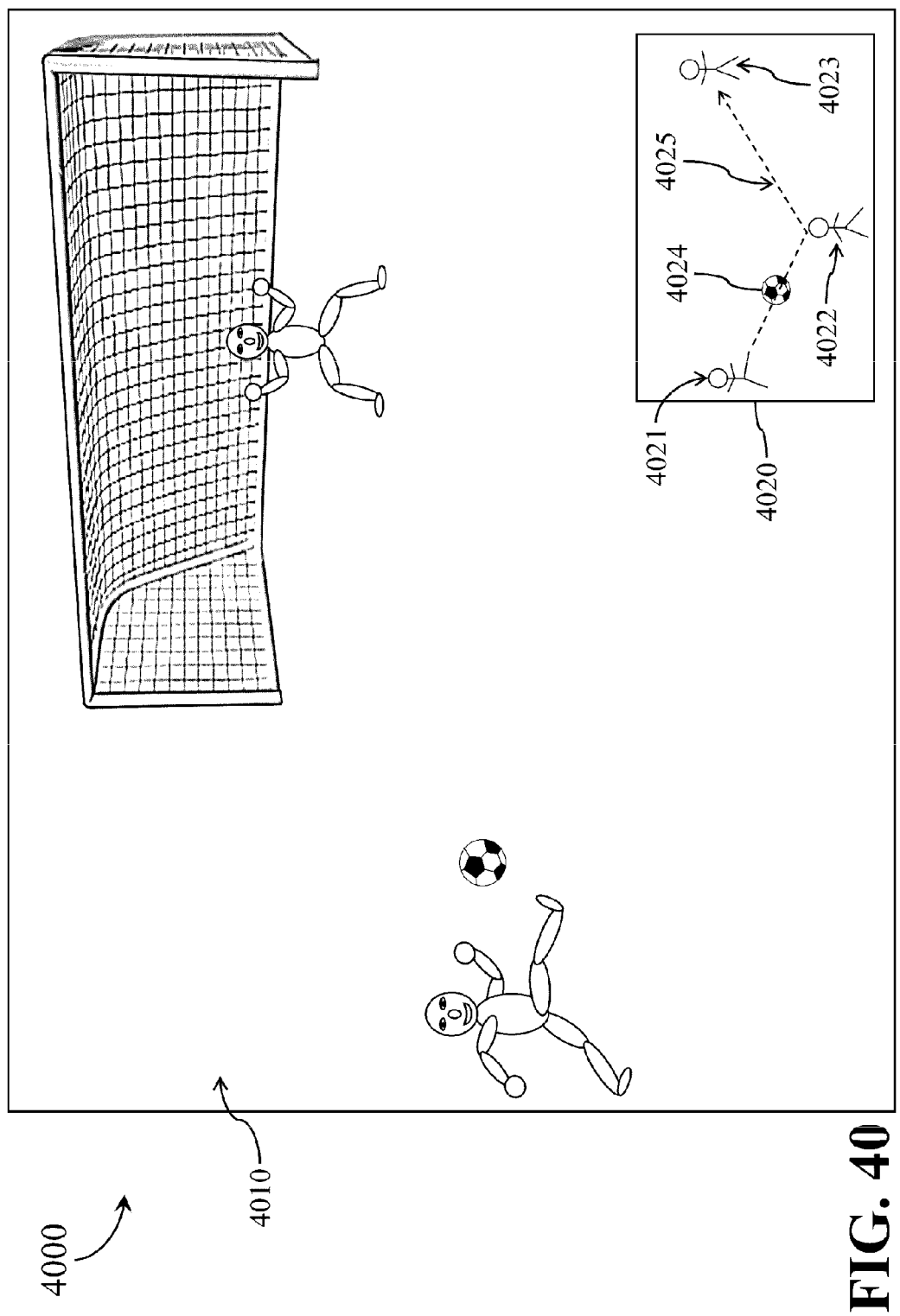
FIG. 40 shows a simplified schematic diagram of a multimedia interaction screen according to one embodiment of the present disclosure.

In practice, the electronic device 120 participating in the multimedia interaction may utilize the display 127 to display related image content of the multimedia interaction, such as a multimedia interaction screen 4000 shown in FIG. 40. As shown in FIG. 40, the multimedia interaction screen 4000 comprises a main screen 4010 displayed in a main region of the display 127, and a miniature screen 4020 displayed in a partial region of the display 127. The electronic device 120 may display the relative position among some or all of the electronic devices 120-*a*~120-*n* in the miniature screen 4020, and display an animation related to the motion of the target image object 500 in the miniature screen 4020. For example, the relative position among portraits 4021, 4022, and 4023 shown on the miniature screen 4020 may represent the relative position among three electronic devices 120 participating in the multimedia interaction, or may represent the relative position among the users of three electronic devices 120. The location of an image object 4040 shown in miniature screen 4020 may be utilized to represent the location of the aforementioned target image object 500. A trace line 4025 shown in the miniature screen 4020 may be utilized to represent a motion trace or a predicted motion trace of the target image object 500.

The target image object 500 is merely a computer image created by the multimedia interaction application program after all, and the user is not able to actually perceive a physical object corresponding to the target image object 500 in the air with the human eyes. Hence, it is difficult for the user to clearly sense the motion trace of the target image object 500 in the virtual space. By displaying the image object 4040 and related trace line 4025 corresponding to the target image object 500 on the miniature screen 4020, the electronic device 120 is capable of providing a multimedia interaction experience similar to the augmented reality to the user. The user of the electronic device 120 may decide whether to move himself/herself, to move the electronic device 120, or to adjust the orientation of the electronic device 120 by referencing to the content shown in the miniature screen 4020, thereby changing the relative position between himself/herself (or the electronic device 120) and other electronic devices to create more fun when participating in the multimedia interaction applications.

In practical applications, the miniature screen 4020 displayed in the display 127 may be utilized as a user control interface, so that the determining module of the multimedia interaction module 128 may compute the aforementioned selected direction Ds according to the user's manipulation to the displaying region of the miniature screen 4020. For example, when the user clicks on a particular portrait shown on the miniature screen 4020, the determining module of the multimedia interaction module 128 may compute a selected direction corresponding to the particular portrait, and then attempt to transmit a target image object that is predetermined or selected by the user toward the selected direction by using the aforementioned method. In another embodiment, when the user drags a target image object from an initial position in the miniature screen 4020 to a target portrait shown on the miniature screen 4020, the determining module of the multimedia interaction module 128 may compute a selected direction defined by the initial position and the target portrait, and then attempt to transmit the target image object toward the selected direction by using the aforementioned method.

In one aspect, the multimedia interaction system 100 and related multimedia interaction methods determines the rationality of the relative position between different electronic devices, and decides whether to transmit a multimedia interaction command to a particular electronic device, or decides whether the particular electronic device is allowed to execute a received multimedia interaction command. As a result, multimedia interaction results that do not conform to normal user experiences, multimedia interaction results that are not supposed to occur in the design of the multimedia interaction applications, multimedia interaction results that violate rules configured by the interaction applications, or unexpected multimedia interaction results can be effectively prevented from occurring among the source electronic device of multimedia interaction commands and other electronic devices.

In another aspect, the multimedia interaction system 100 and related multimedia interaction methods filter or block out multimedia interaction commands that may lead to multimedia interaction results that do not conform to normal user experiences, multimedia interaction results that are not supposed to occur in the design of the multimedia interaction applications, multimedia interaction results that violate rules configured by the interaction applications, or unexpected multimedia interaction results to occur in the multimedia interaction system, so as to ensure that the multimedia interaction behaviors in the multimedia interaction system can conform to the original design purpose of the multimedia interaction applications. As a result, the user experiences delivered by the multimedia interaction system 100 can be greatly improved.

In addition, by utilizing the source electronic device to determine whether the location and orientation of other electronic device satisfies the first predetermined condition and the second predetermined condition, the required computing resource for other electronic devices can be effectively reduced, thereby increasing the battery duration of other electronic devices participating in the multimedia interaction application.

Accordingly, the disclosed multimedia interaction system 100, related methods, and computer program products offer significant benefits to the development for various cross-device multimedia interaction applications.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multimedia interaction system, comprising:
multiple electronic devices, comprising a source electronic device and multiple candidate electronic devices;
multiple displays, respectively arranged on the source electronic device and the multiple candidate electronic devices; and
a location detection circuit, configured to dynamically detect a spatial location and an orientation of each of the multiple electronic devices, and configured to operably transmit information related to detection results to at least one of the multiple electronic devices through a wireless communication approach;
wherein when a user instructs the source electronic device to transmit a target image object toward a selected direction, if a relative position between the selected direction and a first candidate electronic device of the multiple candidate electronic devices satisfies a first predetermined condition, the source electronic device selects the first candidate electronic device as a basis electronic device, and decides a target direction according to the selected direction and a location of the basis electronic device;
wherein the source electronic device determines whether a relative position between the target direction and a second candidate electronic device of the multiple electronic devices satisfies a second predetermined condition, and only if the relative position between the target direction and the second candidate electronic device satisfies the second predetermined condition, the source electronic device transmits a target command corresponding to the target image object to the second candidate electronic device, so that the second candidate electronic device utilizes a corresponding second candidate display to perform a multimedia operation corresponding to the target image object according to the target command;
wherein the location detection circuit detects and transmits spatial coordinates of multiple transmitting-end reference points of the source electronic device to the source electronic device, and the location detection circuit detects and transmits spatial coordinates of multiple receiving-end reference points of the second candidate electronic device to the second candidate electronic device; and
wherein the source electronic device computes a central location of a first multimedia interaction program window displayed in a source display of the source electronic display according to the spatial coordinates of the transmitting-end reference points to represent a spatial location of the source electronic device, and the second candidate electronic device computes a central location of a second multimedia interaction program window displayed in the second candidate display according to the spatial coordinates of the receiving-end reference points to represent a spatial location of the second candidate electronic device.

2. The multimedia interaction system of claim 1, wherein the second predetermined condition comprises at least one of following conditions:
the second candidate electronic device is positioned on a target path to which the target direction points;
a distance between the location of the second candidate electronic device and the target path is less than a first predetermined value;
the target path passes through any part of the second candidate display of the second candidate electronic device;
the second candidate electronic device is positioned on a target vertical plane, in which the target path resides, and the target vertical plane is perpendicular to a ground;
a distance between the location of the second candidate electronic device and the target vertical plane is less than the first predetermined value;
the second candidate electronic device is positioned in a pillar region to which the target direction points, wherein the target direction is an axis of the pillar region and a radius of the pillar region is the first predetermined value;
the second candidate electronic device is positioned in a pyramidal or cone region to which the target direction points, wherein the target direction is an axis of the pyramidal or cone region, the location of the basis electronic device is an apex of the pyramidal or cone region, and a vertex angle of the pyramidal or cone region is an acute angle;
a first included angle between the target direction and a first direction is an acute angle and less than a threshold angle, wherein the location of the basis electronic device is a starting point of the first direction, and the first direction points to the location of the second candidate electronic device;
a second included angle between the target direction and a second direction is an acute angle and the first included angle is less than the second included angle, wherein the location of the basis electronic device is a starting point of the second direction, and the second direction points to a location of a third electronic device of the multiple electronic devices;
the second candidate electronic device is positioned on the target path, and a section of the target path between the basis electronic device and the second candidate electronic device does not contact with other electronic devices of the multiple electronic devices;
the distance between the location of the second candidate electronic device and the target path is less than the first predetermined value, and a section of the target path between the basis electronic device and the second candidate electronic device does not contact with other electronic devices of the multiple electronic devices;
the target path passes through the second candidate display of the second candidate electronic device, and a section of the target path between the basis electronic device and the second candidate electronic device does not contact with other electronic devices of the multiple electronic devices;
the second candidate electronic device is positioned on the target vertical plane in which the target path resides, and a section of the target vertical plane between the basis electronic device and the second candidate electronic device does not contact with other electronic devices of the multiple electronic devices;
the distance between the location of the second candidate electronic device and the target vertical plane is less than the first predetermined value, and a section of the target vertical plane between the basis electronic device and the second candidate electronic device does not contact with other electronic devices of the multiple electronic devices;

a third included angle is defined by the first direction and the second direction, and the first included angle is less than a half of the third included angle;

a second vertical plane, in which the second direction resides, divides a space into a first space and a second space, wherein the second vertical plane is perpendicular to the ground, the target direction points to the first space, and the second candidate electronic device is positioned in the first space;

a basis vertical plane, in which a basis orientation direction of the basis electronic device resides, refers the location of the basis electronic device as an axis and rotates a first viewing angle toward two sides of the axis to define a target viewing angle region, wherein the basis vertical plane is perpendicular to the ground, the basis vertical plane divides the target viewing angle region into a first half space and a second half space, the target direction points to the first half space, and the second candidate electronic device is positioned in the first half space;

a fourth included angle is defined by the basis orientation direction and the target direction, a fifth included angle is defined by the first direction and the basis orientation direction, and the fourth included angle and the fifth included angle are both less than the first viewing angle;

a sixth included angle is defined by a second candidate orientation direction of the second candidate electronic device and a first inverse direction, the fourth included angle and the fifth included angle are both less than the first viewing angle, and the sixth included angle is less than a second viewing angle, wherein the location of the second candidate electronic device is a starting point of the first inverse direction, and the first inverse direction points to the location of the basis electronic device; and a second candidate vertical plane, in which the second candidate orientation direction of the second candidate electronic device resides, refers the location of the second candidate electronic device as an axis and rotates the second viewing angle toward two sides of the axis to define a second candidate viewing angle space, wherein the second candidate vertical plane is perpendicular to the ground, the basis electronic device is positioned in the second candidate viewing angle space, the target direction points to the first half space, and the second candidate electronic device is positioned in the first half space.

3. The multimedia interaction system of claim 2, wherein the location detection circuit is positioned higher than the multiple electronic devices and the first viewing angle is equal to the second viewing angle.

4. The multimedia interaction system of claim 2, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetell lined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on a reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

5. The multimedia interaction system of claim 1, wherein the second predetermined condition comprises at least one of following conditions:

a second candidate projection location projected by the second candidate electronic device on a reference horizontal plane parallel to a ground is positioned on a target projection path to which a target projection direction points, wherein the target projection direction is projected by the target direction on the reference horizontal plane;

a distance between the second candidate projection location and the target projection path is less than a first predetermined value;

the target projection path passes through a second display projection region projected by the second candidate display of the second candidate electronic device on the reference horizontal plane;

the target projection direction points to the target projection path and a strip region, and the second candidate projection location is positioned in the strip region, wherein the target projection path is a central line of the strip region, and a width of the strip region is two times of the first predetermined value;

the target projection direction points to a triangle region, and the second candidate projection location is positioned in the triangle region, wherein the target projection path is a central line of the triangle region, a basis projection location projected by the basis electronic device on the reference horizontal plane is an apex of the triangle region, and a vertex angle of the triangle region is an acute angle;

an eleventh included angle between the target projection direction and a first projection direction is an acute angle and less than a threshold angle, wherein the basis projection location is a starting point of the first projection direction, and the first projection direction points to the second candidate projection location;

a twelfth included angle between the target projection direction and a second projection direction is an acute angle, and the eleventh included angle is less than the twelfth included angle, wherein the basis projection location is a starting point of the second projection direction, and the second projection direction points to a third projection location projected by a third electronic device of the multiple electronic devices on the reference horizontal plane;

a projection of the basis electronic device on the reference horizontal plane is a basis projection region, a projection of the second candidate electronic device on the reference horizontal plane is a second candidate projection region, the second candidate projection location is positioned on the target projection path, and a section of the target projection path between the basis projection region and the second candidate projection region does not contact with projections projected by other electronic devices of the multiple electronic devices on the reference horizontal plane;

the distance between the second candidate projection location and the target projection path is less than the first predetermined value, and a section of the target projection path between the basis projection region and the second candidate projection region does not contact with the projections projected by other electronic devices of the multiple electronic devices on the reference horizontal plane;

the target projection path passes through the second display projection region projected by the second candidate display of the second candidate electronic device on the reference horizontal plane, and a section of the target projection path between the basis projection region and the second candidate projection region does not contact with the projections projected by other electronic devices of the multiple electronic devices on the reference horizontal plane;

a thirteenth included angle is defined by the first projection direction and the second projection direction, and the eleventh included angle is less than a half of the thirteenth included angle;

a second reference line in which the second projection direction resides divides the reference horizontal plane into a first region and a second region, wherein the target projection direction points to the first region and the second candidate projection location is positioned in the first region;

a basis orientation projection direction projected by a basis orientation direction of the basis electronic device on the reference horizontal plane refers the basis projection location as an axis and rotates a first viewing angle toward two sides of the axis to define a target viewing angle region, wherein the basis orientation projection direction divides the target viewing angle region into a first half region and a second half region, the target projection direction points to the first half region, and the second candidate projection location is positioned in the first half region;

a fourteenth included angle is defined by the basis orientation projection direction and the target projection direction, and a fifteenth included angle is defined by the first projection direction and the basis orientation projection direction, wherein the fourteenth included angle and the fifteenth included angle are both less than the first viewing angle;

a sixteenth included angle is defined by a second candidate orientation projection direction projected by a second candidate orientation direction of the second candidate electronic device on the reference horizontal plane and a first inverse projection direction, the fourteenth included angle and the fifteenth included angle are both less than the first viewing angle, and the sixteenth included angle is less than a second viewing angle, wherein the second candidate projection location is a starting point of the first inverse projection direction, and the first inverse projection direction points to the basis projection location; and the second candidate orientation projection direction refers the second candidate projection location as an axis and rotates the second viewing angle toward two sides of the axis to define a second candidate viewing angle region, wherein the basis projection location is positioned in the second candidate viewing angle region, the target projection direction points to the first half region, and the second candidate projection location is positioned in the first half region.

6. The multimedia interaction system of claim 5, wherein the location detection circuit is positioned higher than the multiple electronic devices and the first viewing angle is equal to the second viewing angle.

7. The multimedia interaction system of claim 5, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetermined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on the reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

8. The multimedia interaction system of claim 1, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetermined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on a reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

9. The multimedia interaction system of claim 1, wherein the source electronic device defines a second reference shifted direction parallel to the selected direction, and sets the location of the basis electronic device as a starting point of the second reference shifted direction, so that a fourth reference included angle less than 180 degrees is defined by the second reference shifted direction and the basis orientation direction of the basis electronic device;

wherein the source electronic device sets the location of the basis electronic device as a starting point of the target direction so that a fifth reference included angle is defined by the target direction and the basis orientation direction;

wherein the fifth reference included angle is a supplementary angle of the fourth reference included angle.

10. The multimedia interaction system of claim 1, wherein the source electronic device displays a relative position among the source electronic device, the basis electronic device, and the second candidate electronic device in a partial region of a source display of the source electronic display, and displays an animation related to a motion of the target image object in the partial region.

11. The multimedia interaction system of claim 10, wherein the source electronic device computes the selected direction according to the user's manipulation with respect to the partial region.

12. The multimedia interaction system of claim 1, wherein the source electronic device receives information related to a location and an orientation of the second candidate electronic device from at least one of the location detection circuit and the multiple candidate electronic devices.

13. The multimedia interaction system of claim 1, wherein the multiple electronic devices further comprise:

a forwarding electronic device, configured to be a transmitting medium for transmitting commands, location infoimation, and orientation information among the multiple electronic devices;

wherein the forwarding electronic device receives information related to a location and an orientation of the second candidate electronic device from at least one of the location detection circuit and the multiple electronic devices, and provides the infounation to the source electronic device.

14. A computer program product, stored in a non-transitory storage device of a source electronic device of a multimedia interaction system, for enabling the source electronic device to perform a multimedia interaction operation when executed by a control circuit, wherein the multimedia interaction system comprises a location detection circuit and multiple electronic devices, the multiple electronic devices comprise the source electronic device and multiple candidate electronic devices, and the source electronic device comprises the control circuit, a communication circuit, and a source display, the computer program product comprising:
- a receiving module, for utilizing the communication circuit to dynamically receive information related to a spatial location and an orientation of each of the multiple electronic devices through a wireless communication approach;
- a selecting module, wherein when a user instructs the source electronic device to transmit a target image object toward a selected direction, the selecting module utilizes the control circuit to select a first candidate electronic device of the multiple electronic devices as a basis electronic device if a relative position between the first candidate electronic device and the selected direction satisfies a first predetermined condition;
- a target direction decision module, for utilizing the control circuit to decide a target direction according to the selected direction and a location of the basis electronic device;
- a determining module, for utilizing the control circuit to determine whether a relative position between a second candidate electronic device of the multiple electronic devices and the target direction satisfies a second predetermined condition; and
- a transmitting module, for utilizing the communication circuit to transmit a target command corresponding to the target image object to the second candidate electronic device only if the relative position between the second candidate electronic device and the target direction satisfies the second predetermined condition, so that the second candidate electronic device utilizes a corresponding second candidate display to perform a multimedia operation corresponding to the target image object according to the target command;
- wherein the receiving module utilizes the communication circuit to receive spatial coordinates of multiple transmitting-end reference points of the source electronic device from the location detection circuit, and the determining module utilizes the control circuit to compute a centroid location of a first multimedia interaction program window displayed in the source display according to the spatial coordinates of the transmitting-end reference points to represent a spatial location of the source electronic device.

15. The computer program product of claim 14, wherein the second predetermined condition comprises at least one of following conditions:
- the second candidate electronic device is positioned on a target path to which the target direction points;
- a distance between the location of the second candidate electronic device and the target path is less than a first predetermined value;
- the target path passes through any part of the second candidate display of the second candidate electronic device;
- the second candidate electronic device is positioned on a target vertical plane, in which the target path resides, and the target vertical plane is perpendicular to a ground;
- a distance between the location of the second candidate electronic device and the target vertical plane is less than the first predetermined value;
- the second candidate electronic device is positioned in a pillar region to which the target direction points, wherein the target direction is an axis of the pillar region and a radius of the pillar region is the first predetermined value;
- the second candidate electronic device is positioned in a pyramidal or cone region to which the target direction points, wherein the target direction is an axis of the pyramidal or cone region, the location of the basis electronic device is an apex of the pyramidal or cone region, and a vertex angle of the pyramidal or cone region is an acute angle;
- a first included angle between the target direction and a first direction is an acute angle and the first included angle is less than a threshold angle, wherein the location of the basis electronic device is a starting point of the first direction, and the first direction points to the location of the second candidate electronic device;
- a second included angle between the target direction and a second direction is an acute angle and the first included angle is less than the second included angle, wherein the location of the basis electronic device is a starting point of the second direction, and the second direction points to a location of a third electronic device of the multiple electronic devices;
- the second candidate electronic device is positioned on the target path, and a section of the target path between the basis electronic device and the second candidate electronic device does not contact with other electronic devices of the multiple electronic devices;
- the distance between the location of the second candidate electronic device and the target path is less than the first predetermined value, and a section of the target path between the basis electronic device and the second candidate electronic device does not contact with other electronic devices of the multiple electronic devices;
- the target path passes through the second candidate display of the second candidate electronic device, and a section of the target path between the basis electronic device and the second candidate electronic device does not contact with other electronic devices of the multiple electronic devices;
- the second candidate electronic device is positioned on the target vertical plane in which the target path resides, and a section of the target vertical plane between the basis electronic device and the second candidate electronic device does not contact with other electronic devices of the multiple electronic devices;
- the distance between the location of the second candidate electronic device and the target vertical plane is less than the first predetermined value, and a section of the target vertical plane between the basis electronic device and the second candidate electronic device does not contact with other electronic devices of the multiple electronic devices;
- a third included angle is defined by the first direction and the second direction, and the first included angle is less than a half of the third included angle;
- a second vertical plane, in which the second direction resides, divides a space into a first space and a second space, wherein the second vertical plane is perpendicular to the ground, the target direction points to the first space, and the second candidate electronic device is positioned in the first space;
- a basis vertical plane, in which a basis orientation direction of the basis electronic device resides, refers the location of the basis electronic device as an axis and rotates a first viewing angle toward two sides of the axis to define a target viewing angle region, wherein the basis vertical plane is perpendicular to the ground, the basis vertical plane divides the target viewing angle region into a first half space and a second half space, the target direction points to the first half space, and the second candidate electronic device is positioned in the first half space;

a fourth included angle is defined by the basis orientation direction and the target direction, a fifth included angle is defined by the first direction and the basis orientation direction, and the fourth included angle and the fifth included angle are both less than the first viewing angle;

a sixth included angle is defined by a second candidate orientation direction of the second candidate electronic device and a first inverse direction, the fourth included angle and the fifth included angle are both less than the first viewing angle, and the sixth included angle is less than a second viewing angle, wherein the location of the second candidate electronic device is a starting point of the first inverse direction, and the first inverse direction points to the location of the basis electronic device; and a second candidate vertical plane, in which the second candidate orientation direction of the second candidate electronic device resides, refers the location of the second candidate electronic device as an axis and rotates the second viewing angle toward two sides of the axis to define a second candidate viewing angle space, wherein the second candidate vertical plane is perpendicular to the ground, the basis electronic device is positioned in the second candidate viewing angle space, the target direction points to the first half space, and the second candidate electronic device is positioned in the first half space.

16. The computer program product of claim 15, wherein the first viewing angle is equal to the second viewing angle.

17. The computer program product of claim 15, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetermined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on a reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

18. The computer program product of claim 14, wherein the second predetermined condition comprises at least one of following conditions:

a second candidate projection location projected by the second candidate electronic device on a reference horizontal plane parallel to a ground is positioned on a target projection path to which a target projection direction points, wherein the target projection direction is projected by the target direction on the reference horizontal plane;

a distance between the second candidate projection location and the target projection path is less than a first predetermined value;

the target projection path passes through a second display projection region projected by the second candidate display of the second candidate electronic device on the reference horizontal plane;

the target projection direction points to the target projection path and a strip region, and the second candidate projection location is positioned in the strip region, wherein the target projection path is a central line of the strip region, and a width of the strip region is two times of the first predetermined value;

the target projection direction points to a triangle region, and the second candidate projection location is positioned in the triangle region, wherein the target projection path is a central line of the triangle region, a basis projection location projected by the basis electronic device on the reference horizontal plane is an apex of the triangle region, and a vertex angle of the triangle region is an acute angle;

an eleventh included angle between the target projection direction and a first projection direction is an acute angle and less than a threshold angle, wherein the basis projection location is a starting point of the first projection direction, and the first projection direction points to the second candidate projection location;

a twelfth included angle between the target projection direction and a second projection direction is an acute angle, and the eleventh included angle is less than the twelfth included angle, wherein the basis projection location is a starting point of the second projection direction, and the second projection direction points to a third projection location projected by a third electronic device of the multiple electronic devices on the reference horizontal plane;

a projection of the basis electronic device on the reference horizontal plane is a basis projection region, a projection of the second candidate electronic device on the reference horizontal plane is a second candidate projection region, the second candidate projection location is positioned on the target projection path, and a section of the target projection path between the basis projection region and the second candidate projection region does not contact with projections projected by other electronic devices of the multiple electronic devices on the reference horizontal plane;

the distance between the second candidate projection location and the target projection path is less than the first predetermined value, and a section of the target projection path between the basis projection region and the second candidate projection region does not contact with the projections projected by other electronic devices of the multiple electronic devices on the reference horizontal plane;

the target projection path passes through the second display projection region projected by the second candidate display of the second candidate electronic device on the reference horizontal plane, and a section of the target projection path between the basis projection region and the second candidate projection region does not contact with the projections projected by other electronic devices of the multiple electronic devices on the reference horizontal plane;

a thirteenth included angle is defined by the first projection direction and the second projection direction, and the eleventh included angle is less than a half of the thirteenth included angle;

a second reference line in which the second projection direction resides divides the reference horizontal plane into a first region and a second region, wherein the target projection direction points to the first region and the second candidate projection location is positioned in the first region;

a basis orientation projection direction projected by a basis orientation direction of the basis electronic device on the reference horizontal plane refers the basis projection location as an axis and rotates a first viewing angle toward two sides of the axis to define a target viewing angle region, wherein the basis orientation projection direction divides the target viewing angle region into a first half region and a second half region, the target projection direction points to the first half region, and the second candidate projection location is positioned in the first half region;

a fourteenth included angle is defined by the basis orientation projection direction and the target projection direction, and a fifteenth included angle is defined by the first projection direction and the basis orientation projection direction, wherein the fourteenth included angle and the fifteenth included angle are both less than the first viewing angle;

a sixteenth included angle is defined by a second candidate orientation projection direction projected by a second candidate orientation direction of the second candidate electronic device on the reference horizontal plane and a first inverse projection direction, the fourteenth included angle and the fifteenth included angle are both less than the first viewing angle, and the sixteenth included angle is less than a second viewing angle, wherein the second candidate projection location is a starting point of the first inverse projection direction, and the first inverse projection direction points to the basis projection location; and the second candidate orientation projection direction refers the second candidate projection location as an axis and rotates the second viewing angle toward two sides of the axis to define a second candidate viewing angle region, wherein the basis projection location is positioned in the second candidate viewing angle region, the target projection direction points to the first half region, and the second candidate projection location is positioned in the first half region.

19. The computer program product of claim 18, wherein the first viewing angle is equal to the second viewing angle.

20. The computer program product of claim 19, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetermined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on the reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

21. The computer program product of claim 14, wherein the first predetermined condition comprises at least one of following conditions:

the first candidate electronic device is positioned on a selected path to which the selected direction points;

a distance between a location of the first candidate electronic device and the selected path is less than a first predetermined distance value;

the selected path passes through any part of a first display of the first candidate electronic device;

the first candidate electronic device is positioned on a selected vertical plane, in which the selected path resides, and the selected vertical plane is perpendicular to the ground;

a distance between the location of the first candidate electronic device and the selected vertical plane is less than the first predetermined distance value;

the first candidate electronic device is positioned in a pillar region to which the selected direction points, wherein the selected direction is an axis of the pillar region and a radius of the pillar region is the first predetermined distance value;

the first candidate electronic device is positioned in a pyramidal or cone region to which the selected direction points, wherein the selected direction is an axis of the pyramidal or cone region, a location of the target image object is an apex of the pyramidal or cone region, and a vertex angle of the pyramidal or cone region is an acute angle;

the selected direction is parallel to a first reference shifted direction, and a first reference included angle between the first reference shifted direction and a first reference direction is an acute angle and less than a reference angle, wherein a location of the source electronic device is a starting point of both the first reference shifted direction and the first reference direction, and the first reference direction points to the location of the first candidate electronic device;

a second reference included angle between the first reference shifted direction and a second reference direction is an acute angle and the first reference included angle is less than the second reference included angle, wherein the location of the source electronic device is a starting point of the second reference direction, and the second reference direction points to a location of a reference electronic device of the multiple electronic devices;

the first candidate electronic device is positioned on the selected path, and a section of the selected path between the source electronic device and the first candidate electronic device does not contact with other electronic devices of the multiple electronic devices;

the distance between the location of the first candidate electronic device and the selected path is less than the first predetermined distance value, and a section of the selected path between the source electronic device and the first candidate electronic device does not contact with other electronic devices of the multiple electronic devices;

the selected path passes through the first display of the first candidate electronic device, and a section of the selected path between the source electronic device and the first candidate electronic device does not contact with other electronic devices of the multiple electronic devices;

the first candidate electronic device is positioned on the selected vertical plane in which the selected path resides, and a section of the selected vertical plane between the source electronic device and the first candidate electronic device does not contact with other electronic devices of the multiple electronic devices;

the distance between the location of the first candidate electronic device and the selected vertical plane is less than the first predetermined distance value, and a section of the selected vertical plane between the source electronic device and the first candidate electronic device does not contact with other electronic devices of the multiple electronic devices;

a third reference included angle is defined by the first reference direction and the second reference direction, and the first reference included angle is less than a half of the third reference included angle;

a second reference vertical plane, in which the second reference direction resides, divides a space into a first reference space and a second reference space, wherein the second reference vertical plane is perpendicular to the ground, the selected direction points to the first reference space and the first candidate electronic device is positioned in the first reference space;

a source vertical plane, in which a source orientation direction of the source electronic device resides, refers the location of the source electronic device as an axis and rotates a first reference viewing angle toward two sides of the axis to define a source viewing angle space, the source vertical plane divides the source viewing angle space into a first half reference space and a second half reference space, the selected direction points to the first half reference space, and the first candidate electronic device is positioned in the first half reference space, a first candidate vertical plane, in which a first candidate orientation direction of the first candidate electronic device resides, refers the location of the first candidate electronic device as an axis and rotates a second reference viewing angle toward two sides of the axis to define a first candidate viewing angle space, and the source electronic device is positioned in the first candidate viewing angle space, wherein the source vertical plane and the first candidate vertical plane are perpendicular to the ground;

a fourth reference included angle is defined by the source orientation direction and the first reference shifted direction, a fifth reference included angle is defined by the first reference direction and the source orientation direction, the fourth reference included angle and the fifth reference included angle are both less than the first reference viewing angle, a sixth reference included angle is defined by the first candidate orientation direction of the first candidate electronic device and a first reference inverse direction, and the sixth reference included angle is less than the second reference viewing angle, wherein the location of the first candidate electronic device is a starting point of the first reference inverse direction, and the first reference inverse direction points to the location of the source electronic device;

a seventh reference included angle is defined by the first candidate orientation direction of the first candidate electronic device and a first shifted direction, the fourth reference included angle and the fifth reference included angle are both less than the first reference viewing angle, and the seventh reference included angle is less than the second reference viewing angle, wherein the location of the first candidate electronic device is a starting point of the first shifted direction, and the first shifted direction is parallel to the first reference direction;

the selected direction points to the first half reference space, the first candidate electronic device is positioned in the first half reference space, and the seventh reference included angle is less than 90 degrees;

a first candidate projection location projected by the first candidate electronic device on a reference horizontal plane parallel to the ground is positioned on a selected projection path to which a selected projection direction points, wherein the selected projection direction is projected by the selected direction on the reference horizontal plane;

a distance between the first candidate projection location and the selected projection path is less than the first predetermined distance value;

the selected projection path passes through a first display projection region projected by the first display of the first candidate electronic device on the reference horizontal plane;

the selected projection direction points to the selected projection path and a strip region, and the first candidate projection location is positioned in the strip region, wherein the selected projection path is a central line of the strip region, and a width of the strip region is two times of the first predetermined distance value;

the selected projection direction points to a triangle region, and the first candidate projection location is positioned in the triangle region, wherein the selected projection path is a central line of the triangle region, a projection location projected by the target image object on the reference horizontal plane is an apex of the triangle region, and a vertex angle of the triangle region is an acute angle;

an eleventh reference included angle between the selected projection direction and a first reference projection direction is an acute angle and less than the reference angle, wherein a source projection location projected by the source electronic device on the reference horizontal plane is a starting point of the first reference projection direction, and the first reference projection direction points to the first candidate projection location;

a twelfth reference included angle between the selected projection direction and a second reference projection direction is an acute angle, and the eleventh reference included angle is less than the twelfth reference included angle, wherein the source projection location is a starting point of the second reference projection direction, and the second reference projection direction points to a reference projection location projected by the reference electronic device of the multiple electronic devices on the reference horizontal plane;

a projection of the source electronic device on the reference horizontal plane is a source projection region, a projection of the first candidate electronic device on the reference horizontal plane is a first candidate projection region, the first candidate projection location is positioned on the selected projection path, and a section of the selected projection path between the source projection region and the first candidate projection region does not contact with projections projected by other electronic devices of the multiple electronic devices on the reference horizontal plane;

the distance between the first candidate projection location and the selected projection path is less than the first predetermined distance value, and a section of the selected projection path between the source projection region and the first candidate projection region does not contact with the projections projected by other electronic devices of the multiple electronic devices on the reference horizontal plane;

the selected projection path passes through the first display projection region projected by the first display of the first candidate electronic device on the reference horizontal plane, and a section of the selected projection path between the source projection region and the first candidate projection region does not contact with the projections projected by other electronic devices of the multiple electronic devices on the reference horizontal plane;

a thirteenth reference included angle is defined by the first reference projection direction and the second reference projection direction, and the eleventh reference included angle is less than a half of the thirteenth reference included angle;

a first reference line in which the second reference projection direction resides divides the reference horizontal plane into a first reference region and a second reference region, wherein the selected projection direction points to the first reference region and the first candidate projection location is positioned in the first reference region;

a source orientation projection direction projected by the source orientation direction of the source electronic device on the reference horizontal plane refers the source projection location as an axis and rotates the first reference viewing angle toward two sides of the axis to define a source viewing angle region, the source orientation projection direction divides the source viewing angle region into a first half reference region and a second half reference region, the selected projection direction points to the first half reference region, and the first candidate projection location is positioned in the first half reference region, wherein a first candidate orientation projection direction projected by the first candidate orientation direction of the first candidate electronic device on the reference horizontal plane refers the first candidate projection location as an axis and rotates the second reference viewing angle toward two sides of the axis to define a first candidate viewing angle region, and the source projection location is positioned in the first candidate viewing angle region;

a fourteenth reference included angle is defined by the source orientation projection direction and the selected projection direction, a fifteenth reference included angle is defined by the first reference projection direction and the source orientation projection direction, the fourteenth reference included angle and the fifteenth reference included angle are both less than the first reference viewing angle, a sixteenth reference included angle is defined by the first candidate orientation projection direction projected by the first candidate electronic device and a first reference inverse projection direction, and the sixteenth reference included angle is less than the second reference viewing angle, wherein the first candidate projection location is a starting point of the first reference inverse projection direction, and the first reference inverse projection direction points to the source projection location;

a seventeenth reference included angle is defined by the first candidate orientation projection direction projected by the first candidate electronic device and the first reference projection direction, the fourteenth reference included angle and the fifteenth reference included angle are both less than the first reference viewing angle, and the seventeenth reference included angle is less than the second reference viewing angle; and the selected projection direction points to the first half reference region, the first candidate projection location of the first candidate electronic device is positioned in the first half reference region, and the seventeenth reference included angle is less than 90 degrees.

22. The computer program product of claim 14, wherein the operation for deciding the target direction conducted by the target direction decision module further comprises:

utilizing the control circuit to define a second reference shifted direction parallel to the selected direction and to set the location of the basis electronic device as a starting point of the second reference shifted direction, so that a fourth reference included angle less than 180 degrees is defined by the second reference shifted direction and a basis orientation direction of the basis electronic device; and utilizing the control circuit to set the location of the basis electronic device as a starting point of the target direction so that a fifth reference included angle is defined by the target direction and the basis orientation direction;

wherein the fifth reference included angle is a supplementary angle of the fourth reference included angle.

23. The computer program product of claim 14, wherein the computer program product further comprises:

a display module, for utilizing the control circuit to display a relative position among the source electronic device, the basis electronic device, and the second candidate electronic device in a partial region of the source display, and to display an animation related to a motion of the target image object in the partial region.

24. The computer program product of claim 23, wherein the determining module utilizes the control circuit to compute the selected direction according to the user's manipulation with respect to the partial region.

25. The computer program product of claim 14, wherein the receiving module utilizes the communication circuit to receive information related to a location and an orientation of the second candidate electronic device from at least one of the location detection circuit and the multiple candidate electronic devices.

26. The computer program product of claim 14, wherein the multiple electronic devices further comprise:

a forwarding electronic device, configured to be a transmitting medium for transmitting commands, location information, and orientation information among the multiple electronic devices;

wherein the receiving module utilizes the communication circuit to receive information related to a location and an orientation of the second candidate electronic device from the forwarding electronic device.

* * * * *